US012644988B2

(12) United States Patent
Slotwinski et al.

(10) Patent No.: US 12,644,988 B2
(45) Date of Patent: Jun. 2, 2026

(54) LASER RADAR

(71) Applicants: NIKON METROLOGY NV, Leuven (BE); NIKON CORPORATION, Tokyo (JP)

(72) Inventors: Anthony Slotwinski, Nellysford, VA (US); Ghassan Chamsine, Haymarket, VA (US); Tom Hedges, Haymarket, VA (US); Paul Lightowler, Birmingham (GB); Daniel Gene Smith, Tucson, AZ (US); Yasuhiro Hidaka, Fujisawa (JP); Masanori Arai, Kamakura (JP)

(73) Assignees: Nikon Metrology NV, Leuven (BE); Nikon Corporation, Tokyo (JP)

( * ) Notice: Subject to any disclaimer, the term of this patent is extended or adjusted under 35 U.S.C. 154(b) by 1115 days.

(21) Appl. No.: 17/485,113

(22) Filed: Sep. 24, 2021

(65) Prior Publication Data

US 2022/0082697 A1     Mar. 17, 2022

Related U.S. Application Data

(63) Continuation of application No. PCT/US2020/024505, filed on Mar. 24, 2020.
(Continued)

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4817* (2013.01); *G02B 5/04* (2013.01); *G02B 26/0875* (2013.01);
(Continued)

(58) Field of Classification Search
CPC .......... G01S 17/66; G01S 17/86; G01S 17/89; G01S 17/42; G01S 7/497; G01S 7/481;
(Continued)

(56) References Cited

U.S. PATENT DOCUMENTS

| 4,824,251 | A | 4/1989 | Slotwinski et al. |
| 2011/0228099 | A1* | 9/2011 | Rakes .................... H04N 23/11 |
| | | | 348/169 |

(Continued)

FOREIGN PATENT DOCUMENTS

| CN | 103261962 A | 8/2013 |
| CN | 205642307 U | * 10/2016 |

(Continued)

OTHER PUBLICATIONS

Office Action issued in Japanese Application No. 2021-557331, dated Dec. 5, 2023, 8 pages (with English translation, 15 pages).
(Continued)

*Primary Examiner* — Bumsuk Won
*Assistant Examiner* — Alex Park Rickel
(74) *Attorney, Agent, or Firm* — Klarquist Sparkman, LLP

(57) ABSTRACT

Laser radar include two part objective lenses that are used for imaging a target and directing probe beams to the target. Portions of tracer beams that degrade target images are attenuated with dichroic filters that block central portions of tracer beams. Local oscillator beams can be produced with a mixing lens that directs probe beams through a polarizing beam splitter to focus at or on a waveplate so that portions are reflected from the waveplate as local oscillator beams. An imaging system that is confocal with a probe beam is coupled to provide target measurements or to establish a focus of the probe beam.

54 Claims, 45 Drawing Sheets

Related U.S. Application Data

(60) Provisional application No. 62/823,553, filed on Mar. 25, 2019.

(51) Int. Cl.

| | |
|---|---|
| *G02B 5/04* | (2006.01) |
| *G02B 26/08* | (2006.01) |
| *G02B 27/10* | (2006.01) |
| *G02B 27/14* | (2006.01) |
| *G02B 27/28* | (2006.01) |

(52) U.S. Cl.
CPC ....... *G02B 27/1006* (2013.01); *G02B 27/141* (2013.01); *G02B 27/148* (2013.01); *G02B 27/283* (2013.01); *G02B 27/286* (2013.01); *G02B 27/288* (2013.01)

(58) Field of Classification Search
CPC ......... G01S 7/4812; G02B 5/04; G02B 27/10; G02B 27/141; G02B 27/28; G02B 27/283; G02B 27/288
See application file for complete search history.

(56) References Cited

U.S. PATENT DOCUMENTS

| | | | | |
|---|---|---|---|---|
| 2012/0188557 | A1* | 7/2012 | Goodwin | ............ G01B 11/026 |
| | | | | 359/207.9 |
| 2014/0063491 | A1 | 3/2014 | Smith et al. | |
| 2014/0226158 | A1* | 8/2014 | Trainer | ................... G01J 3/453 |
| | | | | 356/336 |
| 2014/0246536 | A1 | 9/2014 | Senft et al. | |
| 2015/0377604 | A1* | 12/2015 | Bridges | ................... G01S 17/86 |
| | | | | 356/4.01 |
| 2017/0102233 | A1* | 4/2017 | Yuasa | ................ G02B 17/0856 |
| 2017/0269214 | A1 | 9/2017 | Marron et al. | |
| 2017/0363421 | A1 | 12/2017 | Kumagai et al. | |
| 2019/0132572 | A1 | 5/2019 | Shen et al. | |

FOREIGN PATENT DOCUMENTS

| | | |
|---|---|---|
| CN | 108780152 A | 11/2018 |
| JP | H08193832 A | 7/1996 |
| JP | 2017223540 A | 12/2017 |
| JP | 2019109219 A | 7/2019 |
| WO | 2017151467 A1 | 9/2017 |

OTHER PUBLICATIONS

Office Action for related CN Application No. 2020-80036336.7, mailed Jun. 17, 2024, 44 pages (with English translation).

Office Action issued in Japanese Application No. 2021-557331, dated Sep. 3, 2024, 7 pages (with English translation, 14 pages).

International Search Report and Written Opinion from International Application No. PCT/US2020/024505, dated Jun. 26, 2020, 15 pages.

Second Office Action for related CN Application No. 202080036336. 7, 62 pages, mailed Apr. 1, 2025.

Office Action for related European Application No. 20 720 223.5, mailed Mar. 6, 2025, 6 pages.

Office Action for related JP Application No. 2025-098084, 17 pages, mailed Feb. 17, 2026.

* cited by examiner

TO/FROM
MIXING
OPTICS

740

722
720
710
710A
712
β
700

708
710B
714
716

706

704

718
702

TO/FROM
TARGET

POINTING AND
PROBE BEAMS

1250

1249

1280

1242

1248 1246

1297

CAMERA
OUTPUT

1296

1240

1239

1294

1291

1262

λ₁

1238

λ₂

1264 1260

1292

1295

1293

PROBE
BEAMS

1204

1207

POINTING
BEAM

λ_TRACER

λ₁

PROBE
LASER

1218

1216

POINTING
LASER

1217

1224

1290

1228

1230

PROBE
LASER

1214

1212

1222

1226

REF
DETECTOR

λ₂

1205

1211

REF
DETECTOR

1206

1210

REF
BEAMS

TO SCANNING
OPTICS/TARGET

COMBINE PROBE AND
TRACER BEAMS
1502

DIRECT COMBINED BEAMS
TO TARGET WITH
OBJECTIVE LENS
1504

DIRECT RECEIVED PORTION OF
PROBE BEAM FROM TARGET TO
DETECTORS WITH BEAM SPLITTER
1506

1500

DIRECT IMAGE BEAM TO IMAGE
SENSOR WITH BEAM SPLITTER
1508

ADJUST FOCUS WITH MOVABLE LENS OF
OBJECTIVE
1510

FIG. 15B

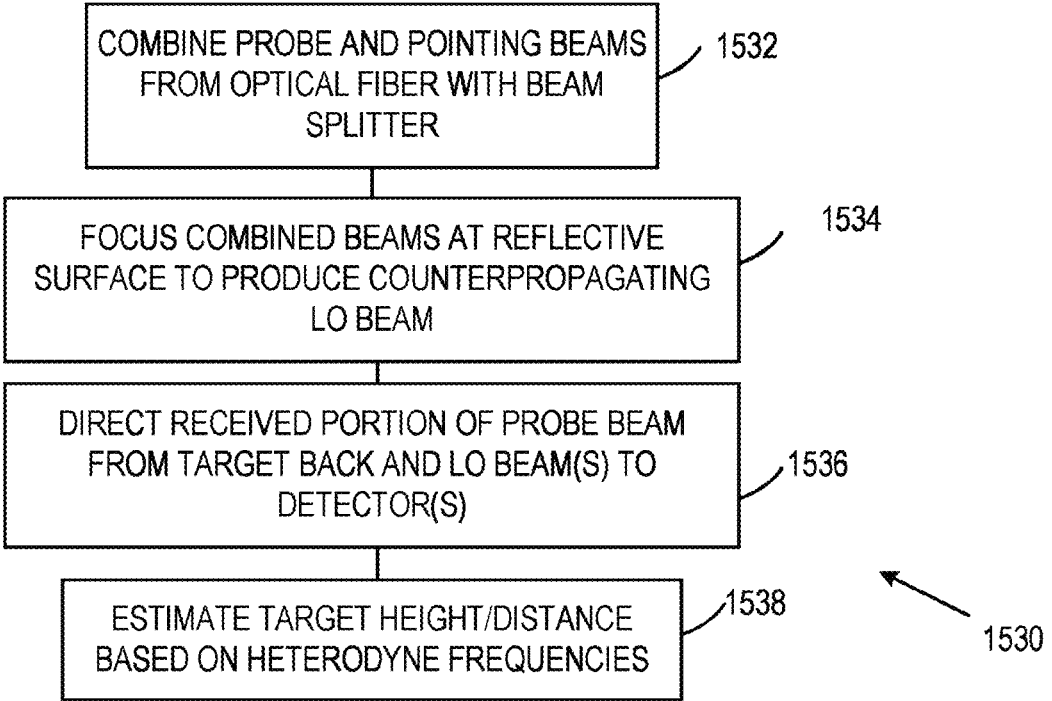

COMBINE PROBE AND POINTING BEAMS FROM OPTICAL FIBER WITH BEAM SPLITTER — 1532

FOCUS COMBINED BEAMS AT REFLECTIVE SURFACE TO PRODUCE COUNTERPROPAGATING LO BEAM — 1534

DIRECT RECEIVED PORTION OF PROBE BEAM FROM TARGET BACK AND LO BEAM(S) TO DETECTOR(S) — 1536

ESTIMATE TARGET HEIGHT/DISTANCE BASED ON HETERODYNE FREQUENCIES — 1538

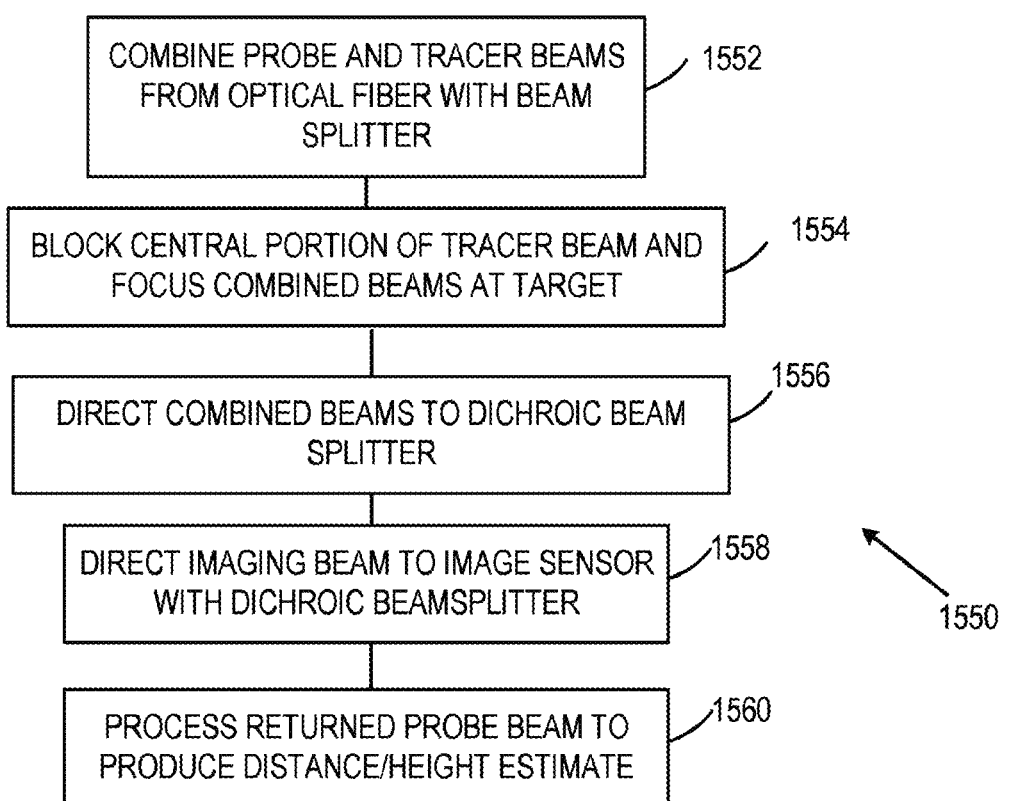

COMBINE PROBE AND TRACER BEAMS FROM OPTICAL FIBER WITH BEAM SPLITTER — 1552

BLOCK CENTRAL PORTION OF TRACER BEAM AND FOCUS COMBINED BEAMS AT TARGET — 1554

DIRECT COMBINED BEAMS TO DICHROIC BEAM SPLITTER — 1556

DIRECT IMAGING BEAM TO IMAGE SENSOR WITH DICHROIC BEAMSPLITTER — 1558

1550

PROCESS RETURNED PROBE BEAM TO PRODUCE DISTANCE/HEIGHT ESTIMATE — 1560

FIG. 18

SEARCH FOR TRACKING
TARGET WITH CONFOCAL
CAMERA
2202

TRACK TARGET WITH
CONFOCAL CAMERA
2204

NO

TRACKING
TARGET
STOPPED?

2206

YES

2200

TRIGGER
MEASUREMENT
2208

LASER RADAR

CROSS REFERENCE TO RELATED APPLICATIONS

This application is a continuation of International Application No. PCT/US2020/024505 filed on Mar. 24, 2020, which claims the benefit of U.S. Provisional Application No. 62/823,553 filed Mar. 25, 2019, each of these prior applications is incorporated herein by reference in its entirety.

FIELD

The disclosure pertains to laser radar and laser tracking systems, optical systems and components for such systems, and associated measurement methods and apparatus.

BACKGROUND

Laser radar systems generally produce estimates of object distances based on detection of a portion of a return beam. High sensitivity detection is provided using heterodyne systems in which the return beam is mixed with a local oscillator signal, and distance is estimated based on measuring a frequency difference between the return beam and the local oscillator. By transmitting beams with suitable chirps, these measurements can be made even in the presence of object motion which can cause Doppler shifts.

In practical implementations, a camera images a target surface that receives both a probe (measurement) beam and a pointing (or tracer) beam that is used for visual alignment. The camera includes a lens that is adjusted to produce a target image, and the probe and tracer beams are imaged onto the target with a separate adjustable lens. Using different lenses for a visual/visible image and a beam focusing lens for an IR probe beam permits simple lens designs. Unfortunately, the use of two movable lenses requires translation or other stages for each, and it is difficult to maintain alignment of a camera axis and a probe beam axis, and the misalignment makes it difficult to use camera images for anything more than rough visual alignment.

Other difficulties in heterodyne laser radar are based on variation of path length between signal paths associated with objects being measured and local oscillator (LO) paths. LO path variations not only cause ranging errors but also signal variations due to changes in the relative state of polarization between returned probe beam portions and LO beam. For example, reflections by optical components such as metal or dielectric mirrors or beam splitters can introduce phase shifts between different states of polarization. Such variations can reduce range sensitivity or lead to drop-outs, i.e., complete signal loss.

Practical applications of laser radar typically require alignment to a part being measured, and one or more sets of tooling balls must be placed about the part. Such setups can be slow, limiting the rate at which parts can be measured. Accordingly, improvements are needed.

SUMMARY

Apparatus comprise a dichroic beam splitter and an optical fiber situated to direct a probe beam to the dichroic beam splitter along an axis. An objective lens is situated on the axis and comprises a fixed lens and a movable lens, the movable lens situated to receive the probe beam from the dichroic beam splitter. An image sensor is optically coupled to the dichroic beam splitter and situated on the axis to receive an imaging beam from the target via the dichroic beam splitter, wherein the movable lens is translatable to form a target image at the image sensor and focus the probe beam at the target. In some examples, the dichroic beam splitter is situated so that the probe beam is transmitted through the dichroic beam splitter to the movable lens and the imaging beam is reflected by the dichroic beam splitter to the image sensor. In other examples, the objective lens is situated to receive a tracer beam from the dichroic beam splitter and direct the probe beam and the tracer beam to the target, wherein the probe beam has a wavelength between 1200 nm and 1800 nm and the tracer beam has a wavelength between 400 nm and 700 nm. In some alternatives, the dichroic beam splitter is situated so that the probe beam is reflected by the dichroic beam splitter to the movable lens and the imaging beam is transmitted by the dichroic beam splitter to the image sensor. In typical embodiments, the dichroic beam splitter is a cube dichroic beam splitter, a plate dichroic beam splitter, or a double-reflecting dichroic beam splitter.

In further embodiments, the dichroic beam splitter is a double-reflecting dichroic beam splitter that includes a first surface facing the movable lens and a dichroic reflecting surface situated to direct the imaging beam to the image sensor and the portion of the probe beam returned from the target toward the optical fiber. In other embodiments, the dichroic beam splitter is a double-reflecting dichroic beam splitter that includes a first surface facing the movable lens and a dichroic reflecting surface situated to direct the imaging beam to the first surface so that the imaging beam is reflected to the image sensor by the first surface, and the portion of the probe beam returned from the target toward the optical fiber is transmitted by the reflecting surface to the optical fiber. In still additional examples, the dichroic beam splitter is a double-reflecting dichroic beam splitter that includes a first surface facing the movable lens and a dichroic reflecting surface situated to direct the portion of the probe beam returned from the target to the first surface, and the imaging beam is transmitted by the dichroic reflecting surface to the image sensor. In other representative examples, the first surface is situated at an angle greater than a critical angle with respect to the imaging beam received from the dichroic reflecting surface and the double-reflecting dichroic beam splitter includes an output surface situated such the portion of the probe beam returned from the target and reflected by the dichroic reflecting surface to the first surface is reflected to be normally incident to the output surface. In some embodiments, the double-reflecting dichroic beam splitter includes a first prism having a vertex angle $\beta$ between the first surface and the dichroic reflecting surface, wherein $\beta$ is greater than $\sin^{-1}(1/n)$, wherein n is a refractive index of the prism. According to some examples, the dichroic reflecting surface of the double-reflecting dichroic beam splitter is defined on a surface of the first prism or the second prism. In some cases, the double reflecting prism includes a first prism and a second prism secured to each other at respective mating surfaces, and the dichroic reflective surface is situated at the mating surfaces. In some specific examples, the dichroic reflecting surface is defined on at least one of the mating surfaces.

In other alternatives, the dichroic beam splitter includes a dichroic plate and a plane reflector, wherein the dichroic plate is situated to direct the portion of the probe beam returned from the target to the plane reflector and transmit the imaging beam to the image sensor. In still other examples, the dichroic beam splitter includes a dichroic plate and a plane reflector, wherein the dichroic plate is situated to reflect the imaging beam to the plane reflector and transmit the portion of the probe beam returned from the target.

In some representative examples, the optical fiber is a polarization retaining single mode (PRSM) optical fiber and further comprises a polarizing beam splitter (PBS) situated so that the probe beam from the PRSM optical fiber is received by the PBS in a state of polarization (typically a linear state of polarization) that is substantially transmitted by the PBS to the dichroic beam splitter. Apparatus can include a waveplate situated between the PBS and the dichroic beam splitter to produce a circular state of polarization in the probe beam and to reflect a portion of the probe beam towards the optical fiber to produce a local oscillator beam. In further examples, the waveplate has an input surface situated to receive the probe beam from the PBS and an output surface situated to receive the probe beam from the input surface of the waveplate. One of the input surface or the output surface is antireflection coated and the other of the input surface and the output surface reflects a portion of the probe beam as the local oscillator beam.

Typically, a mixing lens is situated to receive the measurement beam from the optical fiber and a dichroic filter is situated along the axis on an axial portion of the mixing lens, the dichroic filter transmissive to the measurement beam and substantially less transmissive to the tracer beam. In other examples, the dichroic filter is a dichroic reflector that is transmissive to the measurement beam and reflective to the tracer beam. In some examples, the dichroic filter is a wave-length-dependent polarizer that is substantially non-transmissive to the tracer beam. According to representative embodiments, a dichroic reflector is situated along the axis on an axial portion of the mixing lens, the dichroic reflector transmissive to the measurement beam and reflective to the tracer beam, wherein a dimension of the dichroic reflector is based on a corresponding dimension of the image sensor. In some embodiments, a mixing lens is situated to receive the measurement beam and focus the measurement beam within a beam angular diameter a. A dichroic reflector is situated along the axis on an axial portion of the mixing lens, the dichroic reflector transmissive to the measurement beam and reflective to the tracer beam, wherein a dimension of the dichroic reflector is based on a corresponding dimension of the image sensor. In representative examples, a dimension of the dichroic reflector is at least 0.5, 0.75, 1.0, or 1.5 times a product of a corresponding dimension of the image sensor and a ratio of an optical distance along the axis from the mixing lens focus to the dichroic reflector to an optical distance from the mixing lens focus to the image sensor. For convenience, the dichroic filter is situated on a lens surface of the movable lens.

Apparatus comprise an optical fiber and a mixing lens situated to receive a measurement beam from the optical fiber and produce a measurement beam focus. An optical element having a surface is situated proximate the measurement beam focus to reflect a portion of the measurement beam back toward the optical fiber as a local oscillator beam. An objective lens is situated to receive the measurement beam from the optical element, direct a portion of the measurement beam as a probe beam to a target and direct a portion of the probe beam returned from the target toward the optical fiber to form a signal beam. In some examples, the optical element is a waveplate having an entrance surface that receives the measurement beam from the mixing lens and an exit surface opposite the entrance lens, wherein the exit surface is situated proximate the measurement beam focus to reflect the portion of the measurement beam. In other examples, the waveplate has an entrance surface that receives the measurement beam from the mixing lens and an exit surface opposite the entrance lens, wherein the entrance surface is situated proximate the measurement beam focus to reflect the portion of the measurement beam. In typical examples, one of the entrance surface and the exit surface of the waveplate includes an antireflection coating situated to receive the measurement beam from the mixing lens and the other of the entrance surface and the exit surface has an uncoated portion situated to receive the measurement beam from the mixing lens. In some alternatives, a polarizing beam splitter is situated to receive the measurement beam from the mixing lens and couple the measurement beam to the waveplate. In some cases, the optical element having the surface situated proximate the measurement beam focus is a polarizing beam splitter (PBS). In other examples, the optical element includes a PBS and a waveplate secured to the PBS. In still further examples, the PBS has an entrance surface coupled to receive the measurement beam from the optical fiber and the waveplate includes an exit surface situated to couple the measurement beam from the PBS to the objective and to reflect the portion of the measurement beam back into the optical fiber as the local oscillator beam.

In some examples, the PBS is situated to reflect a probe beam portion of the measurement beam to the waveplate and an optical detector is coupled to the optical fiber to receive a portion of the probe beam from the target and the local oscillator beam and produce a heterodyne electrical signal. A detection system provides a target distance estimate base on the heterodyne electrical signal.

In some examples, apparatus include first and second measurement beam sources that produce first and second measurement beams at first and second wavelengths, respectively. A beam combiner is situated to receive the first and second measurement beam sources and couple the first and second measurement beams to form a combined measurement beam, wherein the optical fiber directs the combined measurement beam to the mixing lens. The mixing lens focuses the combined beams at an optical element reflects a portion of the combined measurement beam back toward the optical fiber as first and second local oscillator beams. According to other examples, first and second optical detectors are coupled situated to receive a portion of the probe beam from the target and the first and second local oscillator beams and produce first and second heterodyne electrical signals. In some cases, the first and second optical detectors are coupled to the optical fiber, or are coupled to receive the portion of the probe beam from the fiber and or from a polarizing beam splitter. A detection system provides a target distance estimate based on the first and second heterodyne electrical signals. In further examples, the mixing lens receives a measurement beam and a tracer beam from the optical fiber, and a dichroic filter is situated on an axis of the objective lens, wherein the dichroic filter is non-transmissive to the tracer beam.

Methods comprise directing a tracer beam having an associated beam numerical aperture to a beam splitter. A portion of the tracer beam numerical aperture is blocked, obscured, attenuated, scattered so that the beam splitter receives the measurement beam and a partially obscured/attenuated tracer beam. The partially obscured tracer beam from the beam splitter is directed to a target with an objective lens and an imaging beam is received with the beam splitter directed to a detector with the beam splitter, wherein an obscured portion of the tracer beam corresponds to the imaging detector.

Methods comprise focusing a measurement beam from an optical fiber to a measurement beam focus and reflecting a portion of the measurement beam towards the optical fiber to produce a local oscillator beam. In some cases, the measurement beam is focused through a beam splitter to an optical element having a surface that reflects the portion of the measurement beam to the optical fiber. In specific examples, the optical element is a waveplate and the reflective surface is a surface of the waveplate. In other embodiments, the optical element is a polarizing beam splitter (PBS) and the reflective surface is a surface of the PBS.

In some examples, apparatus include a laser radar situated to direct a probe beam to a target along an axis and produce an estimate of a least one target dimension, the laser radar comprising a probe beam scanner coupled to scan the probe beam axis. An imager is optically situated along the axis to produce an image of the target, wherein the probe beam scanner is coupled to the imager so as to direct the probe beam to a target location based on at least one feature identified in a target image. In some examples, the imager is an image sensor, and an image processor identifies the at least one feature in the target image. In some examples, the at least one feature is a design feature, and the target location is associated with the design feature. In other examples, the at least one feature is a tooling ball or an eyeball sphere, and the target location is determined based on the location of the tooling ball or eyeball sphere. In further examples, the target location is determined based on the location of the eyeball sphere.

In further examples, apparatus comprise a laser radar situated to direct a probe beam to a target along an axis, the laser radar comprising a probe beam scanner coupled to scan the probe beam axis. An imaging system comprises an image sensor optically situated along the axis to produce an image of the target and a focus mechanism coupled to an objective lens to adjust a focus of the target image at the image sensor. An image processor is coupled to the imaging system to produce an estimate of at least one target dimension based on the image of the target and an estimate of a distance to the target. In some examples, the laser radar is configured to produce the estimate of the distance to the target or the estimate of the distance to the target is based on an adjustment of the focus mechanism such as an autofocus mechanism. In one example, the target location is determined based on the location of an eyeball sphere. In some examples, the imaging system is configured produce a plurality image portions, and the image processor is configured to stitch the plurality of image portions into a common image. In additional examples, the image processor is configured to at least partially compensate distortion in at least one image portion such as, for example, at least one image portion based on test grid images.

Measurement apparatus comprise a laser radar that provides a scannable laser probe beam and a remote mirror system that includes a translatable mirror. The laser radar is configured to direct the scannable laser probe beam to the translatable mirror of the remote mirror system to be reflected to a target to measure at least one feature of the target. In some examples, the remote mirror system includes at least one tooling ball or eyeball sphere, and the laser radar is situated to direct the scannable laser probe beam to the at least one tooling ball or eyeball sphere to determine the location of the remote mirror system. In typical examples, the laser radar is coupled to the remote mirror system to initiate adjustment of the translatable mirror so that the scannable laser probe beam is directed to the at least one feature of the target.

The foregoing and other objects, features, and advantages of the disclosed technologies will become more apparent from the following detailed description, which proceeds with reference to the accompanying figures.

BRIEF DESCRIPTION OF THE DRAWINGS

FIGS. 6A-6B are schematic diagrams of representative optical systems that include a movable lens component and a twice-reflecting dichroic beam splitter.

FIG. 6C illustrates chromatic aberration of a representative optical system such as provided in the example of FIGS. 6A-6B.

FIG. 7A is a schematic diagram of a representative optical system that includes a movable lens component and a twice-reflecting dichroic beam splitter.

FIG. 7B illustrates an example twice-reflecting dichroic beam splitter.

FIG. 12C illustrates representative mixing optics.

FIGS. 15A-15C illustrate laser radar/tracker methods that can be used individually or in any combination.

FIG. 18 illustrates a representative multi-beam laser radar that includes a detector array.

FIGS. 30A-30B illustrate representative reference arm assemblies.

FIG. 31 illustrates a representative laser radar that provides focus tracking.

DETAILED DESCRIPTION

Figure 1:
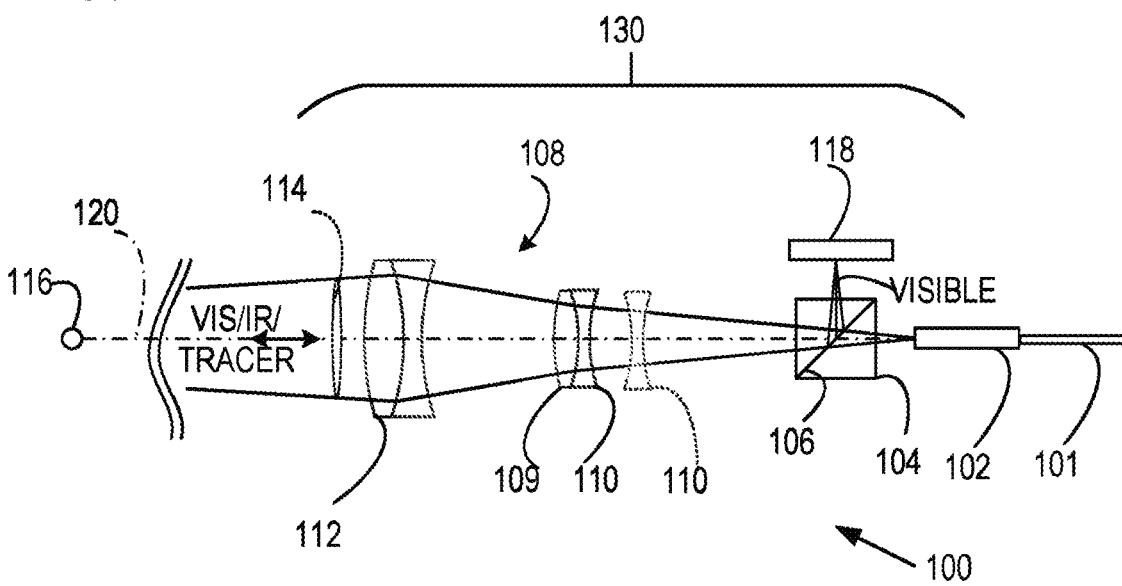
FIG. 1 is a schematic diagram of a portion of a representative laser radar that includes a common movable lens used for bore-sight imaging and probe beam focusing.

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items. In some cases, elements are referred to as directly coupled to exclude intermediate elements.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, the terms "light" and "optical radiation" refer to propagating electromagnetic radiation in a wavelength range of 300 nm to 10 $\mu$m, but other wavelengths can be used. Such radiation can be directed to one or more targets to be profiled, detected, or otherwise investigated. This radiation is referred to herein as propagating in one or more "beams" that are typically based on optical radiation produced by a laser such as a laser diode. As used in this application, beams need not be collimated, and propagating radiation in a waveguide is referred to as a beam as well. Beams can have a spatial extent associated with one or more laser transverse modes, and can be substantially collimated. Wavelengths for which optical fibers or other optical waveguides and coherent laser sources are readily available are convenient. In some examples, laser diodes at wavelengths around 1550 nm are used.

For convenience, beams are described as propagating along one or more axes. Such axes generally are based on one or more line segments so that an axis can include a number of non-collinear segments as the axis is bent or folded or otherwise responsive to mirrors, prisms, lenses, and other optical elements. The term "lens" is used herein to refer to a single refractive optical element (a singlet) or a compound lens that includes one or more singlets, doublets, or other compound lenses. In some examples, beams are shaped or directed by refractive optical elements, but in other examples, reflective optical elements such as mirrors are used, or combinations of refractive and reflective elements are used. Such optical systems can be referred to as dioptric, catoptric, and catadioptric, respectively. Other types of refractive, reflective, diffractive, holographic and other optical elements can be used as may be convenient. In some examples, beam splitters such as cube beam splitters are used to separate an input beam into a transmitted beam and a reflected beam. Either of these beams can be arranged to serve as measurement beam or a local oscillator beam in a coherent detection systems as may be convenient. Beam splitters can also be provided as fiber couplers, and polarizing beam splitters are preferred in some embodiments. The term "beam splitter" is also typically used to refer to beam combiners. Fiber couplers and fiber wavelength division multiplexers (WDMs) can combine or separate beams.

In the disclosed examples, laser radar systems are configured to scan a probe or measurement beam over a scan path that can be a polygon, portions of a closed curve, a raster, a w-pattern, or other pattern, and scanning can be periodic or aperiodic. In response to a measurement beam or a probe beam directed to a target, a return beam is obtained based on reflection, scattering, diffraction, refraction, or other process at the target. Evaluation of the return beam permits estimation of target properties. The examples below are provided with respect to a laser radar that is configured to, for example, provide an estimate of surface topography based on portions of an optical beam directed to a surface that are returned to a receiver. The disclosed methods and apparatus can also be incorporated into laser tracker systems.

In some examples described herein, a measurement optical beam is divided into a probe beam that is directed to a target, a reference beam that can be used for calibration by being directed to a reference length, and/or a local oscillator beam used for heterodyne detection and target distance estimation in combination with the probe beam. In other examples, a beam directed to a target is referred to as a probe beam and a portion returned for detection is referred to as a signal beam. In the disclosed examples, portions of one or more optical beams are directed to a target, detectors, or communicated from one to one or more destinations. As used herein, a beam portion refers to any fraction of an optical beam, including the entire optical beam. In many examples, a pointing or tracer beam propagates along with one or more probe beams to a target. The tracer beam is at a visible wavelength and permits a user to confirm that the probe beam is directed to the intended target location. Such a tracer beam is otherwise unused, and in some cases, undesirable tracer beam reflections can interfere with boresight camera images of a target. Probe beams are typically at wavelengths greater than about 900 nm, and frequently suitable beam sources have wavelengths around 1300 nm and 1500 nm. Other wavelengths can be used.

The disclosed systems generally include one or more beam splitters such as polarizing beam splitters (PBSs) and dichroic beam splitters (DBSs) such as cube or plate beam splitters. Beam splitting surfaces can be provided on plate surfaces, prism surfaces, lens surfaces or other curved or planar surfaces. As used herein, a DBS is a beam splitter that preferentially reflects (or transmits) in a first wavelength range and preferentially transmits (or reflects) in a second wavelength range. For convenient description, an angle (tilt angle) of a beam splitter surface is measured from an axis perpendicular to the beam splitter surface with respect to an optical axis. While PBSs and DBSs permit efficient use of probe beams and superior target image intensities, polarization and wavelength independent (neutral) beam splitters can also be used.

In some examples, rotations are described with reference to azimuthal angles and elevational angles. While such angles are typically defined with respect to vertical and horizontal axes, as used herein, orientation with vertical and horizontal is not required. Typically, systems are described with reference to such angles with systems assumed to be in a standard in-use orientation.

In typical examples described below, probe beams directed to targets are polarized, but unpolarized or randomly polarized beams can be used. Optical filters are referred to as non-transmissive for transmittances of 5%, 2%, 1%, or less. Beams such as probe and tracer beams can be focused at or near surfaces of interest. As used herein, a beam is referred to as being focused at a surface if a beam waist is within ±0.5, 1, 2, 5, or 10 Rayleigh ranges of the surface.

Swept Frequency Laser Radar

In the following, various configurations and aspects of laser radar systems are disclosed. The disclosed systems, system components, modules, and associated methods can be used in various laser radar systems. In typical examples, so-called swept frequency laser radar systems are provided. Typical coherent radar systems generally use one or more laser diode light sources. The laser diode frequency is directly modulated by modulating a laser diode injection current or modulating laser diode temperature or in some other way. The laser frequency is generally modulated with a waveform so as to produce a linear frequency sweep or linear "chirp." Laser frequency $f(t)$ can then be expressed as a function of time t as:

$$f(t) = f_0 + (\Delta f/\Delta t)t = f_0 + \gamma t,$$

wherein $f_0$ is a laser initial frequency and $\gamma = \Delta f/\Delta t$ is a rate of laser frequency change. Linear sweeps are not required and arbitrary laser frequency variations as a function of time are theoretically useful such as stepped or other discontinuous frequency variations, or continuous variations based on polynomial or other functions, but linear chirps are generally more convenient and practical. A frequency modulated (FM) measurement beam is focused at a target, and a portion of the beam is scattered, reflected, refracted or otherwise directed so as to be collected by receiver optics. A local oscillator beam ("LO beam") is generally obtained as a portion of the same laser beam used to produce the measurement beam. A round trip transit time associated with measurement beam propagation to and from the target results in a frequency difference obtained when the returned portion of the measurement beam (the return beam) and the local oscillator are optically mixed. This frequency difference can be used to determine target distance. The return beam and the LO are directed to a detector such as a PIN photodiode (typically referred to as a square law detector) to produce sum and difference frequency signals. The sum frequency (at a several hundred THz for a 1.5 μm measurement beam) is beyond available detector bandwidth, but the return and LO beams also produce a difference frequency $\Delta f$ (heterodyne frequency) within the detector bandwidth. A distance R to a target location can be calculated as $R = c\Delta f/2\gamma$, wherein $\Delta f$ is the heterodyne frequency associated with the return beam, $\gamma$ is the chirp rate, and c is the speed of light. Heterodyne frequency generation also requires that the LO and return beam are not orthogonally polarized, but since range is determined based on frequency differences and not amplitudes, polarization effects reduce heterodyne signal level but heterodyne frequency is unchanged.

Successful laser radar systems control or measure laser frequency precisely as the accuracy of range measurements can be limited by the linearity of laser frequency modulation. For example, if a target is one meter distant, a linearity of one part per thousand is necessary to ensure 1 mm accuracy. Accordingly, laser sources for FM laser radar are configured to provide highly linear chirps, and variances from linearity are detected and compensated. In some cases, range measurements can have precisions in the few micron range.

FM laser radar systems are largely immune to ambient lighting conditions and changes in surface reflectivity because signal detection is based on heterodyne beat frequency, which is independent of signal amplitude and unaffected by stray radiation. Thus, amplitude or intensity variations in the return beam, the measurement beam, or the LO beam tend to have little effect on range measurements. In addition, coherent heterodyne detection can successfully detect optical signals to the shot noise limit so that FM coherent laser radars can make reliable measurements with as little as one picowatt of return beam power, corresponding to a nine order-of-magnitude dynamic range.

In some examples below, systems using probe beams at either one or two wavelengths are illustrated. Generally, one or more probe beams can be used, and the use of two counter-chirped beam permits compensation, correction, or elimination of Doppler shift errors associated with relative motion between a laser radar and a target.

In some examples, the disclosed systems use a single objective lens (with fixed and movable lenses) to direct and focus probe and signal beams to and from a target and produce an image of the target. This tends to preserve alignment of boresight images and probe beams. Due to differences in probe beam and image beam wavelengths and the high numerical aperture (NA) to be used, chromatic aberration correction can be challenging, and imaging through a dichroic prism-type beam splitter can introduce significant amounts of other aberrations such as coma. If an additional lens is used to shape a combined probe/tracer beam prior to focusing by an objective lens, the additional lens can be used to compensate probe beam aberrations (such as chromatic aberration between the visible wavelength tracer beam and the infrared wavelength of the probe beam) independently of the imaging beam. In some cases, use of such an additional lens causes excessive tracer beam reflection, and shaping a tracer beam can reduce beam portions such as reflected portions that might interfere with target imaging. In some examples, the additional lens provides a beam focus at optical surface as such as a waveplate surface to produce a local oscillator (LO) beam using a cat-eye retroreflector arrangement to provide LO stability.

In the following, representative examples of the disclosed technology are provided for convenient illustration. Any of the features and aspects of any example can be combined with features and aspects of other examples.

Example 1

Referring to FIG. 1, an optical system 100 for a laser radar or other apparatus includes an optical fiber 101 that emits a measurement (or probe) beam and a pointing (or tracer) beam from an optical fiber end 102. A beamsplitter 104 is situated to receive the probe beam and the tracer beam and direct portions to an objective lens 108 that includes fixed lenses 109, 112 and a movable lens 110 (shown in two locations). The movable lens 110 is generally movable in position along an axis 120 to adjust a focus provided by the objective lens 108. The fixed lens 112 couples a combined probe/tracer beam 114 to a target 116. In typical examples, probe beam wavelength is between 1200 nm and 1700 nm, and tracer beam wavelength is between 400 nm and 700 nm, and typically between 650 nm and 700 nm so that readily available laser diodes can be used.

The objective lens 108 also receives portions of the probe and tracer beams returned from the target 116 along with an imaging beam typically based on broadband or ambient illumination of the target 116. The returned portion of the probe beam is directed through the beam splitter 104 to the fiber end 102 so as to propagate in the fiber 101. The imaging beam is coupled by a beam splitter surface 106 to an image sensor 118 along with a portion of the tracer beam. The beam splitter surface 106 is generally a thin film dichroic filter that preferentially transmits the probe beam and reflects the imaging beam (or reflects the probe beam and transmits the imaging beam, as desired). The probe and tracer beams are focused on the target 116 and the imaging beam is focused on the image sensor 118 by adjusting a position of the movable lens 110 along the axis 120. The objective lens 108 thus must operate over a large wavelength range (for example, 250 nm to 1700 nm). However, by using a single lens 108 for probe, tracer, and imaging beams, beam alignment is maintained, and beams are not displaced during beam scanning. As shown in FIG. 1, the lens 108 and the beam splitter 104 form a projection system 130 that projects probe and tracer beams onto the target and an image of the target 116 on the image sensor 118. In some cases, the image sensor 118 and the fiber end 102 are optically conjugate, or approximately so at visible wavelengths. However, due to chromatic aberration, at probe beam wavelengths the image sensor 118 and the fiber end 102 are generally not optically conjugate absent correction of chromatic aberration. In some examples, such chromatic aberration can be provided and is convenient, but is not required.

Example 2

Figure 2:
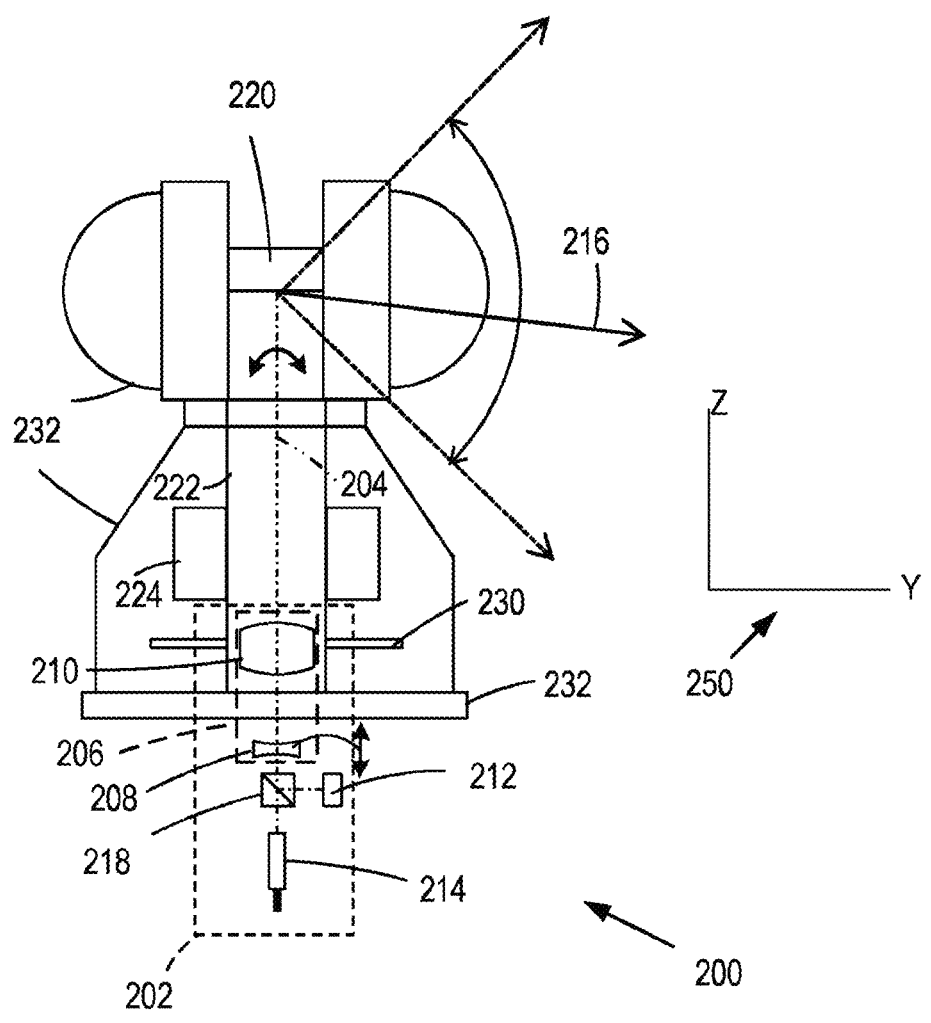
FIG. 2 is a schematic diagram of a representative laser radar that includes a fixed lens and a movable lens for bore-sight imaging and probe beam focusing.

With reference to FIG. 2, a portion of a representative laser radar 200 includes a projection optical system 202 situated along an axis 204 that includes an objective lens 206 having a fixed lens 210 and a movable lens 208. The movable lens 208 is translatable along the axis 204 to form an image of a target at an image sensor 212 and focus probe and tracer beams from a fiber end 214 at the target along a scannable axis 216. A beam splitter 218 (typically a dichroic beam splitter) couples an image beam to the image sensor 212 and the probe and tracer beams between the target and the fiber end 214.

The focus and probe beams are scanned with an elevational reflector 220 that is secured to shaft 222 that is retained by a bearing 224 to be rotatable about the axis 204 that is parallel to a z-axis of a coordinate system 250. Rotation of the shaft is measured with an encoder 230 that situated at the shaft 216. Some components are situated in a housing 232.

Example 3

Figure 3:
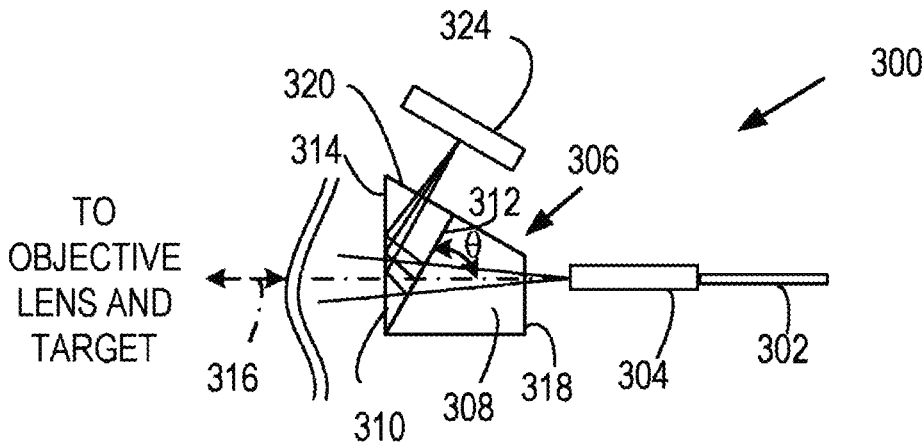
FIG. 3 is schematic diagram illustrating a representative laser radar system that includes a double reflecting dichroic beam splitter.

FIG. 3 illustrates an optical system 300 that communicates probe and tracer beams to and from a target. An optical fiber 302 having a fiber end 304 couples a probe beam and/or a tracer beam or both to a beam splitter 306. The beam splitter 306 includes a first prism 308 and a second prism 310 having a dichroic (or other reflective surface) reflector 312 situated at respective prism faces. In some cases, the dichroic reflector 312 is defined by thin film coatings applied to one or both of the prisms 308, 310, or a separate coating on a separate substrate is used. It is convenient to secure the prisms 308, 310 to each other at the dichroic reflector 312. The dichroic reflector is situated at an angle θ with respect to a propagation axis 316. The propagation axis 316 is generally perpendicular to a prism surface 314 that faces an objective lens, a prism surface 318 that faces the fiber end 304, and a prism surface 320 that faces an image sensor 324. As discussed above, the image sensor 324 and the fiber end 304 can be optically conjugate, particularly at imaging/tracer wavelengths.

The dichroic reflector 312 is situated to direct an imaging beam received from the target and objective lens to the prism surface 314 so that the imaging beam is reflected by, for example, total internal reflection, to the prism surface 320. The angle θ is generally selected to provide total internal reflection at the surface 314, but coatings can be provided to provide suitable reflectivity. Angles θ that are greater than 45 degrees reduce angles of incidence of beams to the dichroic reflector 312 so that the dichroic reflective exhibits fewer angle-dependent variations, such as variations in reflectivity as a function of wavelength and/or variations in reflectivity as a function of state of polarization. For example, the angle θ can be greater than 50°, 55°, 60°, 65°, 70°, 75°, or more, reducing beam angles of incidence.

Example 4

Figure 4:
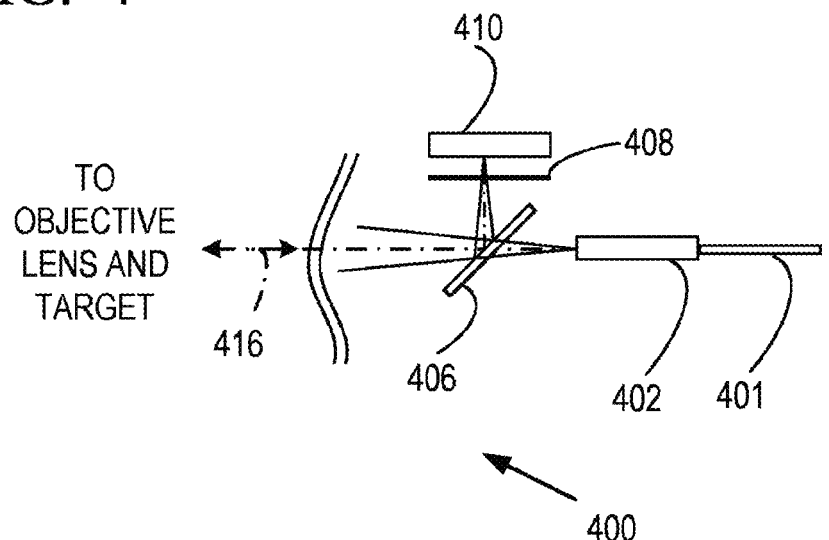
FIG. 4 is a schematic diagram illustrating a portion of a representative laser radar system that includes a thin beam splitter that directs a visible beam portion to an image sensor and a probe beam to/and or from an optical fiber.
Figure 5A:
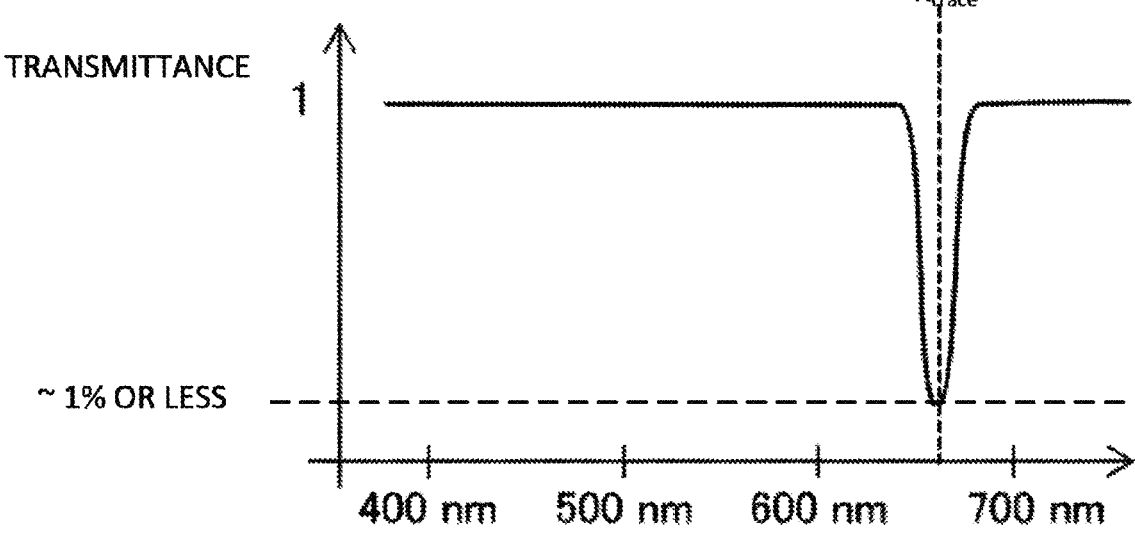
FIG. 5A illustrates transmittance of a model optical filter designed to control reflected portions of a tracer beam.

With reference to FIG. 4, a beam combiner/separator optical system 400 includes an optical fiber 401 having a fiber end 402 that delivers a tracer and/or a probe beam to a plate beam splitter 406. The probe and/or tracer beams are coupled by the plate beam splitter 406 (in this example, transmitted) to an objective lens along an axis 416. An imaging beam returned from the objective lens is coupled by the plate beam splitter 406 through a narrow band filter 408 and focused at an image sensor 410. In this example, the plate beam splitter 406 is a dichroic beam splitter so that the probe beam is efficiently coupled to the target and the imaging beam is coupled efficiently to the image sensor 410. The narrow band filter 408 attenuates at tracer beam wavelengths. A model transmission curve for such a filter is shown in FIG. 5A; a graph 500 of a representative transmission curve 502 of an example dichroic filter as fabricated is shown in FIG. 5B; and FIGS. 5C-5D are representative images obtained without and with such a filter, respectfully.

Figure 5B:
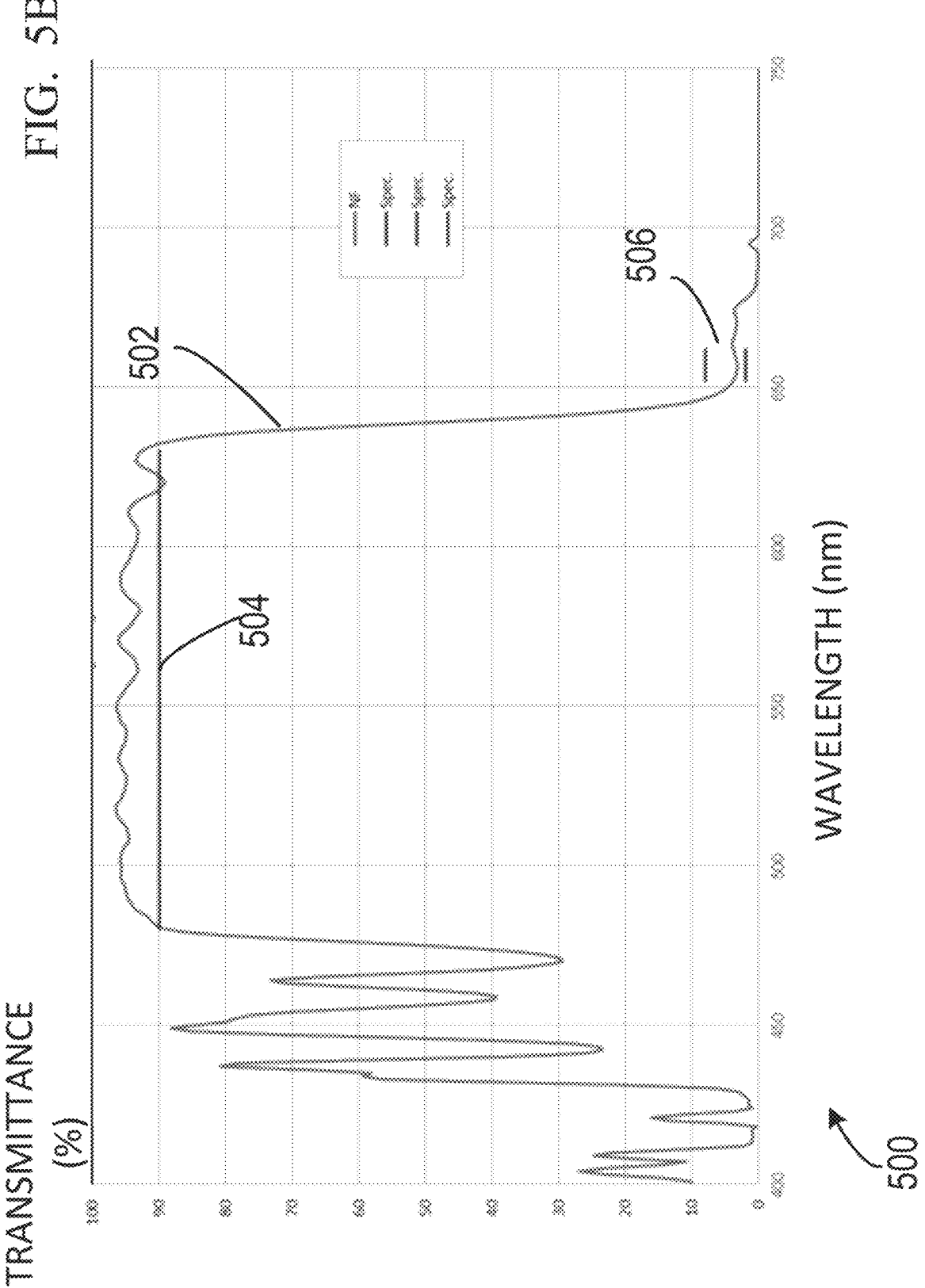
FIG. 5B illustrates transmittance of a representative optical filter that controls reflected portions of a tracer beam.
Figure 5C:
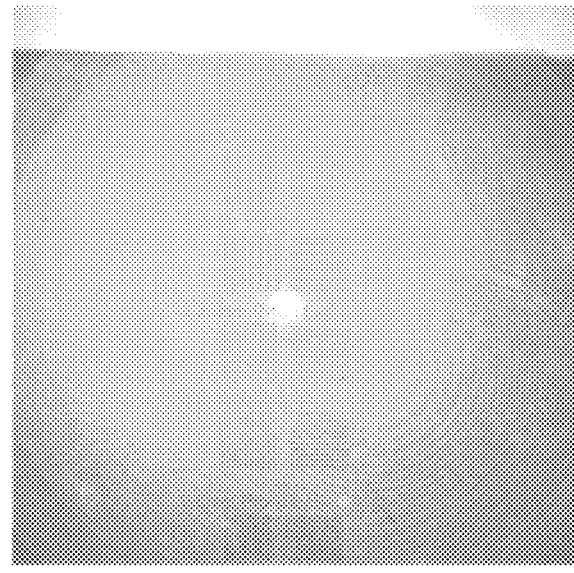
FIGS. 5C-5D illustrate boresight images obtained without (FIG. 5C) and with (FIG. 5D) an optical filter having transmittance as shown in FIG. 5B.
Figure 5D:
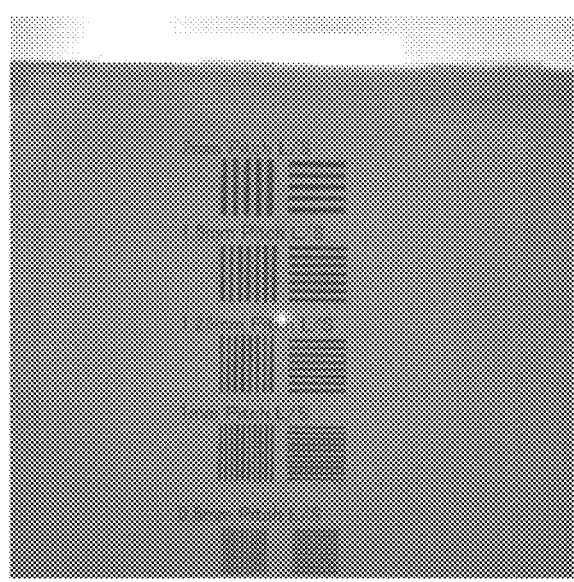

A dichroic filter (beamsplitter) having the characteristics shown in FIG. 5B can be situated at, for example, the prism surface 320 (see FIG. 3). Typically, a suitable filter is situated at a prism face that is closest to an image sensor (such as image sensor 324 of FIG. 3) and is provided as a coating on the selected prism face. The dichroic filter can serve as a bandpass optical filter with a transmission bandwidth of 480-630 nm in a range 504 in which average transmittance is greater than or equal to 90% at a 0 degree angle of incidence. The dichroic filter also serves a notch filter in a 652 nm-662 nm wavelength range is which transmittance is 5%±3% as noted at 506. Longer wavelengths are not used, and dichroic filter performance at these wavelengths is irrelevant. The example of FIG. 5B is more readily fabricated than the model of FIG. 5A. It is generally preferred that transmittance for imaging with an image sensor be greater than 50%, 75%, 80%, or 90% in a range of about 480 nm to 630 nm while transmittance for a tracer wavelength is less than 10%, 5%, 2.5%, 1%, or 0.5%.

Example 5

Figure 6A:
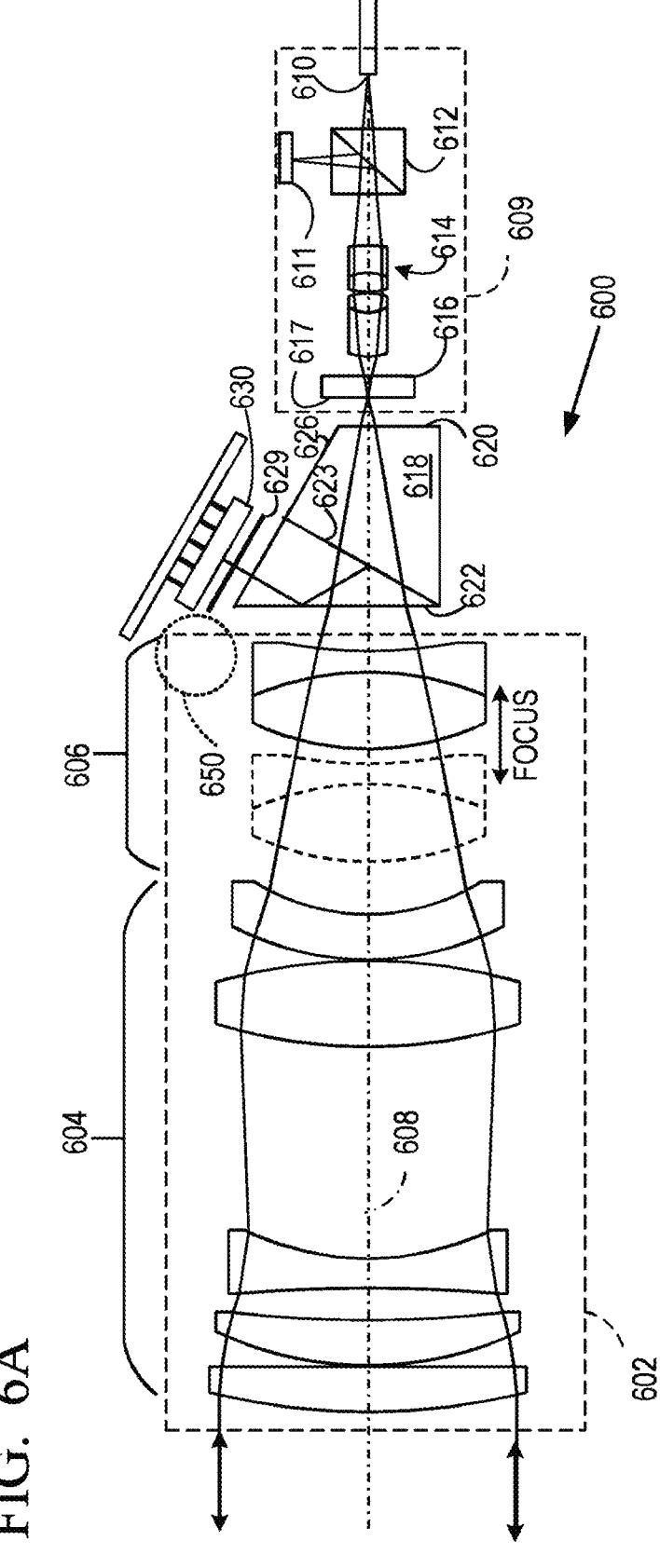

Referring to FIG. 6A, a representative laser radar system 600 includes an objective lens 602 having a fixed lens 604 and a movable (focusing) lens 606 situated along an axis 608. The focusing lens 606 is generally secured to a stage to be movable along the axis 608. (The focusing lens 606 is shown in dashed lines in a second focus location). A fiber end 610 couples probe and/or tracer beams to mixing optics 609 which includes polarizing beam splitter 612, a mixing lens 614, and a quarter waveplate 616. As discussed further below, the mixing lens 614 focuses the probe beam at a surface 617 of the waveplate 616 so that a reflected portion of the probe beam is returned towards the fiber end 610 to serve as a local oscillator beam. The combined probe/tracer beam is focused at a target by the objective lens 602 through a double-reflecting beam splitter 618 having faces 620, 622, 626 that are perpendicular to the axis 608. A dichroic surface 623 (or other beam splitting surface) directs an imaging beam from a target to an image sensor 630 and transmits a return portion of the probe beam from the target to or towards the fiber end 610. In order to reduce tracer beam portions that reach the image sensor 630, a suitable narrow band filter 629 can be provided such as illustrated in FIGS. 5A-5B. A notch filter or other filter can be used to reduce tracer beam portions that might otherwise reach the image sensor 630. A double-pass through the quarter wave plate 616 results in the returned probe beam and a portion of the probe beam reflected at a surface 617 (forming an LO beam) being in a common linear polarization that is orthogonal to the polarization of the probe beam as emitted from the fiber end 610. The returned probe beam and the LO beam then interfere at the detector 611 for homodyne or heterodyne detection. As shown in FIG. 6A, the PBS 612 is situated to transmit the probe beam from the fiber end 610 and reflect the returned signal and LO beams, but the PBS 612 could be arranged to reflect the probe beam and transmit the returned probe and LO beams. As noted above, the dichroic surface 623 is tilted to permit improved dichroic coating performance as it can be designed for use at smaller angles of incidence, i.e., at angles less than the 45 degree angle that is typical of cube beam splitters. In addition, variation of reflectivity as a function of misfocus is reduced, and target image position tends not to shift in response to misfocus. While prism surfaces are conveniently perpendicular to the axis 608, other angles can be used. The double-reflecting beam splitter 618 also provides additional clearance 650.

Example 6

Figure 6B:
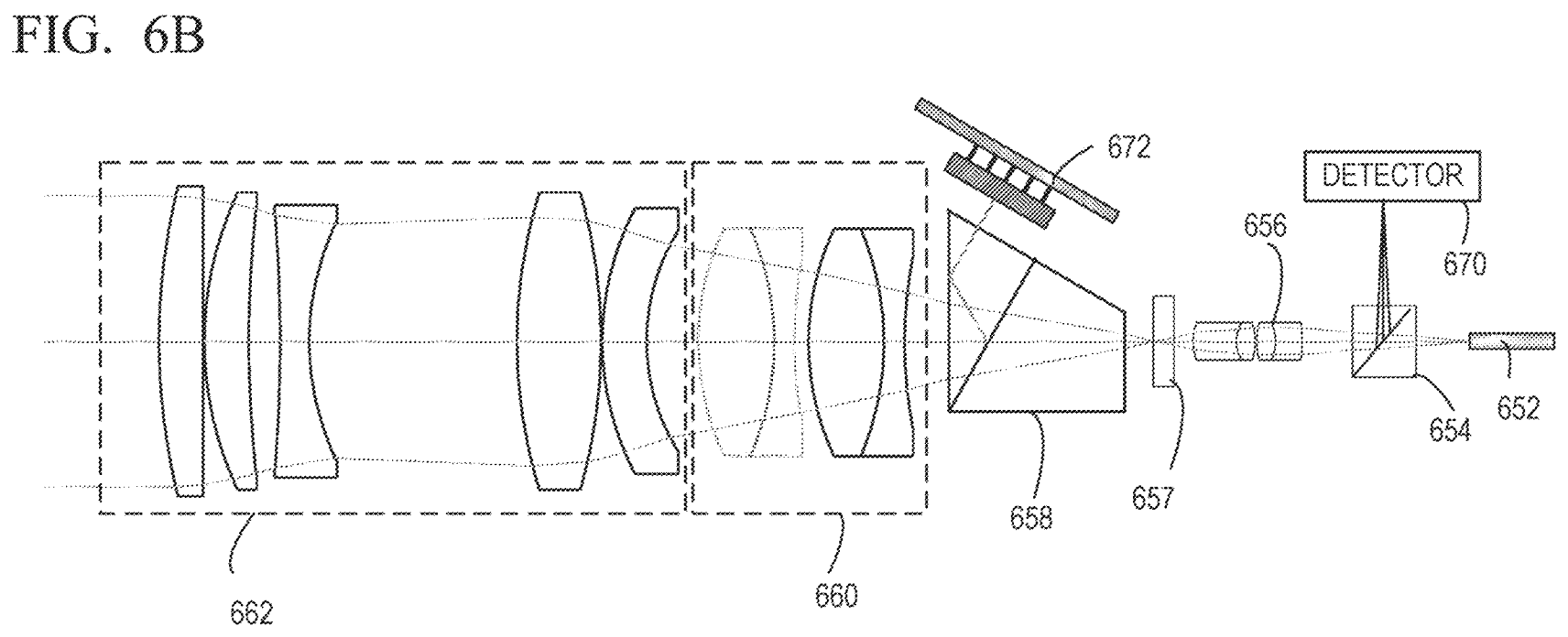

In another example shown in FIG. 6B, one or more probe beams are emitted by a fiber 652 and directed to a target via a PBS 654, a probe beam lens or lens assembly 656, a quarter waveplate 657, a twice reflecting prism 658, a movable lens 660 and a fixed lens 662. Portions of the probe beam(s) are returned to a detector or detector assembly 670 and a viewing beam is coupled by the twice reflecting prism 658 to an image sensor 672. An LO beam is directed by the PBS 654 to the detector 670 as well. In other examples, the LO beam is produced by reflection from a surface of the waveplate 657.

Figure 6C:
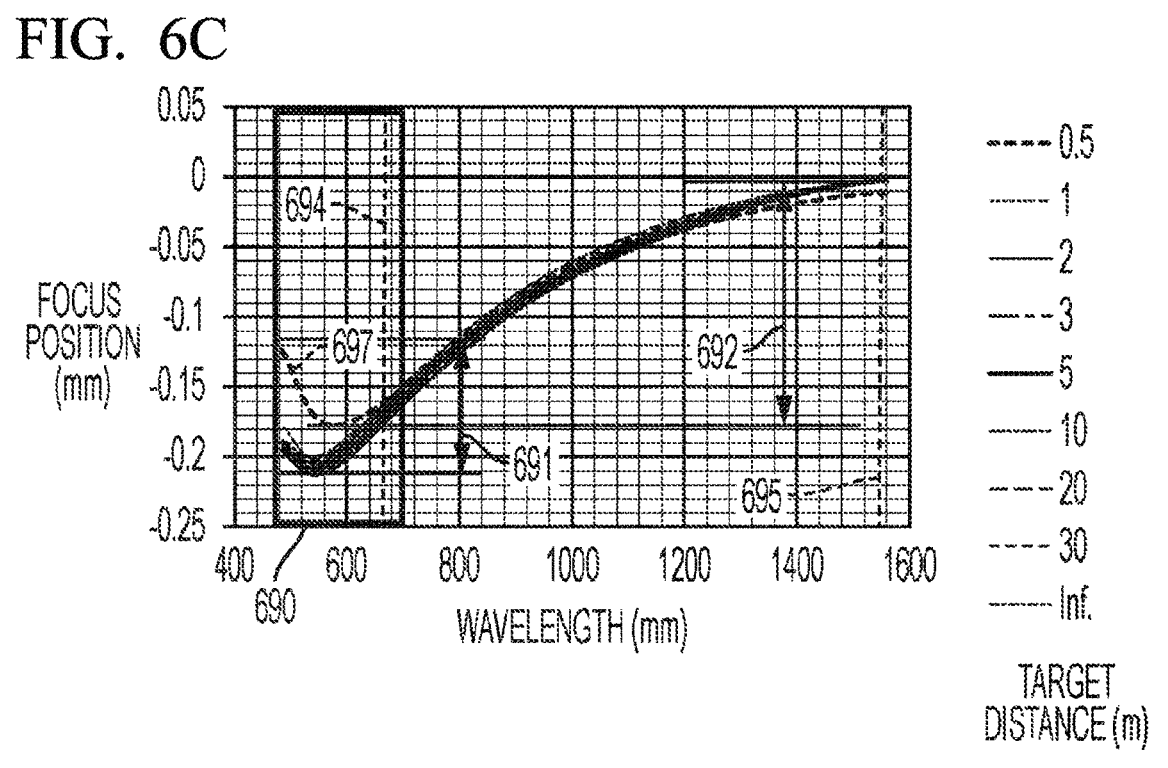

In order to acquire quality images at the image sensor 672, chromatic aberration at visible wavelengths should be sufficiently reduced. However, obtaining acceptably low values of chromatic aberration at both visible wavelengths and between probe (IR) and pointing (red lasers) is a demanding lens design challenge. FIG. 6C illustrates chromatic aberration at visible wavelengths (in a range 690, chromatic aberration indicated with an arrow 691) and at a probe (i.e., IR) wavelength indicated at 695 as well as a pointing beam wavelength at 694. The mixing lens 656 is selected to reduce or eliminate chromatic aberration between pointing and probe beams (visible and IR), and the lenses 660, 662 are selected to reduce chromatic aberration in the visible range 690). Focus shift is shown for target distances ranging from 0.5 m to infinity; the curves nearly overlap except for a curve 697 associated with 0.5 m target distance.

Example 7

Figure 7A:
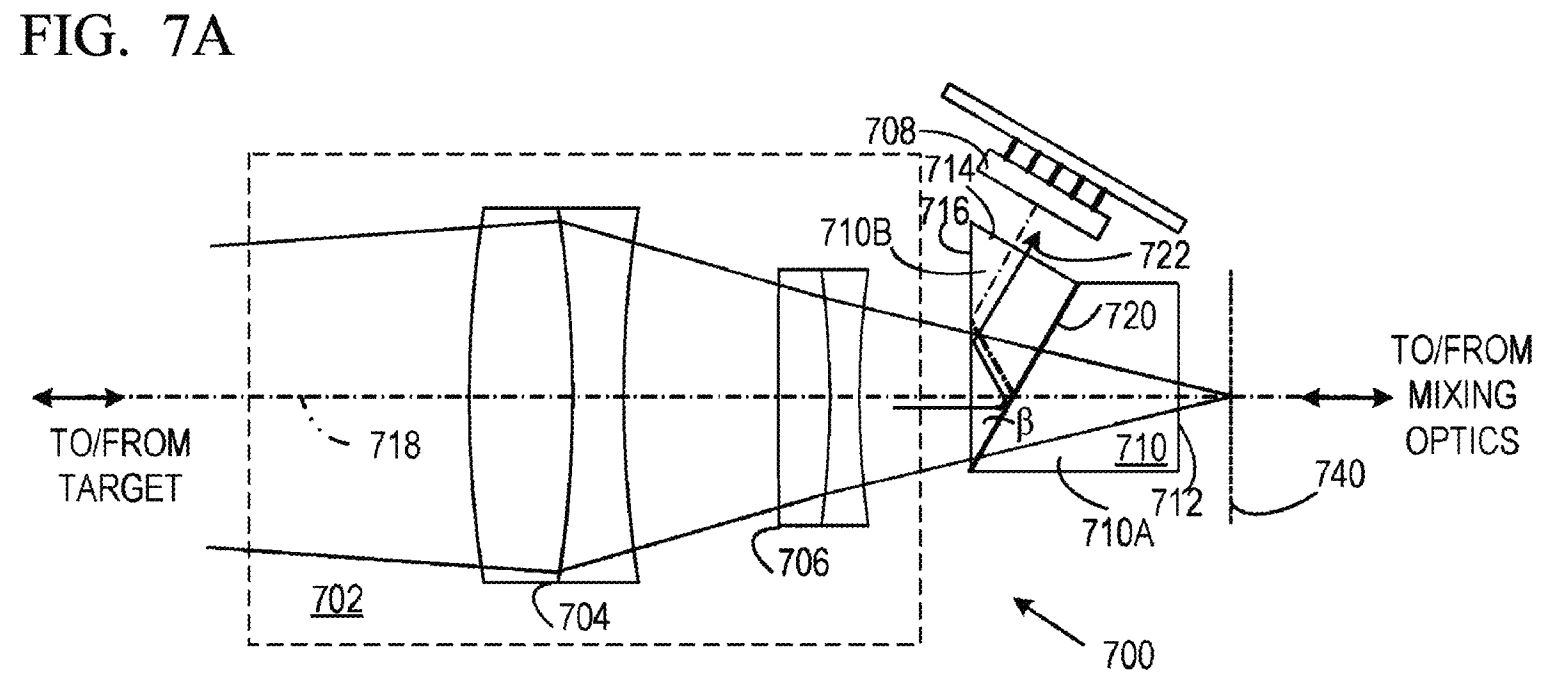

FIG. 7A illustrates an optical assembly 700 that includes an objective lens 702 that communicates one or both of probe and tracer beams to and from a target, and receives imaging light (referred to in some cases as an imaging beam) from a target. The objective lens 702 includes a fixed lens 704 and a movable lens 706 that permits focusing of a probe beam and a tracer beam at a target and imaging the target on an image sensor 708. A beam splitter 710 transmits probe and tracer beams to a target via the objective lens 702 and transmits at least a return portion of the probe beam from the target for coupling to one or more detectors (not shown in FIG. 7A). The beam splitter 710 includes optical surfaces 712, 714, 716 situated to be perpendicular to a beam propagation axis 718 (the optical surface 714 is perpendicular to the propagation axis as folded at 716, 720). The propagation axis 718 is defined by axis segments that are at various angles with respect to each other. The beam splitter 710 comprises a first prism 710A, a second prism 710B, and a beam splitter layer 720, typically a multilayer thin film coating that provides wavelength dependent reflection and transmission. An imaging beam used to form an image of the target is indicated in FIG. 7 as 722, and is reflected by the beam splitter layer 720 and is then reflected by the optical surface 716 to the image sensor 708. A prism angle β is typically selected so that the imaging beam is incident at an angle greater than a critical angle. i.e., greater than $\sin^{-1}(1/n)$, wherein n is a refractive index of the prism 710B. In some examples, the probe beam (or beams) has an intermediate focus at a plane 740 such as at a surface of a waveplate as discussed above.

Figure 7B:
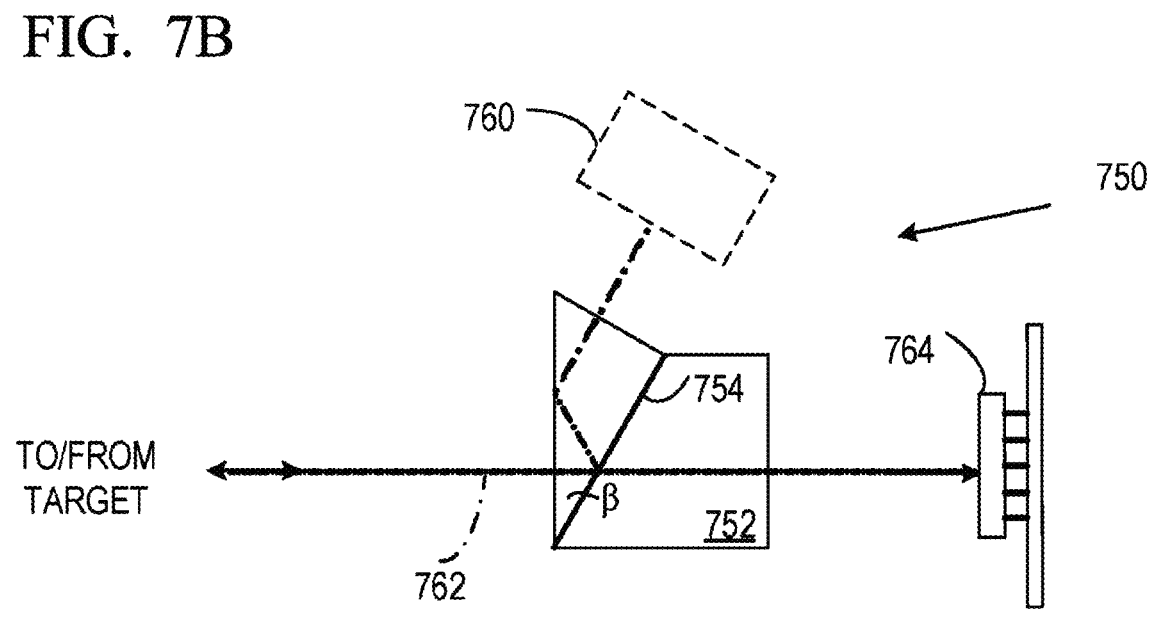

Referring to FIG. 7B, an optical system for beam combining and separation includes a beam splitter 752 that is similar to the beam splitter 710 of FIG. 7A, but having a dichroic surface 754 that reflects one or more probe beams (and portions of a tracer beam) from a source/detector system 760 to a target, and couples return portions of the one or more probe beams to the source/detector system 760. An image beam is transmitted along an axis 762 to an image sensor 764. As in other examples, the axis 762 is defined by axis segments that are at various angles with respect to each other, and portions of the axis 762 extend to the source/detector system 760 and the image sensor 764.

Example 8

Figure 8A:
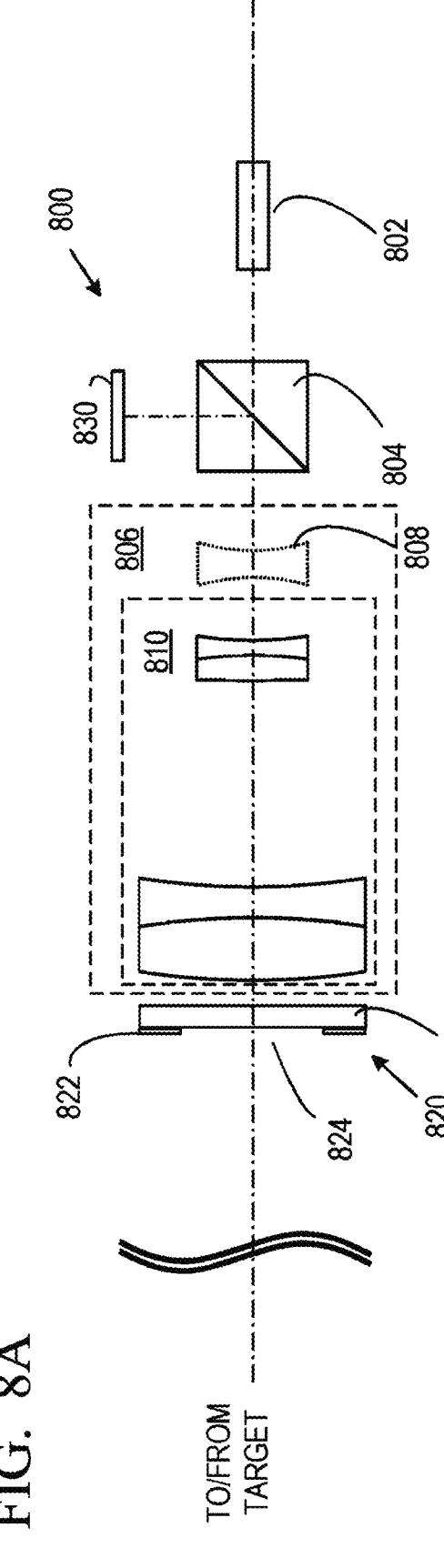
FIG. 8A illustrates a laser radar optical system that includes a perimeter-weighted dichroic filter.

Referring to FIG. 8A, an optical system 800 includes an optical fiber end 802 situated to couple probe and/or tracer beams to a beam splitter 804. An objective lens 806 includes a fixed lens 810 and a movable (focus) lens 808 so that the probe beam(s) can be focused on a target. An optical filter 820 is situated to receive the probe and tracer beams and transmit at least the probe beams to the target. The filter 820 includes a dichroic layer 822 having an aperture 824. The dichroic layer 822 is typically ring-shape and is selected to be transmissive at probe beam wavelengths and attenuating at visible wavelengths or other wavelengths used by an image sensor 830. The filter 820 thus reduces imaging beam numerical aperture which can simplify the design of the objective lens 806. It will be appreciated that design of a lens suitable for precise imaging and beam focusing simultaneously in a wavelength range of 400 nm to 700 nm (for target imaging) and in a wavelength range of 1300-1600 nm (probe beam focusing) can be challenging. With a filter such as the filter 820, probe beam numerical aperture can remain large to permit fine focusing while limiting imaging beam numerical aperture provides satisfactory images. While a dichroic layer 822 is shown in FIG. 8A, a similar absorptive layer can be used. A diameter or other dimension of the aperture 824 can be selected in conjunction with objective lens design. In the example of FIG. 8A, an optical path length difference for propagation through the aperture 824 and through the dichroic layer 822 is generally kept small enough to avoid introducing focus errors to the probe beam.

Figure 8B:
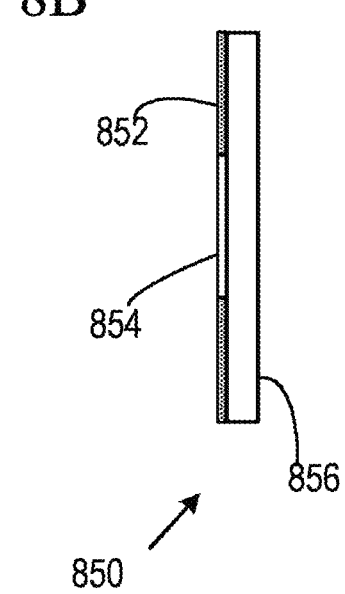
FIGS. 8B-8C illustrate dichroic filters that reflect imaging beam portions to improve image quality and reduce effective numerical aperture (NA) for imaging.
Figure 8C:
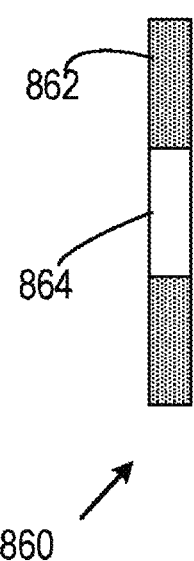

Representative filters 850, 860 are illustrated in FIGS. 8B-8C. The filter 850 includes an attenuating ring 852 and a transmissive central region 854 provided on one, either, or both surfaces of substrate. The attenuating ring 852 can be provided with an absorptive, reflective, polarizing, or other layer that preferentially attenuates an imaging beam (typically at 400 nm to 700 nm, but imaging at other wavelengths can be used). The attenuating ring 852 and the transmissive central region 854 can have a common thickness or a common optical thickness to eliminate or reduce probe beam focus errors associated with phase differences between the attenuating ring 852 and the transmissive central region 854. In the example of FIG. 8C, a filter 860 includes an attenuating ring 862 situated about a transmissive region 864.

Example 9

Figure 9A:
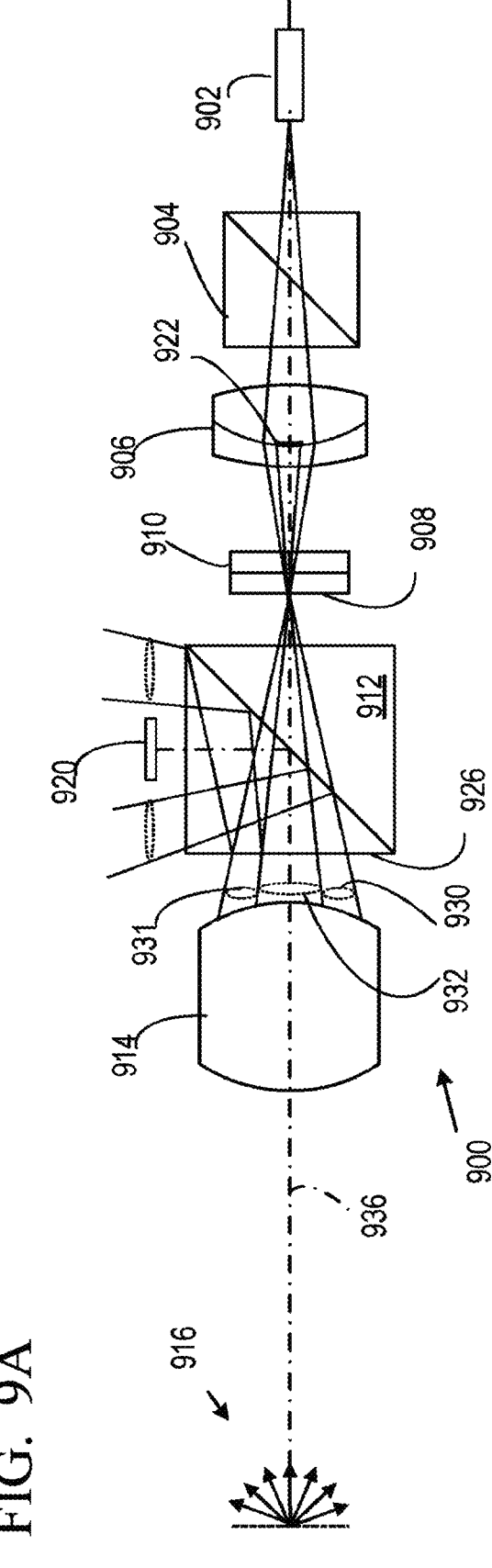
FIGS. 9A-9C illustrate an optical system having a mixing lens element with a central dichroic filter coating.

FIG. 9A illustrates an optical system 900 that includes an optical fiber end 902 situated to direct one or more probe beams and a tracer beam to a polarizing beam splitter (PBS) 904 and to an imaging lens 906. The imaging lens 906 focuses the probe beams at a surface 908 of a waveplate 910, generally a quarter waveplate that produces a circular state of polarization (SOP) in the probe beams. Typically, the imaging lens 906 forms an image of the optical fiber end 902 on the surface 908 of the waveplate 910. The surface 908 reflects portions of the probe beams back to the imaging lens 906 so as to be returned to the fiber end 902 or otherwise directed, typically for use as local oscillator beams. The surface 908 can be an uncoated surface as a reflectance of a few percent is generally adequate to produce sufficient local oscillator beam power. By situating the surface 908 at a focus of the imaging lens 906, local oscillator beams tend to be returned to the fiber end 902 with reduced variation in response to tilts of the waveplate 908. A dichroic beam splitter 912 receives the probe beams and the tracer beam and an objective lens 914 focuses the probe beams at a target 916. Returned probe beam portions are coupled back toward the fiber end 902, and an imaging beam is reflected by the beam splitter 912 to an image sensor 920.

Figure 9B:
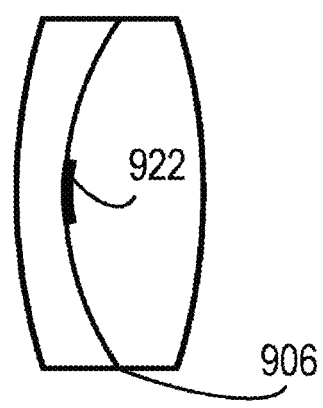
Figure 9C:
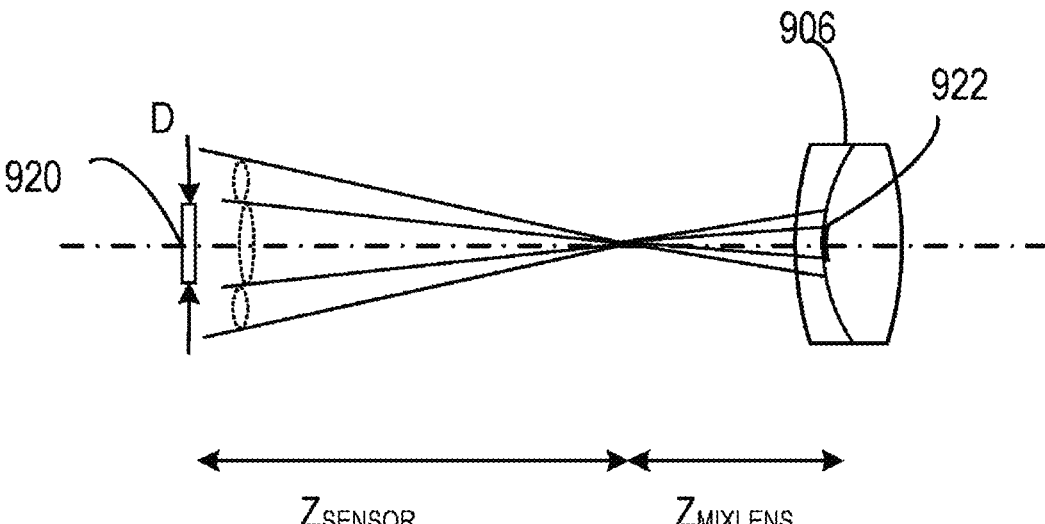

As shown in FIGS. 9A-9B, the imaging lens 906 also includes a central obscuration 922 that is situated to block a central portion of one or more of the probe or tracer beams. In most examples, a portion of the tracer beam is blocked or attenuated within an angular diameter selected so that all or some portions of the tracer beam reflected by a target-facing surface 926 of the beam splitter 912 do not reach the image sensor 920. This blocking reduces portions of the tracer beam from reaching the image sensor so that a superior target image is produced. Beam portions 930, 931 are displaced from an axis 936 (i.e., beam portions at larger numerical apertures) and propagate toward the target 916. Corresponding beam portions are reflected by the beam splitter 912 but do not reach the image sensor 920. A central portion 932 of the tracer beam (a low numerical aperture portion) is blocked or attenuated and does not reach the image sensor 920 or reaches the image sensor with reduced beam power. The central obscuration 922 is typically provided by a dichroic reflector which is transmissive to probe beams and reflective at a tracer beam wavelength. A dimension of the dichroic reflector is based on a corresponding dimension of the image sensor. In some examples, the imaging lens 906 focuses the probe beams within a beam angular diameter a and a dimension of dichroic reflector is at least 0.5, 0.75, 1.0, or 1.5 times a product of a corresponding dimension of the image sensor and a ratio of an optical distance along the axis from the mixing lens focus to the dichroic reflector to an optical distance from the mixing lens focus to the image sensor. As shown in FIG. 9C, an obscuration dimension $d_{obs}$ that attenuates tracer beam portions that are reflected to the image sensor 920 can be determined as $d_{obs}=(Z_{SENSOR}/Z_{MIXLENS})D$, wherein D is an image sensor dimension, $Z_{SENSOR}$ and $Z_{MIXLENS}$ are axial distances of the image sensor 920 and the central obscuration 922 from the mixing lens focus. Larger or smaller dimensions can be used as well, depending on the extent to which rejection of tracer beam portions is desired. (For convenience, FIG. 9C shows the optical system of FIG. 9A unfolded.)

Figure 9D:
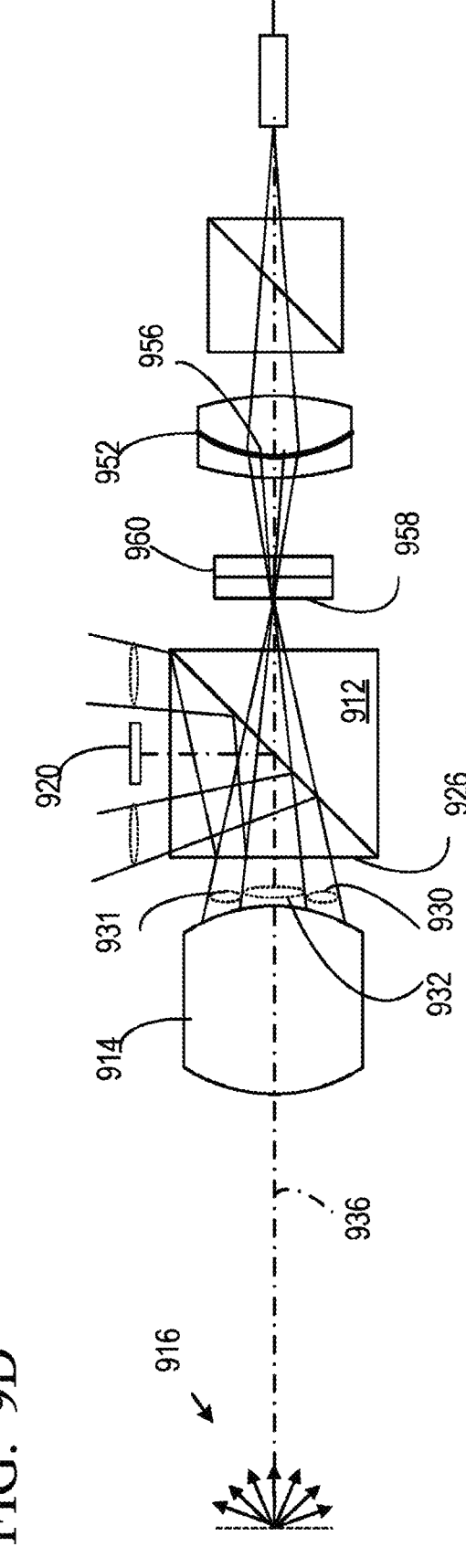
FIG. 9D illustrates an optical system having a mixing lens element with a dichroic filter coating having an angular dependence of transmittance so as to attenuate central portions of a tracer beam.
Figure 9E:
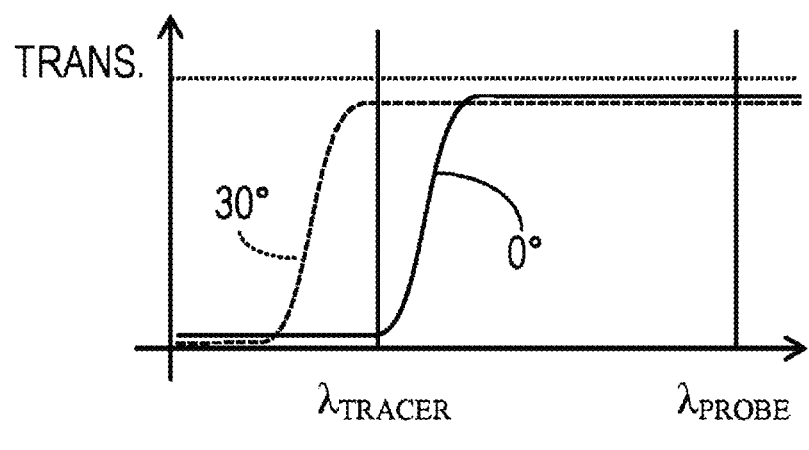
FIG. 9E is a graph of transmittance as a function of wavelength for a representative dichroic filter.

Another approach to reducing tracer beam portions from reaching an image sensor is illustrated in FIG. 9D. In optical system similar to that of FIG. 9A, an imaging lens 952 produces a probe beam focus at a surface 958 of a waveplate 960 or other optical element. A dichroic coating 956 is provided at the imaging lens 952, and provides variable transmission as a function of angle of incidence and wavelength. Typically, a central portion of the dichroic coating 956 is highly reflective to a tracer beam but transmissive to the probe beam. Other portions of the dichroic reflector such as those associated with higher angles of incidence tend to transmit the tracer beam as well as the probe beam. Such a coating can be placed on other surfaces such as planar surfaces of beam splitters or waveplates. FIG. 9E is a transmission curve for a representative dichroic coating. As shown in FIG. 9E, a probe beam is transmitted at angles of incident of up to 30 degrees, while transmission at a tracer wavelength varies substantially, with low transmission at normal incidence and increasing transmission as a function of angle.

Example 10

Figure 10:
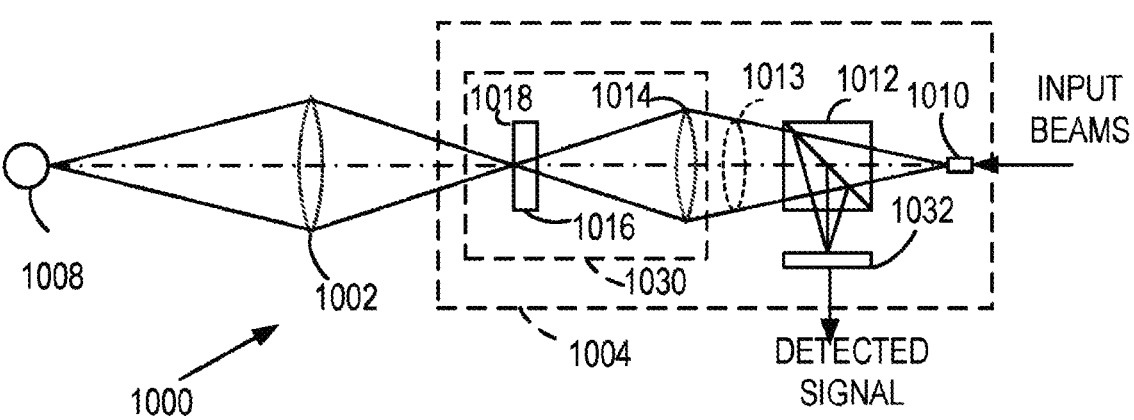
FIGS. 10-11 illustrate laser radar optical systems that include a mixing lens and a waveplate situated as a cat's eye retroreflector to produce a local oscillator beam.

With reference to FIG. 10, an optical system 1000 includes an objective lens 1002 and a mixing optical system 1004 that directs probe and tracer beams to the objective lens 1002 for focusing on a target 1008. In some cases, two counter-chirped probe beams are used. The mixing optical system 1004 includes a fiber end 1010 that directs one or more probe beams and a tracer beam to a PBS 1012 as a combined beam 1013 and then to a mixing lens 1014. The mixing lens 1014 focuses the combined beam 1013 at a surface 1018 of a waveplate 1016, and a reflected portion of the probe beam from the surface 1018 is returned toward the fiber end 1010 to serve as local oscillator beam. A state of polarization (SOP) of the reflected portions from the surface 1018 is rotated by 90 degrees. An opposing side of the waveplate 1016 typically has an anti-reflection coating.

The combination of the mixing lens 1014 and the waveplate 1016 serves as a cat-eye retroreflector 1030 that tends to be insensitive to tilts of the waveplate 1016. Portions of the probe beam or beams and the local oscillator beam or beams are directed by the PBS 1012 to a detector assembly 1032 that typically includes respective detectors coupled to receive probe beam portions and LO portions for each probe beam wavelength.

Example 11

Figure 11:
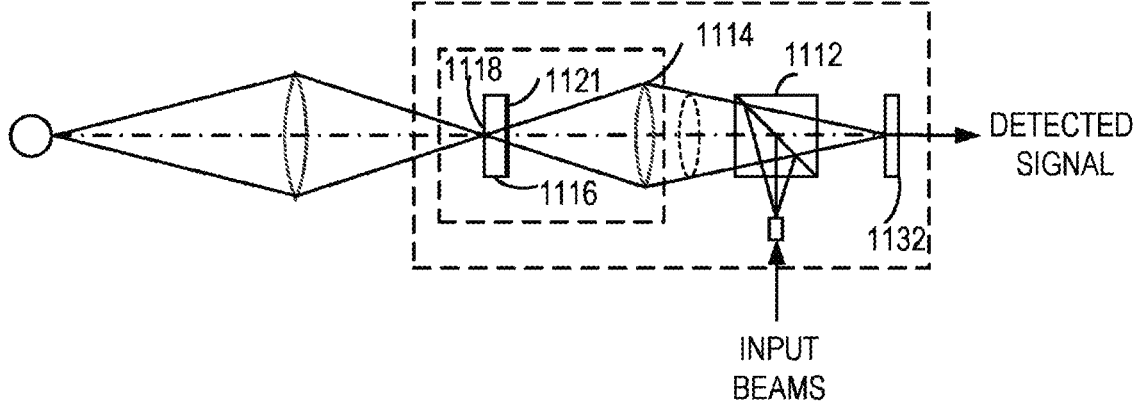

FIG. 11 illustrates an optical system similar to that of FIG. 10 in which probe/tracer beams are reflected by a PBS 1112 to a mixing lens 1114 to focus the probe/tracer beams on a target-side surface 1118 of a waveplate 1116 so that a state of polarization (SOP) of the reflected portions from the surface 1118 is rotated by 90 degrees. An opposing side of the waveplate 1116 has an anti-reflection coating 1121. In this example, returned beam portions are transmitted by the beam splitter 1112 to a detector 1132.

Example 12

Figure 12A:
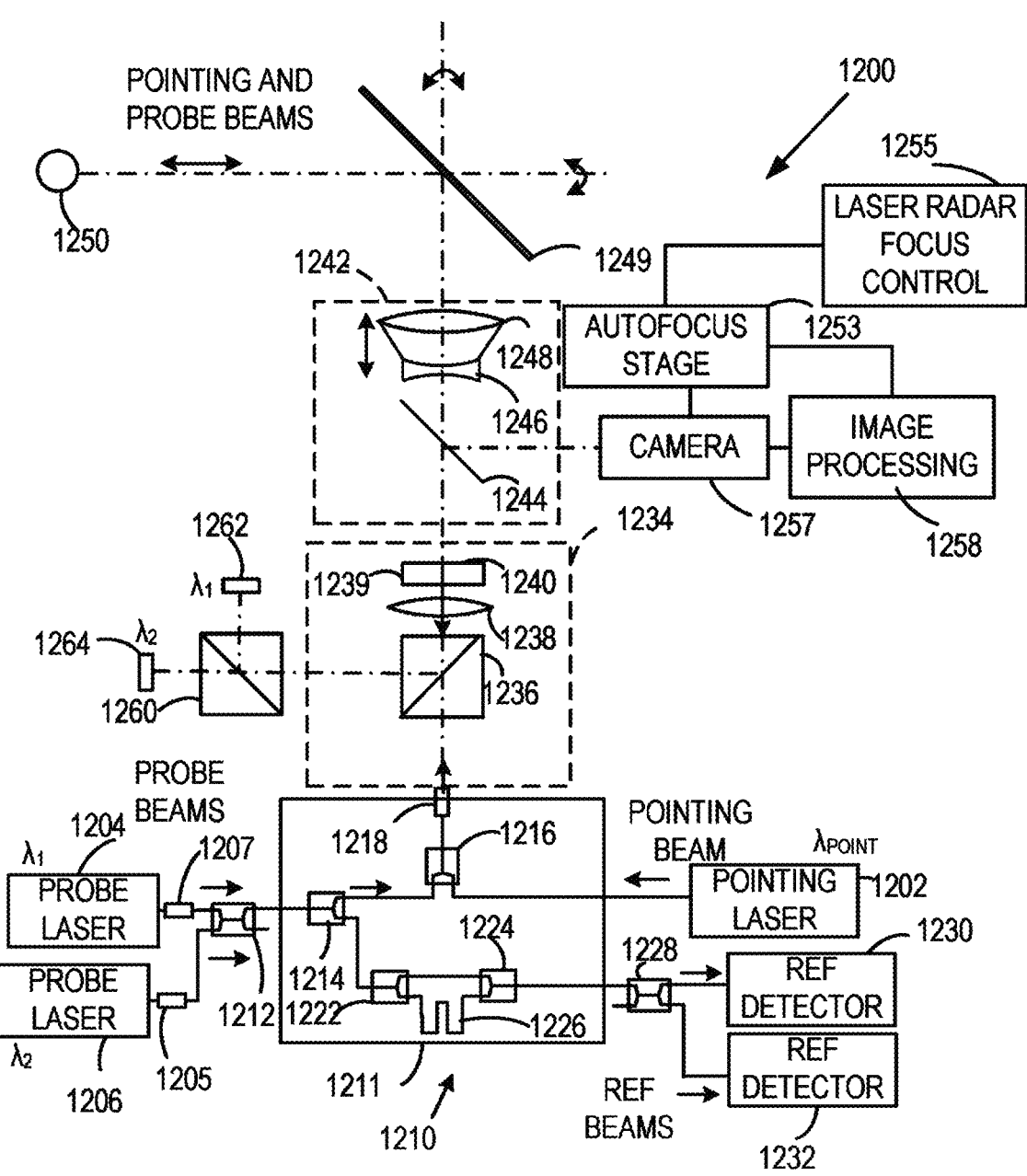
FIGS. 12A-12B illustrate laser radar systems that include a mixing optical system and a projector optical system coupled to communicate with a reference arm situated in a temperature controlled chamber.

Referring to FIG. 12A, a laser radar system 1200 includes a pointing laser 1202, a first probe laser 1204, and a second probe laser 1206 coupled to a fiber module 1210 that includes a hermetically sealed container 1211 that can be temperature controlled, and evacuated or filled with an inert gas. The probe lasers 1204, 1206 are coupled via respective optical isolators 1205, 1207 and then to a wavelength division multiplexer (WDM) 1212 that combines first and second probe beams for output to the fiber module 1210. The fiber module 1210 includes a fiber coupler 1214 that directs portions of the combined probe beams to a WDM 1216 that combines portions of the probe beams with a tracer or pointing beam (such as a red or other visible beam) from the tracer laser 1202 and outputs the combined probe/pointing beams at a fiber end 1218. In other examples, the WDM 1212 and the fiber coupler 1214 are replaced by a single coupler situated within the hermetic container 1211. The coupler 1214 also directs probe beam portions to a coupler 1222 that in turn couples beam portion to a coupler 1224 via two different paths, one of which contains a reference fiber 1226. The coupler 1224 then combines the beam portions associated with the different paths and directs the combined beams to a WDM 1228 which directs beam portions from each path to reference detectors 1230, 1232 that are associated with wavelengths of the first probe laser 1202 and the second probe laser 1204, respectively. The beam portions at each of the reference detectors 1230, 1232 produce heterodyne signals at frequencies associated with the length of the reference fiber 1226 and frequency chirps in the first and second probe beams. Based on these heterodyne signals and the known length of the reference fiber 1226, probe laser frequency chirp and the resulting measurement signals from a target 1250 can be used for calibration or confirmation of distance measurements.

The fiber end 1218 couples the combined beams to mixing optics 1234. A PBS 1236 receives the combined beams and a mixing lens 1238 forms a beam focus at a surface 1240 of a quarter waveplate 1239 which reflects local oscillator portions back to the PBS 1236. Other portions of the combined beams are directed to a projection optical system 1242 in which the beams propagate through a beam splitter 1244 (shown as a plate, but cube, double-reflecting or others can be used) to an objective lens having a fixed lens 1248 and a movable lens 1246 for focusing the combined beams at the target 1250. The beam splitter directs an imaging beam to a camera 1257. One or more scanning mirrors 1249 (typically as illustrated in FIG. 2) direct the combined beams to the target 1250 and returned portions of the combined beams from the target 1250 are directed back to the projection optical system 1242 and the mixing optics 1234. Beam portions returned from the target 1250 along with respective local oscillator beams are reflected by the PBS 1236 to a dichroic beamsplitter 1260. Detectors 1262, 1264 are situated to receive beam portions and local oscillator beams associated with respective wavelengths and produce corresponding heterodyne signals. In other examples, a normal beamsplitter (i.e., non-polarizing and non-dichroic) is used along with wavelength filters in front of each detector. Such a configuration is generally associated with some additional signal loss, but can be more convenient to produce.

Figure 13A:
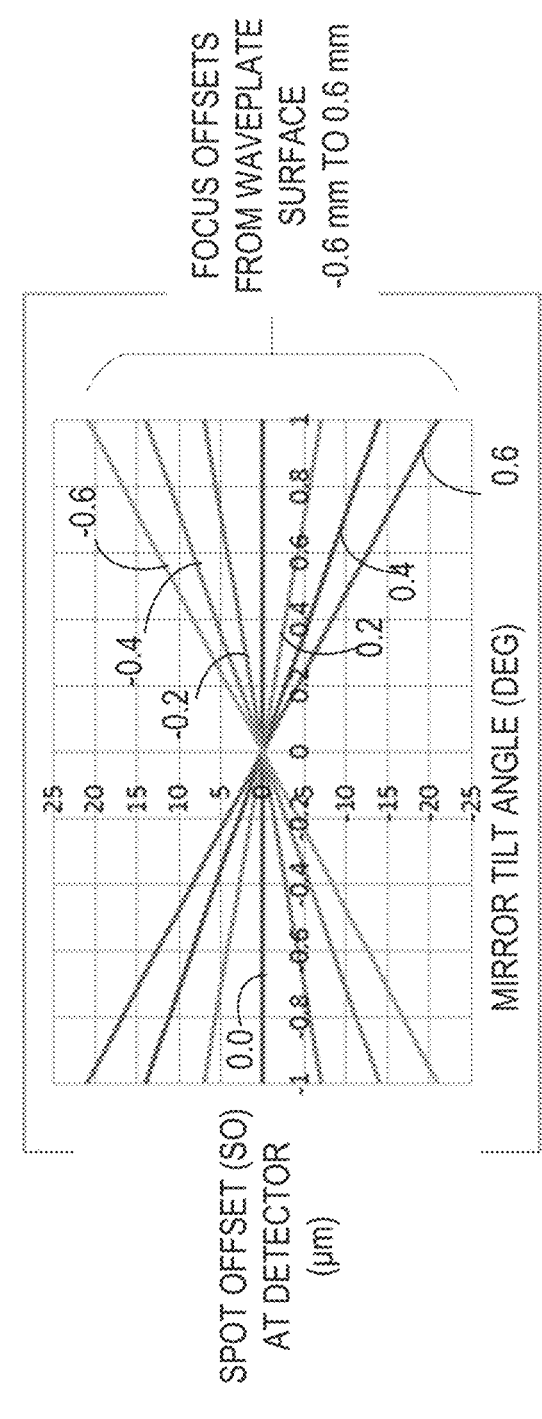
FIGS. 13A-13C illustrate performance of laser radar systems that include a cat's eye retroreflector to produce a local oscillator beam.
Figure 13B:
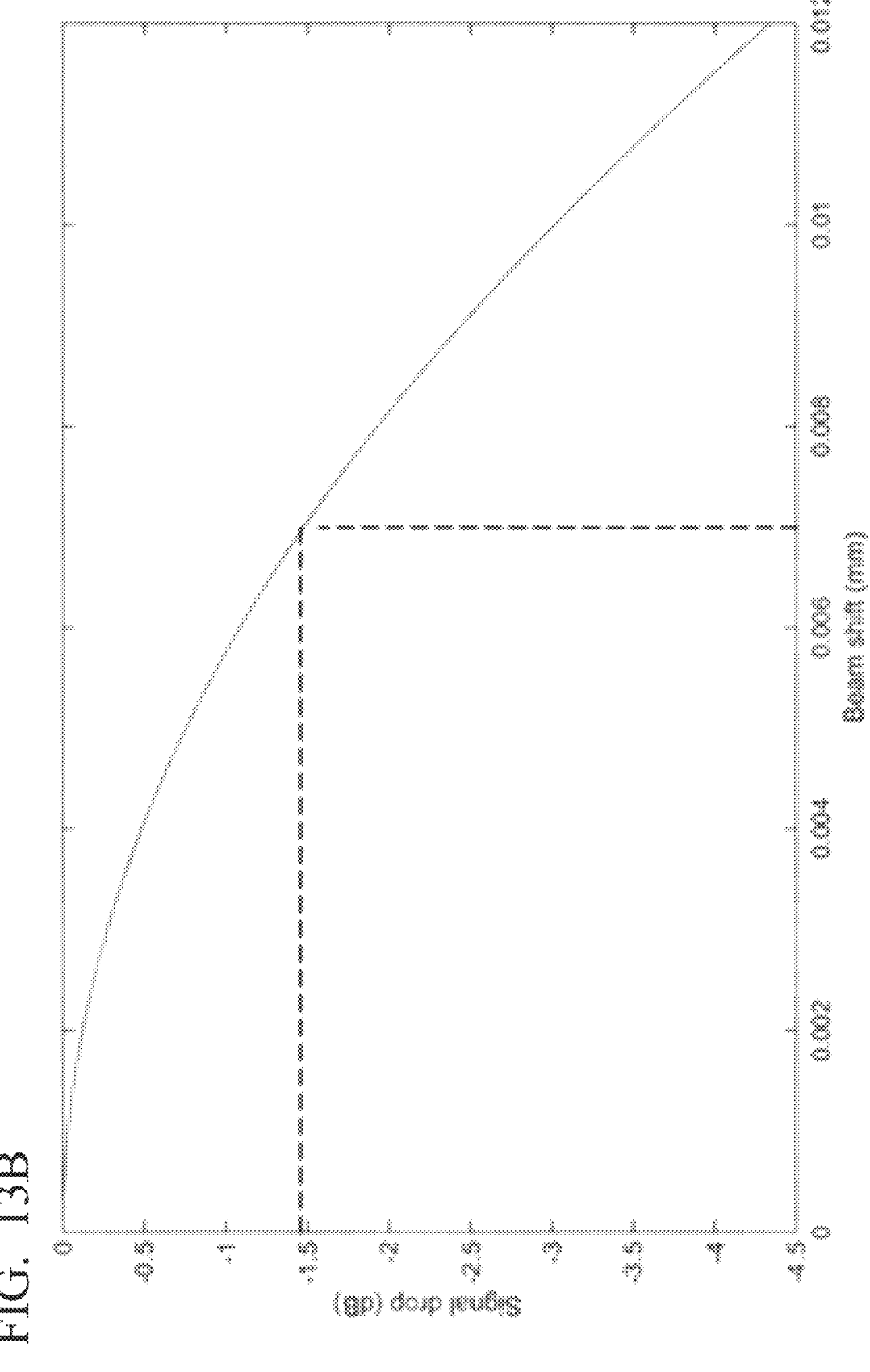
Figure 13C:
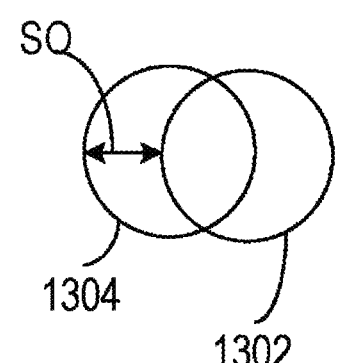

As shown in FIG. 12A, local oscillator (LO) beams are produced using reflection from a quarter-wave plate surface at a focus of a mixing lens. The combination lens 1238 and quarter-waveplate 1239 function as a cat-eye retroreflector for incoming beams that are focused at a surface of the quarter-waveplate 1239. Alignment of LO and returned portions of probe beams is provided, even with tilts of the quarter-waveplate 1239. For example, for a mixing lens focal length of 7.5 mm, beam offsets (spot offsets) as a function of waveplate tilt for displacements from exact focus between −0.6 mm and 0.6 mm are plotted in FIG. 13A. For exact focus, spot offset is zero for all tilts. FIG. 13B shows signal loss as a function of spot offset and FIG. 13C illustrates spot offset (SO) at a detector surface between beams 1302, 1304.

Figure 12B:
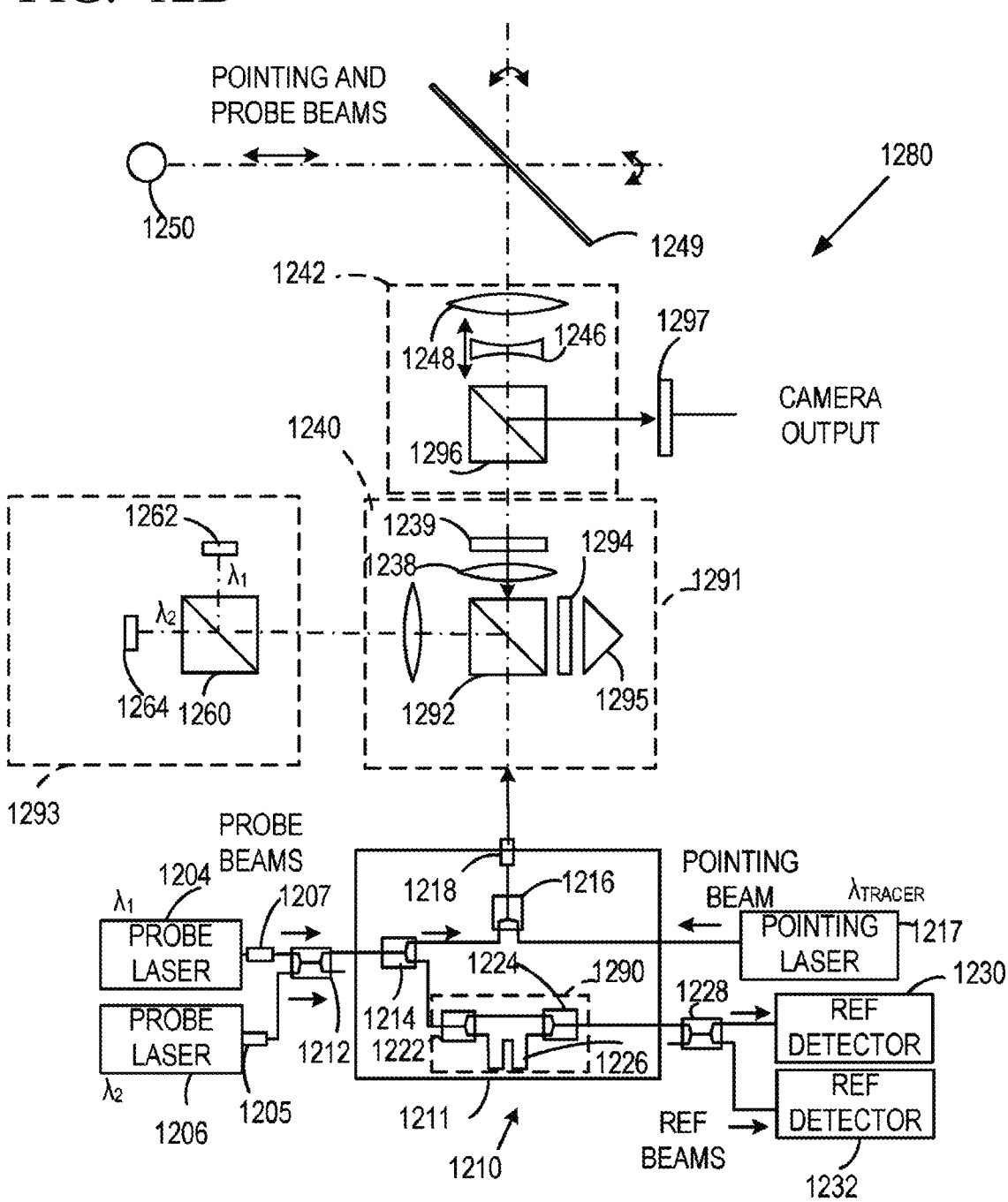

FIG. 12B shows a laser radar 1280 that is similar to the laser radar 1200 of FIG. 12A. However, in the example of FIG. 12B, a temperature controlled oven 1290 is shown that contains some or all components of the reference path such as the fiber 1226. It is generally preferred to situate all fiber optic components in the oven and evacuate and hermetically seal the oven. The fiber end 1218 directs combined beams to a local oscillator optical assembly 1291 that includes a PBS 1292 that directs portions of the probe beams to a detector assembly 1293. It should be noted the portion reflected is a fraction of the total beam because the PBS is not perfect, thus some of the "wrong" polarization is reflected. Other portions of the probe beams are directed to a quarter-waveplate 1294 and portions returned from the target are reflected by the PBS 1292 to quarter-waveplate 1294 and then to a retroreflector 1295. The probe beams are then directed to the detector assembly 1293 as illustrated. Instead of the plate beam splitter 1244 of FIG. 12A, a cube beam splitter 1296 is situated to reflect portions of a viewing beam to a camera 1297. The lens 1238 permits independent focus of the probe beams and the imaging beams using the lenses 1246, 1248.

Figure 12C:
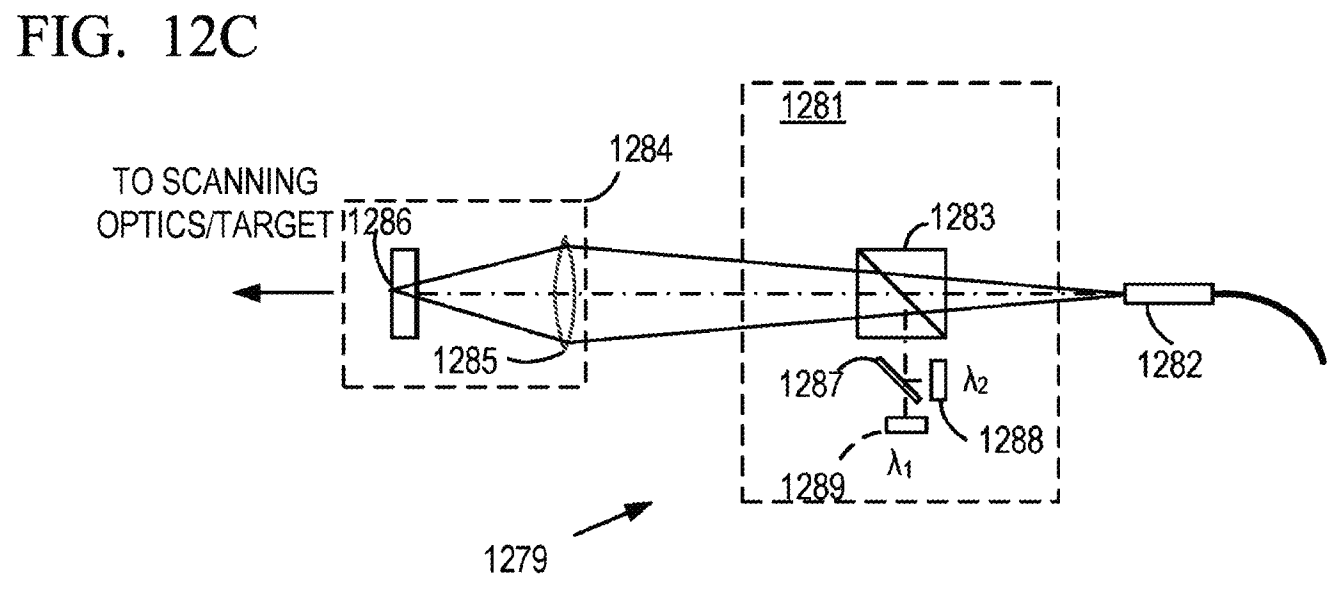

FIG. 12C illustrates mixing optics 1279 that includes a cat-eye assembly 1284 and a detector module 1281. The cat-eye assembly 1284 includes a lens 1285 that focuses input probe beams on a surface of a waveplate 1286 to produce LO beams by reflection. The detector module 1281 includes a PBS 1283 that directs LO and returned probe beam portions to a dichroic beam splitter 1287 so that transmitted portions at a first wavelength are directed to detector 1288 and reflected portions at a second wavelength are directed to a detector 1289. A wavelength difference between the first and second wavelengths can be 1, 2, 5, 10, 20, 50, or 100 nm or more for separation by the dichroic beam splitter 1287. The mixing optics 1279 can be compact (total volume of less than 2 in$^3$), requires few components, and can be easily and stably aligned.

Example 13

Figure 14A:
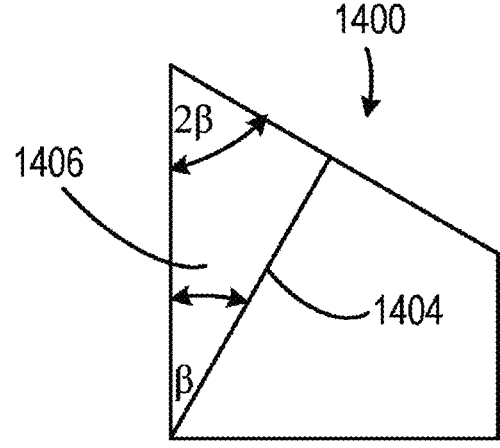
FIGS. 14A-14C illustrate representative twice-reflecting dichroic (or neutral) prisms.
Figure 14B:
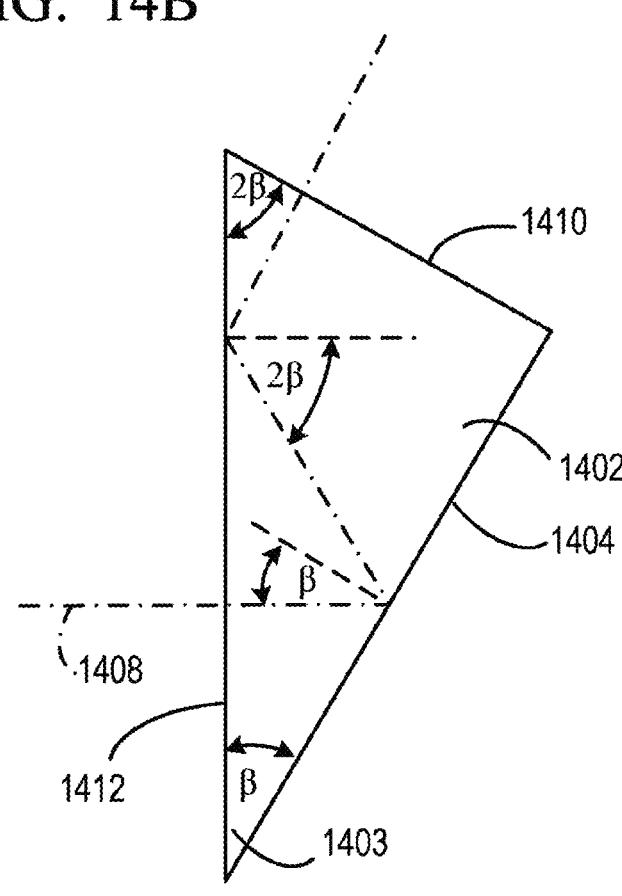
Figure 14C:
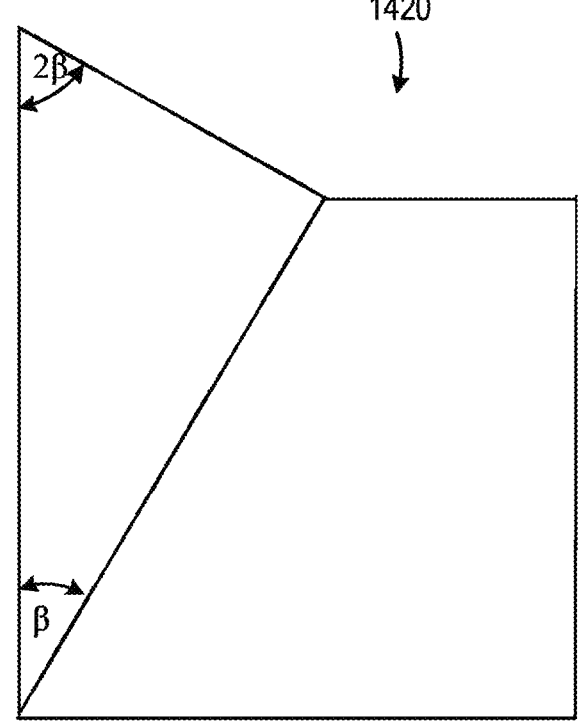
Figure 14D:
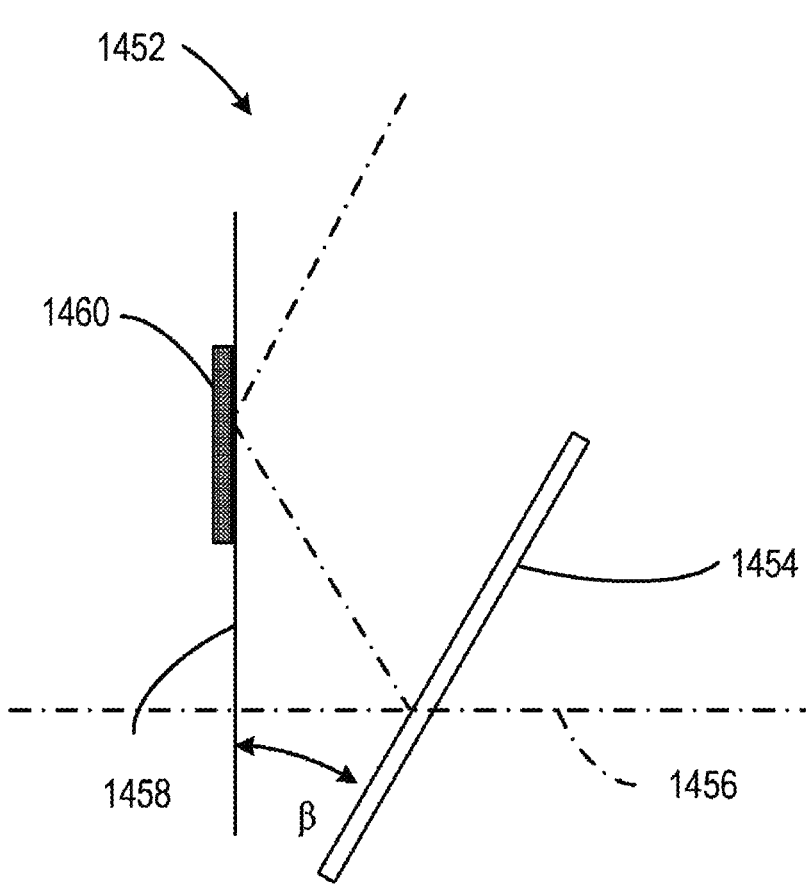
FIG. 14D illustrates a representative air-spaced reflector.

FIGS. 14A-14D pertain to double reflecting beam splitters. FIG. 14A illustrates a double-reflecting prism beam splitter 1400 in which a dichroic surface 1404 is situated at an angle β defined as a vertex angle of a prism 1406. FIG. 14B is a detailed view of the prism 1406 illustrating prism angles and angles of incidence and reflection with respect to an axis 1408 that is perpendicular to beam splitter faces 1410, 1412. FIG. 14C illustrates another alternative double-reflecting beam splitter 1420 that can include a prism such as the prism 1406. As shown in FIG. 14D, a double-reflecting beam splitter 1452 includes a plate dichroic beam splitter 1454 and a reflector 1460. The plate dichroic beam splitter 1454 and the reflector 1460 are situated on an axis 1456. The reflector 1460 can be defined on a surface 1458 of a transmissive plate, for example.

Example 14

Figure 15A:
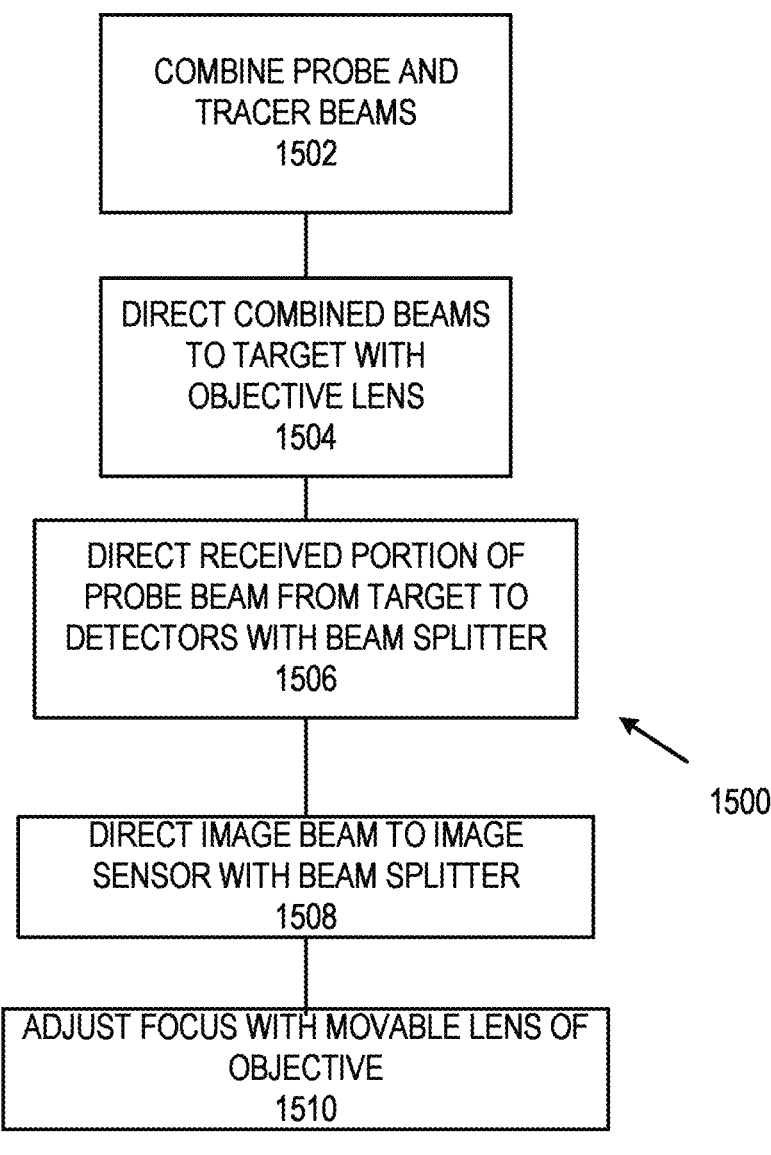

FIGS. 15A-15C illustrate representative methods that can be used individually or in combination in laser radar or laser tracker systems or in other optical measurement systems. As shown in FIG. 15A, a method 1500 includes combining probe and tracer beams at 1502, and directing the combined beams to a target with an objective lens having a fixed portion and a movable portion at 1504. A probe beam portion received from a target is returned to a dichroic beam splitter and directed to detectors at 1506. At 1508, the image beam is directed to an image sensor and at 1510, and a focus of the probe beam at the target and a focus of the imaging beam at an image sensor are adjusted with the movable lens.

As shown in FIG. 15B, a method 1530 includes combining one or more probe beams and a tracer beam at 1532, and focusing the combined beams at a reflective surface at 1534 to generate a counter-propagating local oscillator (LO) beam that includes portions for each of the probe beams. At 1536, portions of the probe beam received from a target are received and directed to one or more detectors along with the LO beam or beams. At 1538, target distance or height is estimated based on heterodyne frequencies between the returned probe beam portions and the corresponding LO beams.

As shown in FIG. 15C, a method 1550 includes combining beams (such as one or more probe beams and a tracer beam) with a beam splitter such as a fiber-based WDM at 1552, and blocking a central or low NA portion of a tracer beam at 1554. At 1556, the combined beams (less the central portion of the tracer beam) are directed to dichroic beam splitter. At 1558, an imaging beam is directed from the dichroic beam splitter to an image sensor and at 1560 returned portions of one or more probe beam are processed to produce a distance or height estimate. Typically, the returned beam portions are mixed with corresponding local oscillator beams to produce an electrical signal at a difference (heterodyne) frequency, and the heterodyne frequency is calibrated with respect to distance/height.

Example 15

Figure 16A:
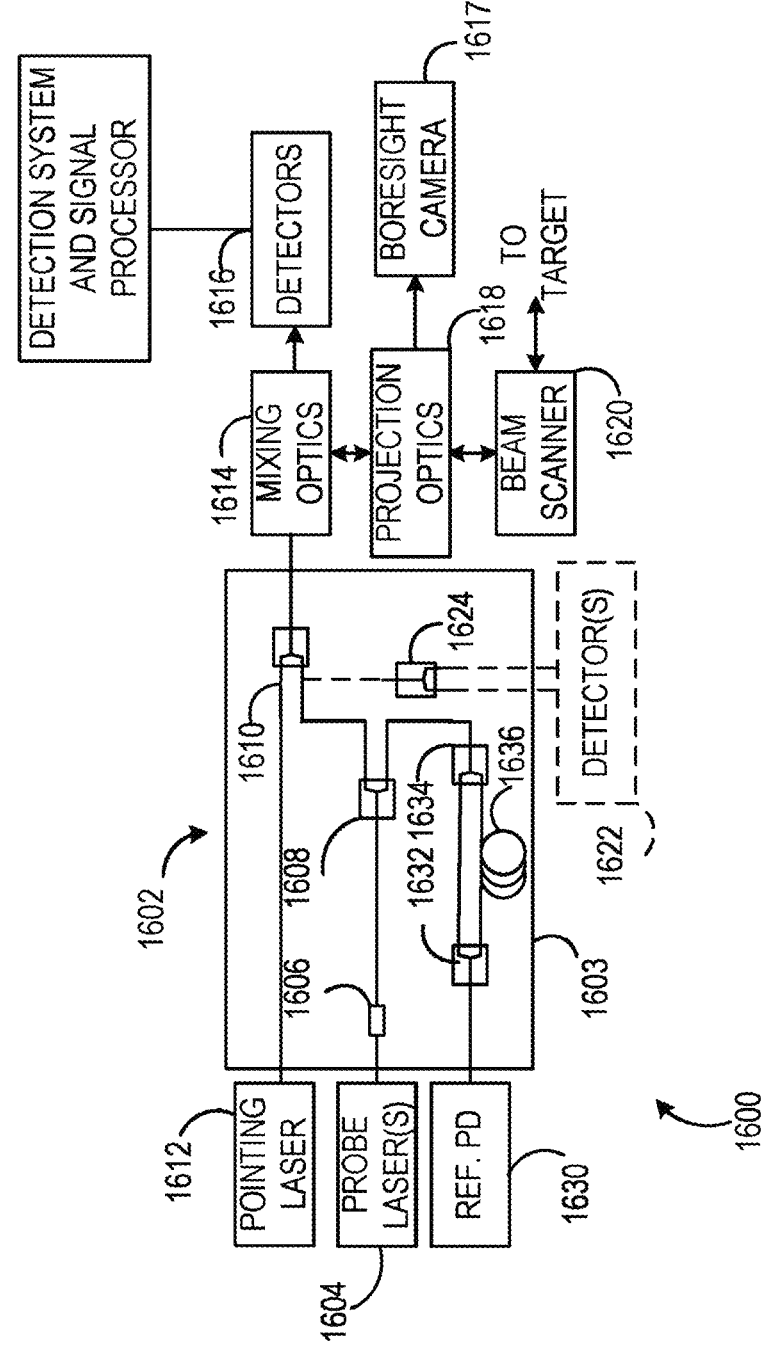
FIG. 16A illustrates another example laser radar system.

FIG. 16A illustrates a representative laser radar 1600 that includes a fiber module 1602 situated in a hermetically sealed, inert gas filled or evacuated enclosure 1603 that is generally temperature controlled. The fiber module 1602 comprises an optical isolator 1606 and a fiber coupler 1608 that are coupled to a probe laser 1604. A WDM 1610 is coupled to receive portions of the probe beam from the probe laser 1604 and a tracer beam from a tracer laser 1612 and couples the combined probe/tracer beam to mixing optics 1614. The mixing optics 1614 couple portions of the probe beam returned from a target to one or more detectors 1616 to produce an electrical signal that is processed to determine target distance or height. The mixing optics 1614 couples the combined probe/tracer beams to projection optics 1618 and then to a beam scanner 1620 for delivery to a target. The projection optics 1618 also directs an imaging beam to an image sensor serving as a boresight camera 1617 in combination with an objective lens provided in the projection optics 1618. The beam scanner 1620, the projection optics 1618, and the mixing optics 1614 also direct return portions of the probe beams from the target to the one or more detectors 1616. In addition, a reference photodiode 1630 is coupled to fiber couplers 1632, 1634 so that probe beam portions received from the coupler 1608 are directed to a reference fiber 1636 having a predetermined length so that a heterodyne signal frequency can be associated with distance or height. The laser radar 1600 can use any of the mixing optics, projection optics, and beam scanners disclosed herein, and in some cases, one or more can be omitted. In one variation, the detectors 1616 are omitted, and a detector 1622 is coupled to a fiber coupler 1624 of the fiber module 1602 so as to receive signal beams.

The example of FIG. 16A shows only a single probe laser, but typically two probe lasers at different wavelengths are used, and the lasers produce counter-chirped beams that permit heterodyne detection with reduction or elimination of Doppler shifts associated with target motion. As in most examples, the tracer beam is used to confirm alignment, but is otherwise unused.

Example 16

Figure 16B:
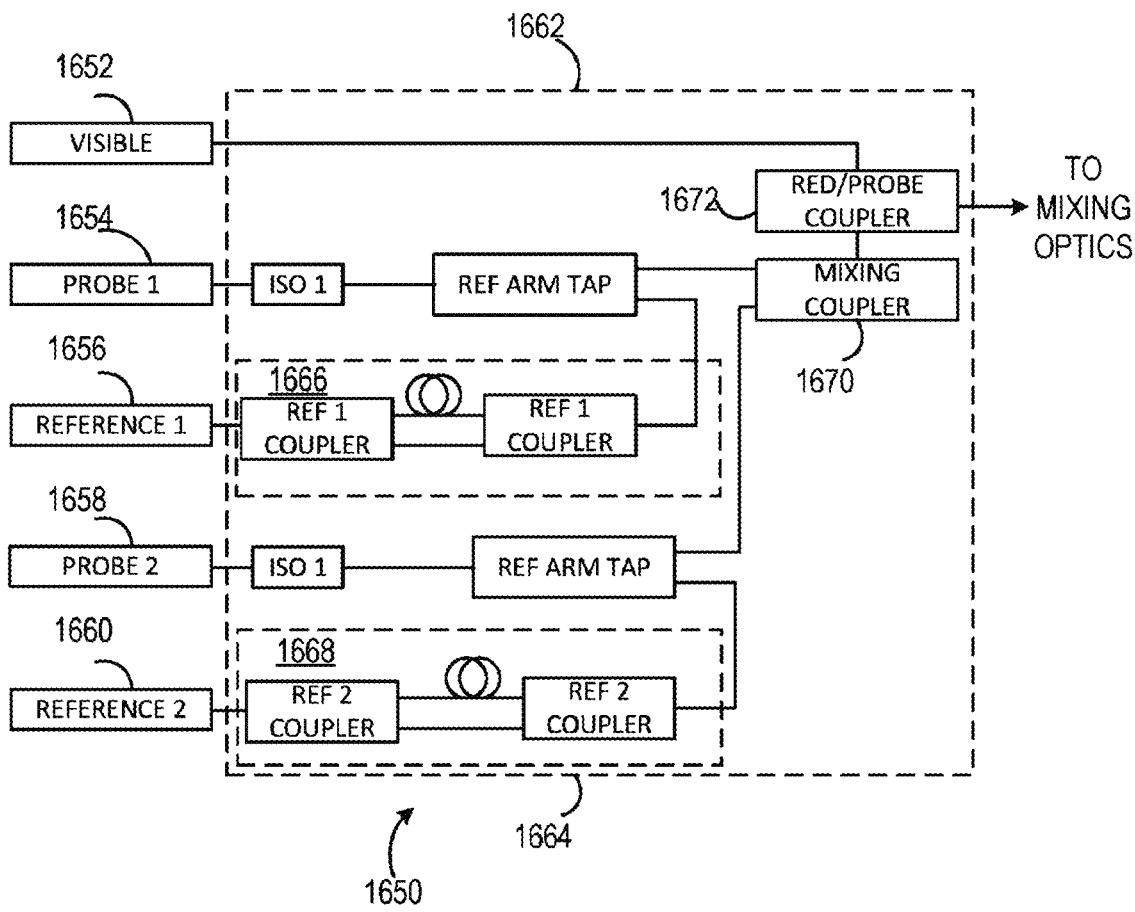
FIG. 16B illustrates a representative optical fiber circuit that provides two reference arms.

Referring to FIG. 16B, a representative optical system 1650 includes a first probe laser 1654, a second probe laser 1658, and a visible (typically red emitting) laser 1652. Portions of each probe laser beam are directed to respective reference paths 1666, 1668 to produce heterodyne signals at respective detectors 1656, 1658. A coupler 1670 combines portions of the probe beams that are then combined with a visible beam from the visible laser 1652 at a visible/probe coupler 1672. Typically, a hermetically sealed, temperature controller enclosure 1664 is provided to stabilize reference heterodyne frequency.

Example 17

Figure 16C:
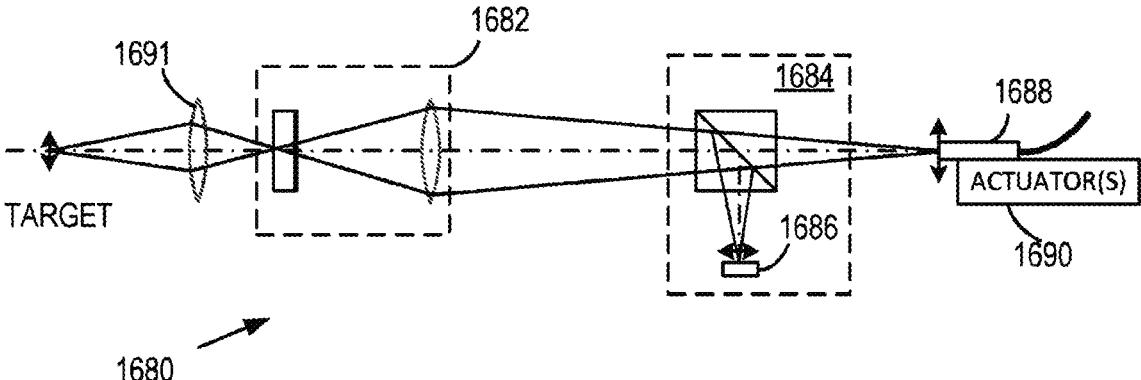
FIG. 16C illustrates beam scanning based on displacement of a beam delivery fiber.

An alternative optical system 1680 is shown in FIG. 16C. An actuator 1690 is attached to an output fiber end 1688 allowing for displacement of the fiber end 1688 and the associated output beam. A voice coil, piezoelectric, or other device can serve as an actuator. The displaced beam is directed through a beam coupler 1684 and mixing optics 1682 as described above to a lens 1691 that images the output beam at a target. The beam displacement results in a small motion or scan of the output beam at the target. For relatively small fiber motions, the LO beam and the measurement beam produced by the mixing optics remain efficiently overlapped at a detector 1686 to provide a usable RF (heterodyne) signal. By using a small, fast actuator such as a voice coil or a piezoelectric stack, the beam can be swept very quickly and accurately. Dual actuators can be used to sweep in two lateral directions. This provides a method to measure carefully selected points on a target in order to quickly measure a feature such as a hole or a post without using a scan mirror, which would typically be much slower. To accommodate beam displacements associated with this scanning, a larger area detector may be convenient, but excessive detector size can limit detector bandwidth and reduce heterodyne signal magnitude. In one example, a 1 mm fiber displacement produces a 0.4 mrad angular beam scan. Although only a single probe beam at a single wavelength is shown in FIG. 16C, two or more wavelengths can be used along with respective detectors.

Example 18

Figure 17A:
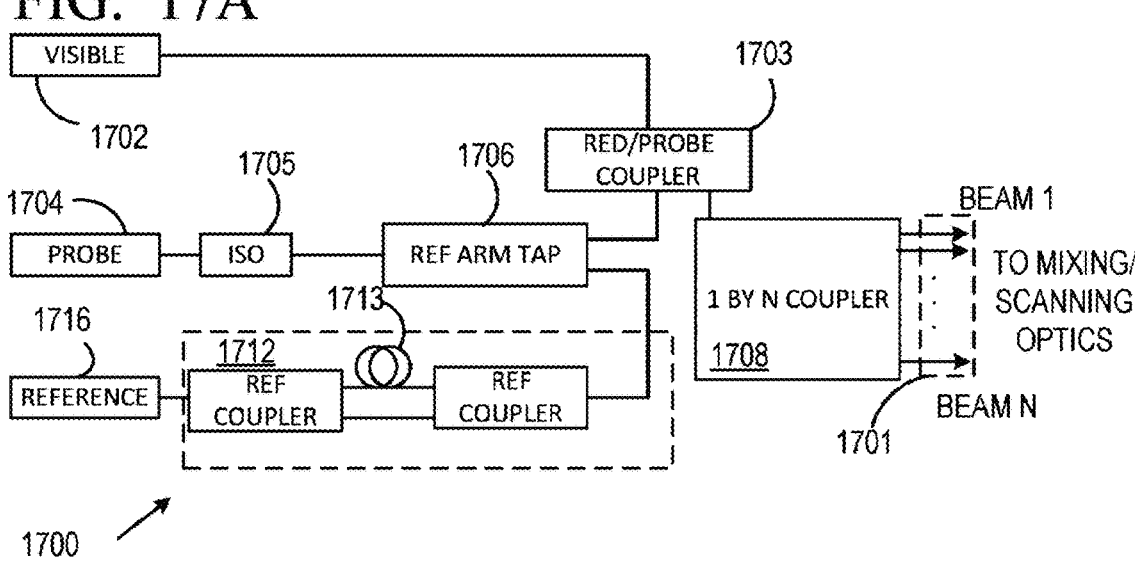
FIG. 17A illustrates a representative multi-beam laser radar.
Figure 17B:
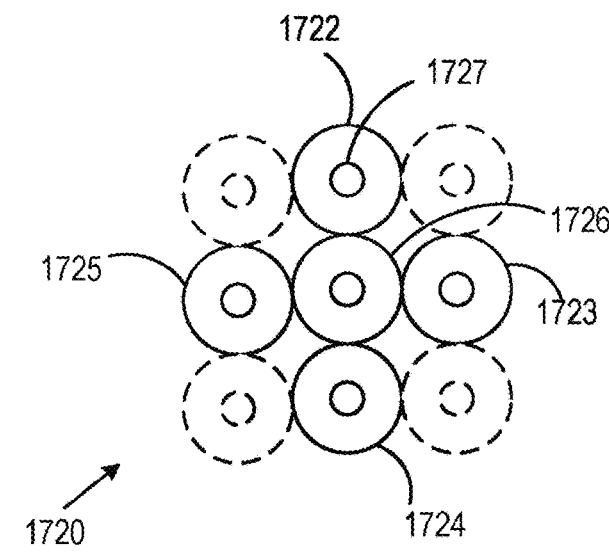
FIGS. 17B-17C illustrate a representative arrangement of fibers that produces multiple beams.
Figure 17C:
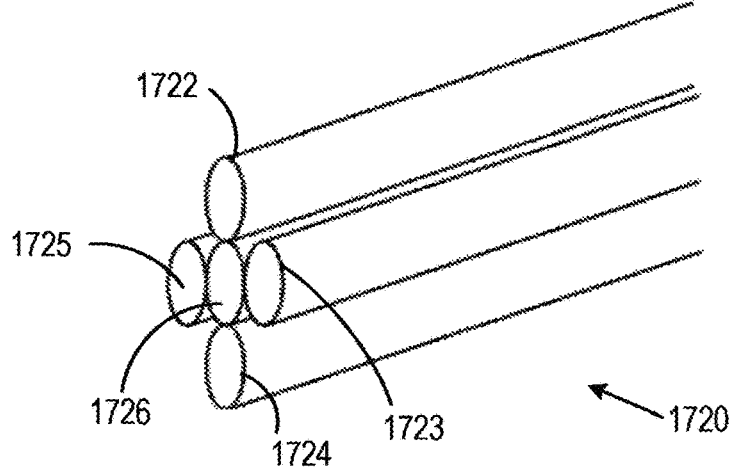

As shown in FIGS. 17A-17C, a measurement system 1700 can include multiple fiber outputs 1701 to provide multiple measurement locations for which measurements can be taken simultaneously. The measurement system 1700 includes a visible laser 1702 and a probe laser 1704 that are coupled through an optical isolator 1705. Portions of a probe laser beam are directed by a reference arm tap (typically a fiber coupler) 1706 to a reference arm 1712 and to a visible/probe coupler 1703. A 1 by N coupler 1708 receives the combined visible/probe beams and produces N combined visible/probe output beams. Alternatively, a 1 by N switch can be used. These N beams can be directed to common scan and projection optics. For convenient illustration, associated local oscillator beams and detectors are not shown.

Figure 17D:
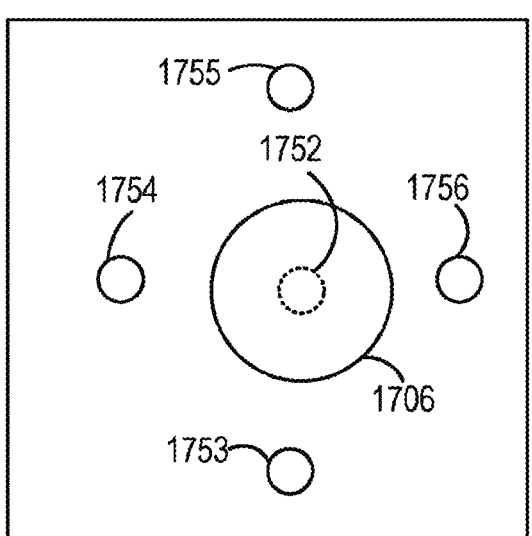
FIG. 17D illustrates beam spots at a target produced by the fiber arrangement of FIGS. 17B-17C.

FIGS. 17B-17C illustrate a representative array 1720 of optical fibers configured to direct the N beams to mixing optics. Representative fiber ends 1722-1726 are arranged in a cross shape, each having a respective core such as core 1727. If the output fibers are standard 125 μm diameter PM fibers, then if the fibers are touching, the cores are 125 μm apart. Focusing this array at a target produces a beam pattern 1750 shown in FIG. 17D, with beam spots 1753-1756 illustrated as direct onto a visible target surface and a beam spot 1752 within a recess 1706 in the target. The angular separation of the combined beams can be 0.5, 1, 2, 5, 10, or 20 mrad or more. Large separations may require attention to objective lens characteristics to maintain suitable beam focus, and large beam separations (such as 0.5, 1, 2, 5, 10, 20 mm) can be achieved. In the example of FIG. 17D, the bean spots 1753-1756 surrounding the hole 1706 would simultaneously provide returned probe beams associated with a range to the plane of the hole 1706 and an image of the recess 1706 could be processed to provide, along with the range information, hole diameter. Such measurements would be much faster than with conventional approaches that require scanning.

Figure 18:
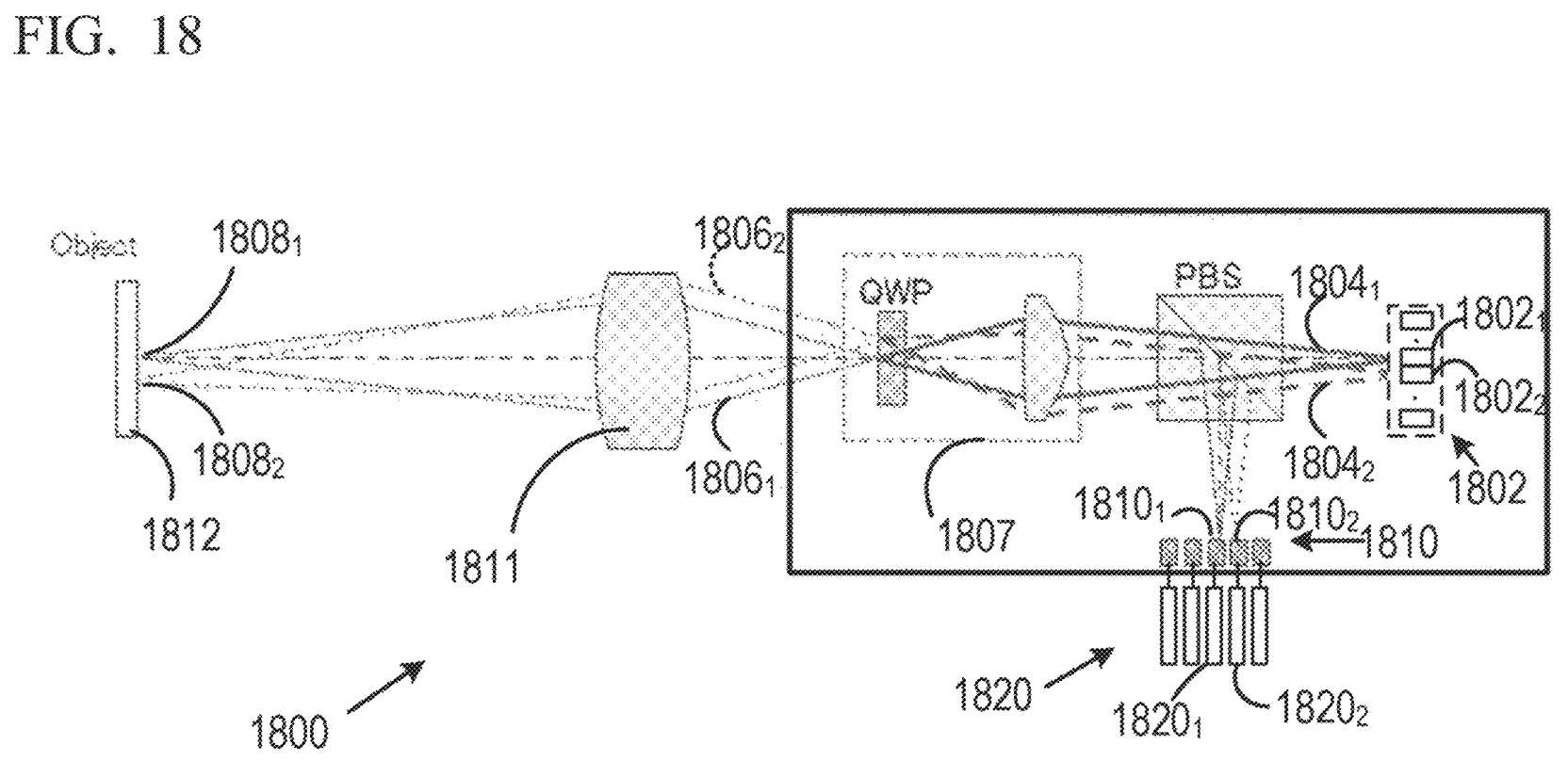

FIG. 18 illustrates a representative multi-fiber optical configuration. In this configuration, a detector array 1810 is situated to capture mixing signals (i.e., returned probe beam portions and LO beams) for each fiber. A plurality of fiber ends 1802 (including representative fiber ends $1802_1$, $1802_2$) direct probe beams to a polarizing beam splitter and a cat-eye assembly 1807 comprising a lens and a quarter-wave plate as described above. The cat-eye assembly 1807 produces LO beams by reflecting portions of the probe beams from a surface of the quarter-wave plate. The probe beams are directed by an objective lens 1811 to an object 1812; probe beams from each of the fibers of the plurality of fibers ends 1802 provide corresponding beam spots at the object 1812 (for example, representative beam spots $1808_1$, $1808_2$). Probe beam portions from the object 1812 are returned to the objective lens 1811, the cat-eye assembly 1807, and the PBS and to respective detectors (such as representative detectors $1810_1$, $1810_2$) of the detector array 1810. If dual wavelength probe beams are used, a dichroic beam splitter and an additional detector array can be used. Beams from only two fiber ends are illustrated: a beam from the fiber end $1802_1$ is indicated as 18041, $1806_1$ and a beam from the fiber end $1802_2$ is indicated as $1804_2$, $1806_2$. Heterodyne signals associated with each of the plurality of fiber ends 1802 are processed at corresponding processing elements 1820 (such as processing element $1820_1$, $1820_2$) to establish distance, range, or dimension estimates. In other examples, a single processing system is used and heterodyne signals are processed one at a time. For example, an electrical switch can receive all heterodyne signals and sequentially couple a selected heterodyne signal for processing. In FIG. 18, the fiber ends are shown distributed along a single direction, but cross-shaped or other distributions can be used (e.g., along diagonal lines, curves, edges and/or interiors of polygons).

Example 19

Laser radar can include a camera that is aligned along the radar axis. Such implementations can use inexpensive surveillance cameras having calibration parameters that vary with spatial orientation to gravity and environmental conditions such as temperature. Camera data is processed and presented independent of laser scan data, and real time coordination between the camera and the laser radar data may be difficult possible. In some disclosed examples, a metrology camera is situated to use common focusing optics with a laser radar measurement path; such a camera is referred to herein as a confocal camera and the associate laser radar referred to as a confocal Laser Radar (cLR). This provides measurements over 6 degrees of freedom (DOF) between the camera and the laser radar. Such a camera can be a high definition camera and coupled to provide camera data at a low level in the system architecture to minimize or reduce latency between the data allowing real time coordination of the LR and camera data. Using the two measurement modes (LR and camera) in a confocal Laser Radar allows the LR to be pointed to optimally measure a feature of interest. Additionally, a low latency data interface allows real time algorithms and the tracking of features identifiable in the camera.

The Laser Radar measures the azimuth, elevation, and range to a surface of interest. Azimuth and Elevation are read from encoders on the appropriate shafts. The range measurement is accomplished with heterodyne interferometry and can be made on almost all surfaces without interference from ambient light. The conversion of Range (R), Azimuth (A) and Elevation (E) into rectilinear coordinates XYZ is accomplished through well-known spherical coordinate to Cartesian coordinate conversions such as:

$$X_{LR}=R^*\cos(E)^*\cos(A)$$

$$Y_{LR}=R^*\cos(E)^*\sin(A)$$

$$Z_{LR}=R^*\sin(E)$$

A calibrated camera can be viewed as an angle measurement device where the azimuth and elevation of every pixel in the picture can be determined. With the LR and the camera having a confocal relationship, the range measurement can provide scale to the camera image. This relationship allows the center pixel of the camera to be directly related to $XYZ_{LR}$. While it cannot be guaranteed that the projection of the camera focal plane onto the scene is perpendicular to the central axis of the lLR, the actual relationship can be determined through a calibration process. With a calibrated camera, planar features can be measured directly by the camera once the range is determined by the LR. Other features with a known geometry such as spheres can also be measured once range is established.

Referring back to FIG. 12A, an auto-focus (AF) linear translation stage 1253 is coupled to one or more of the lenses 1246, 1248 to allow probe beam focus over a measurement range (such as 0.5 m to 30 m or 50 m). The beam splitter 1244 reflects visible light (or other imaging radiation) from the target or other scene to a camera 1257 so that beam position can be displayed on a camera screen or other display device. The camera 1257 is coupled to one or more processing systems 1258 and an output can also be used to provide the input images for computer based-measurements algorithms Since the camera 1257 and the probe beams share the same focusing optics, the relationship between a camera sensor array and a position of the measurement beam on the target (a point of measurement) remains invariant as long as the camera mount is stable. This invariance establishes the camera 1257 as a confocal camera and permits scan beam focusing using the autofocus stage 1253. In one example, focus is adjusted to provide maximum contrast in images produced by the camera 1257. In such an arrangement, the probe beam can be rapidly focused and directed to a selected location in the camera image. Variations of the position of probe beams with respect to the camera at different focus position, if any, can be corrected with a calibration as can any variation due to ambient temperature. Additional focus corrections can be made using a focus signal based on the laser radar probe beam as provided by a laser radar focus controller 1255. In other examples discussed below, the processing system 1258 can be used to stitch images together to form a larger image, correct distortion in images to be stitched together, and to identify or track target features or objects such tooling balls or eyeball spheres.

Example 20

Figure 19:
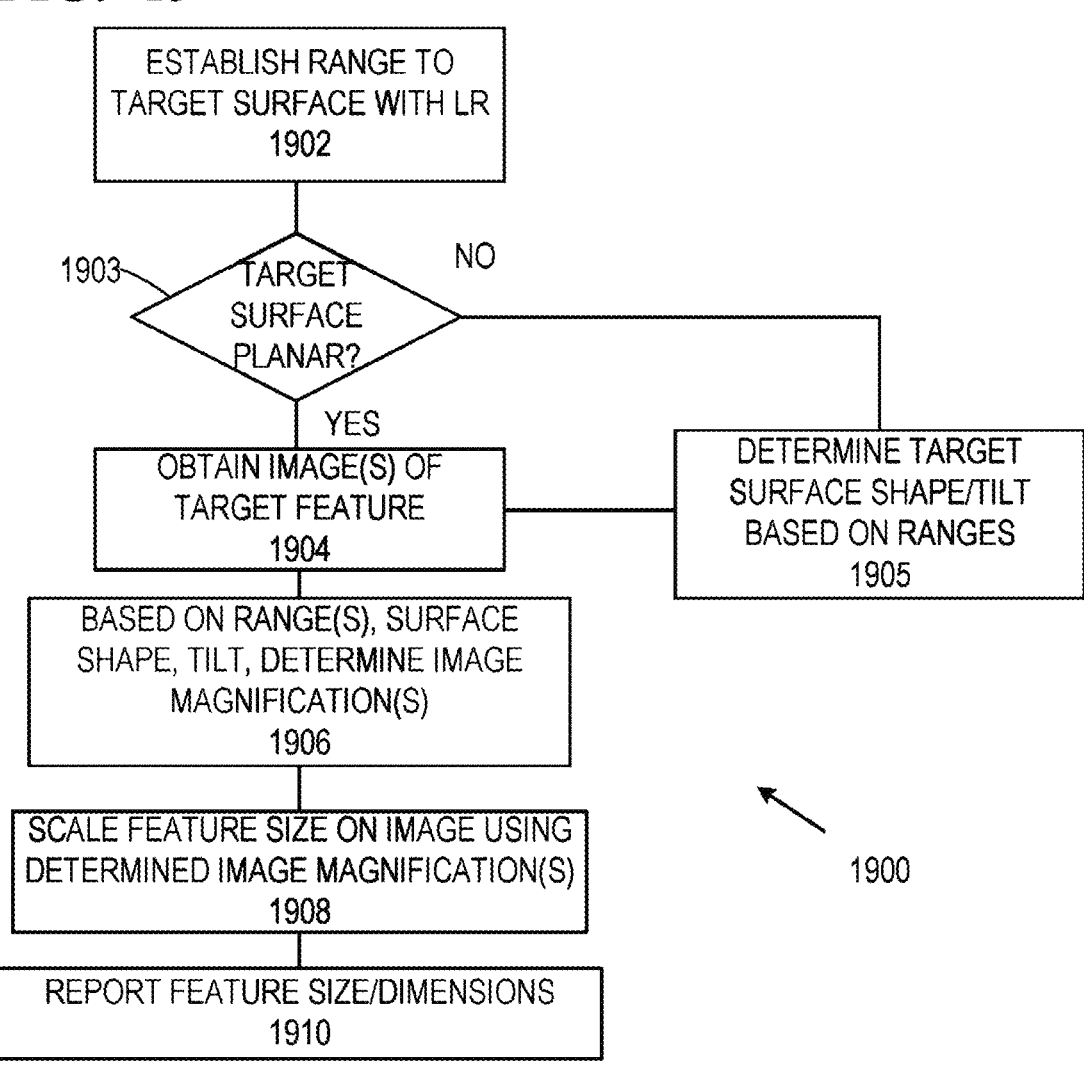
FIG. 19 illustrates a representative method of obtaining target dimensions and feature sizes using a confocal laser radar.

Referring to FIG. 19, a method 1900 of establishing target feature sizes or dimensions comprises establishing a range to a target surface at 1902. If the target surface is planar as determined at 1903, an image of a target feature is obtained at 1904. It the target surface is not planar, target surface shape, tilt, and ranges are established at 1905, typically by additional scanning. Alternatively, distortion in a preliminary image of a shape or structure of a known geometry can be evaluated. At 1906, image magnification(s) are determined for some or all image (i.e., target) locations. With the determined image magnification(s), feature sizes on the images can be appropriately scaled to actual dimensions at 1910. These scaled dimensions can be reported or stored at 1910. In some examples, the scaled dimensions are compared with design dimensions to determine if features are correctly sized.

Example 21

Figure 20:
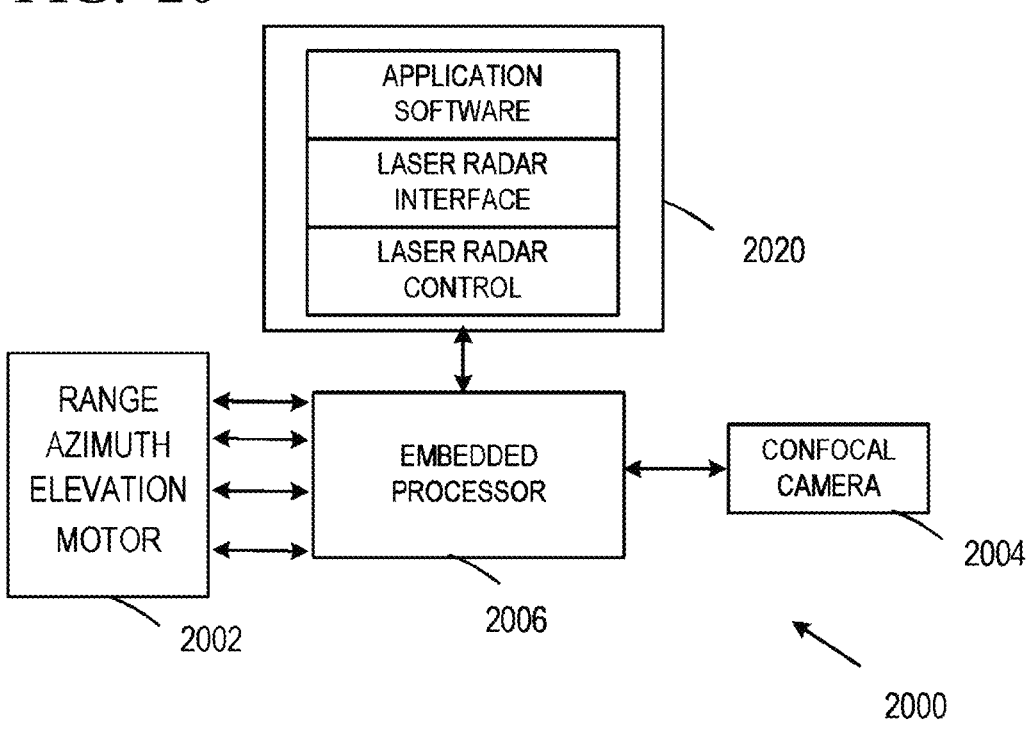
FIG. 20 illustrates a representative processing and control architecture for a laser radar such as a confocal laser radar.

Referring to FIG. 20, a laser radar system 2000 includes a laser radar ranging system 2002 that includes reporting and adjustments for establishing target azimuths and elevations, laser ranging measurement electronics that reports range, and a motor that controls azimuth and elevation. A confocal camera 2004 is also situated to produce an image of a target, and both the laser radar ranging system 2002 and the camera 2004 are coupled to an embedded processor 2006. Laser radar range data and image data are thus provided to the embedded processor 2006 without increased latency associated with communication of such data to a remote processor via a network or other communication connection, such as Ethernet or a Universal Serial Bus (USB). The example system of FIG. 20 permits cooperative use of a confocal camera and laser radar data, with rapid operation obtained by closely coupling the laser radar ranging system and the confocal camera. Each of these measurement systems is continually creating a data stream. As shown, this data is combined at the embedded computer which is physically associated with the confocal laser radar. This use of an embedded computer with a confocal laser radar facilitates search in which selected features are to be measured based on computer aided design (CAD) which is a digital representation of the part to be measured. In many cases, there is a list of features to be measured in CAD-coordinates. Under normal circumstances when the actual parts are measured the features are not at the ideal coordinates of the CAD. Additionally, the ideal measurement preferably occurs when the measurement device, here the confocal laser radar, is centered on the feature to be measured. Search algorithms that can identify any preselected feature must be executed but these search algorithms can be very inefficient. Because of the confocal and/or metrology relationship of the confocal laser radar, when the feature is in the field of view of the camera, the feature of interest can be automatically and quickly centered.

In other examples, fast alignments can be obtained prior to measurement. In many applications, before the system measures the features of interest an alignment to the part must be performed. The alignment can be of two types: (1) absolute where the laser radar measures a set of tooling balls that have a known relationship to the part, or (2) an alignment to a set of features. As mentioned above, searching with a camera allows the features to be found quickly. For tooling balls, the confocal laser radar has additional advantages. The camera can be used to center the laser radar on the tooling ball. In all algorithms it is generally presumed that the radius of the tooling ball is known so that a surface measurement of the tooling ball can be projected to the center of the tooling ball. After centering, four different algorithms can be used: (1) for a shiny tooling ball, presume the camera has centered the laser radar correctly and simply measure the range to the surface, (2) for a shiny tooling ball, perform a W-shaped laser radar scan to determine the precise angle to the tooling ball and then measure the range to the surface, (3) for a matte tooling ball, presume the camera has centered the laser radar correctly and simply measure the range to the surface, and (4) for a matte tooling ball, scan the surface to then perform a sphere fit to determine the position of the tooling ball. In all cases the ability to center with the camera improves speed and overall productivity.

The camera can measure features (such as tooling balls) in conjunction with the laser radar range measurement. In addition, the camera can measure planar features such as holes, slots, polygons, etc. For these types of measurements, there is only a void in the center of the feature. Therefore, the laser radar system must intentionally offset the camera field of view to pointing to the surface around the feature.

Example 22

Figure 21:
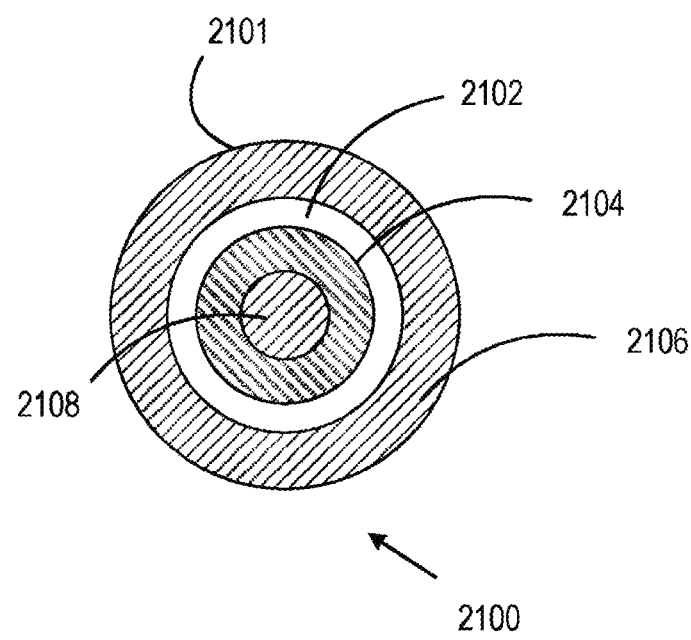
FIG. 21 illustrates a representative tracking target defined on a sphere.

Referring to FIG. 21, a representative tracking target 2100 is illustrated. The tracking target 2100 is based on a sphere 2101 having concentric rings 2102, 2104 defined on a sphere. The rings 2102, 2104 have different colors, reflectivities, surface finishes, patterns, or other features that are readily seen in camera images. Other portions 2106, 2108 of the target can have a common surface color or finish or the like. In some cases, the portions 2106, 2108 are shiny and highly reflective, while the rings 2102, 2104 have different colors. Such a tracking target can have 1, 2, 3, or more rings. For convenience in view of the appearance of such a tracking target, it is referred to herein as an "eyeball sphere" or "ES."

Figure 22:
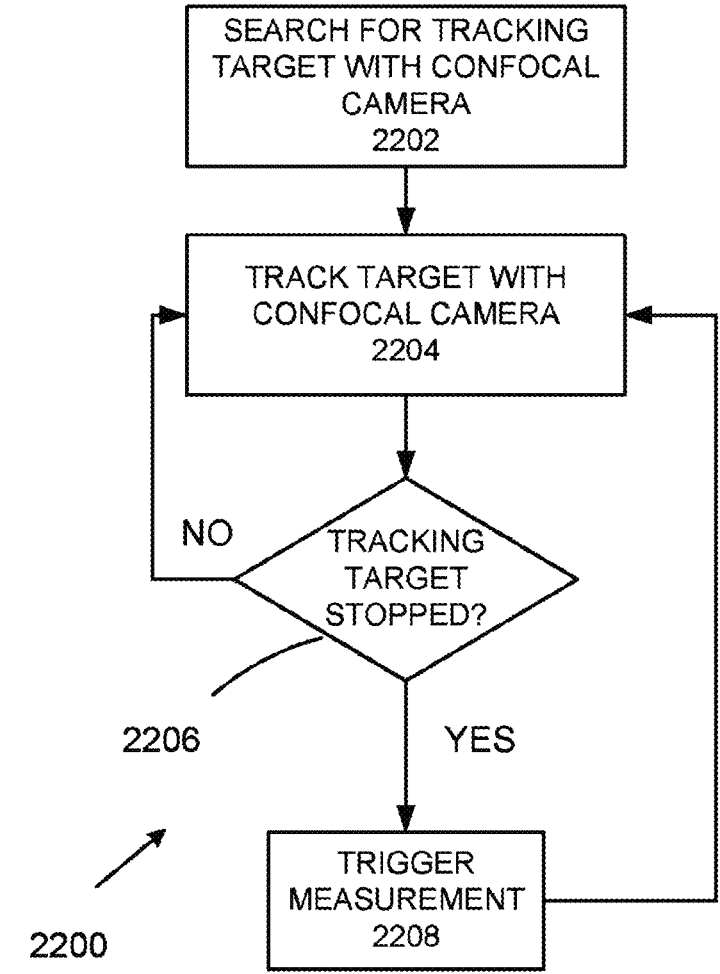
FIG. 22 illustrates a representative measurement method using a confocal laser radar.

FIG. 22 shows a representative method 2200 of using an ES. The ES must be initially situated within a field of view of the camera at 2202 by, for example, searching with the laser radar using spiral or angular search, which may have portions outside a camera field-of-view. In some cases, an operator can adjust target or laser radar positions. At 2204, the ES is tracked with the confocal camera. The ES can be tracked (or errors in tracking reduced) by keeping the annular rings centered in the camera field of view. As the rings leave the center of the field of view, one or more motors in the laser radar are commanded to orient the laser radar (and the confocal camera) to minimize the errors. The velocity of the movement is continually calculated and once the velocity goes below a threshold the ES is declared to not be moving at 2206. Then, at 2208, a measurement of the position of the sphere is triggered. The measurement returned is the center of the sphere. Normally the measurement of interest is a surface and sphere measurements are projected to the surface.

While an ES is particularly convenient, other tracking targets such as corner cubes mounted in spheres (referred to as "Spherically Mounted Retroreflectors" or "SMRs") can be used. Such targets should have a corner cube reflection point at a sphere center, otherwise errors may result. The ES does not exhibit misalignment in response to mishandling, unlike SMRs. The various areas of an ES can be provided with paint, be etched, frosted, or coated with a reflective, metallic, dichroic or other coating.

Figure 23:
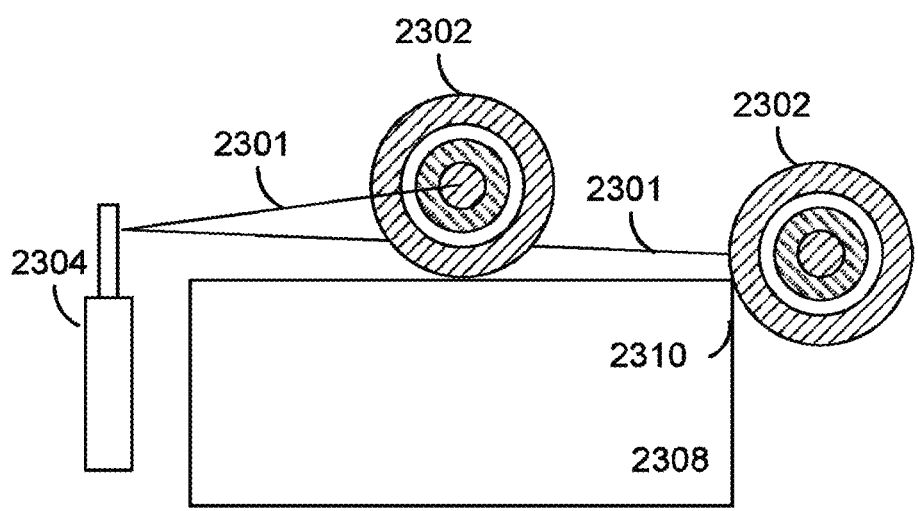
FIG. 23 illustrates placement of tracking targets for measurement of otherwise hidden areas.

An ES or other tracking target permits measurement of target areas having high angles of incidence to a laser radar 2304 or are hidden. With reference to FIG. 23, a tracking target 2302 is shown at different positions, permitting a probe beam 2301 from the laser radar 2304 to reach an otherwise hidden area 2310 of a target 2308.

In some examples, an ES is formed by modifying a precision sphere by adding rings of different colors. The rings could also be filled with retroreflective paint making them highly visible with a flash. The spheres can either be made of matte material or shiny creating three measurement modes: (1) matte where the angles are used from the camera and the range to the center of the sphere come from the laser radar, (2) a matte sphere fit on the spherical surface, or (3) a W-shaped laser radar scan on the specular point to find the angles and then a range measurement to the specular point. In modes 2 and 3 the laser radar makes all the measurements and the camera is centering the laser radar on the sphere and detecting that the sphere is not moving. In mode 1 the camera still is used for tracking and detection of lack of motion, however the angular measurements of the camera are combined with the LR measurements making the measurement almost instantaneous.

Example 23

Figure 24:
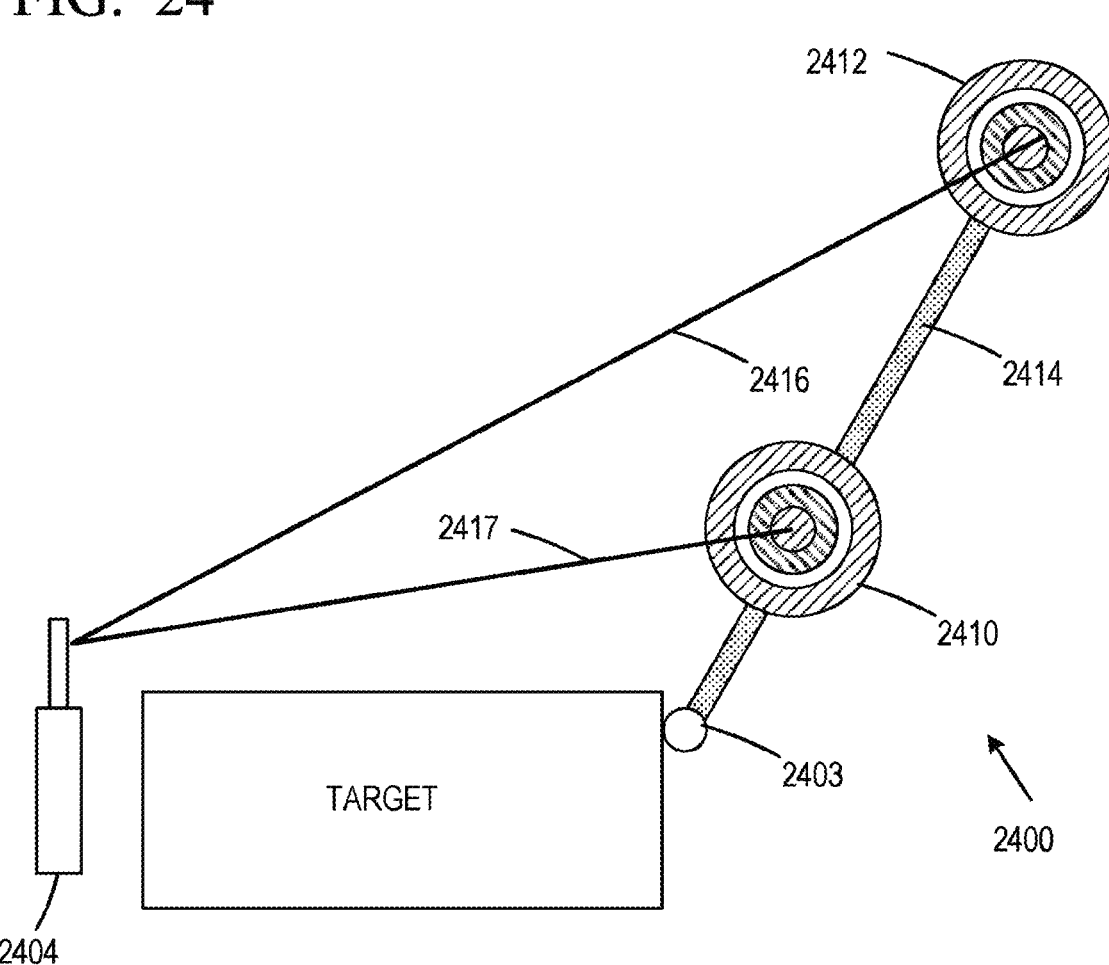
FIG. 24 illustrates an alternative approach to placement of tracking targets for measurement of otherwise hidden areas.

Another type of hidden point tool can also be used with tracking. As shown in FIG. 24, a vector bar 2400 can be created. If the centers of ESs 2410, 2412 are measured by a laser radar 2404 with probe beam axes 2416, 2417, then the result can be projected to the center of a measurement sphere 2403 or a measurement point. Such a measurement can be referred to as a stadia measurement. A complete 6DOF tool can be created with 3 eyeball spheres situated at different locations, and these eyeball spheres need not be co-linear.

With two eyeball spheres, two measurements are made which are the XYZ positions of the two eyeball spheres $(XYZ_1, XYZ_2)$. The distance between $XYZ_1$ and $XYZ_2$ is not critical but the distance $D_m$ between ES 2512 and the measurement sphere 2403 must be known. Superior measurement results are obtained if the centers of all three spheres are collinear. The center of the measurement sphere 2403 is projected to the surface of the target using normal techniques. A sample calculation of the XYZ of the measurement sphere 2403 is:

$$XYZ_m = XYZ_2 + D_m * \frac{XYZ_2 - XYZ_1}{\|XYZ_2 - XYZ_1\|}$$

Such measurements are practical because low latency allows each sphere ball to be measured in a few tenths of a second. While a tool having two fixedly separated eyeball spheres and a measurement sphere is convenient, such a tool can use a single eyeball sphere that can be moved to differing positions along a shaft 2414. Measurements at each position can then be used.

Example 24

Automated measuring systems using laser radar can require expensive and time intensive setup processes and take weeks to complete, requiring skilled personnel. Disclosed herein are systems that take advantage of a metrology grade high definition (HD) or other camera embedded in the laser radar. Machine learning algorithms are provided for identifying and/or measuring features such as holes, slots, studs and others features. So-called "collaborative robots" (typically including mirrors or other optical systems) permit blind spot measurements, and local tracking of the measuring device to reduce setup time and speed up measurement time.

In some disclosed examples, tooling balls that are placed about the part to be measured are not needed, and augmented reality applications can overlay CAD images of parts and a camera image. This allows automated detection of parts and can be used to direct the laser radar to measure/scan selected target areas. Lengthy laser radar scans are then not needed to locate target areas of interest. For some applications, an additional mirror is used with a laser radar for measurements of hidden or difficult to reach points that are not in a direct line of sight. Such mirrors are generally small, and therefore provide a limited field of view from a fixed position. By attaching such mirrors to a robot, this limited field of view can be greatly extended with automated movement. The use of collaborative robots allows easy positioning of the mirror and the measurement area does not need to be guarded for safety. The collaborative robot therefore can position the mirror in multiple, repeatable, and stable positions allowing for greater field of view than a static mirror position and also allowing for more measurements from a single laser radar position.

Figure 25A:
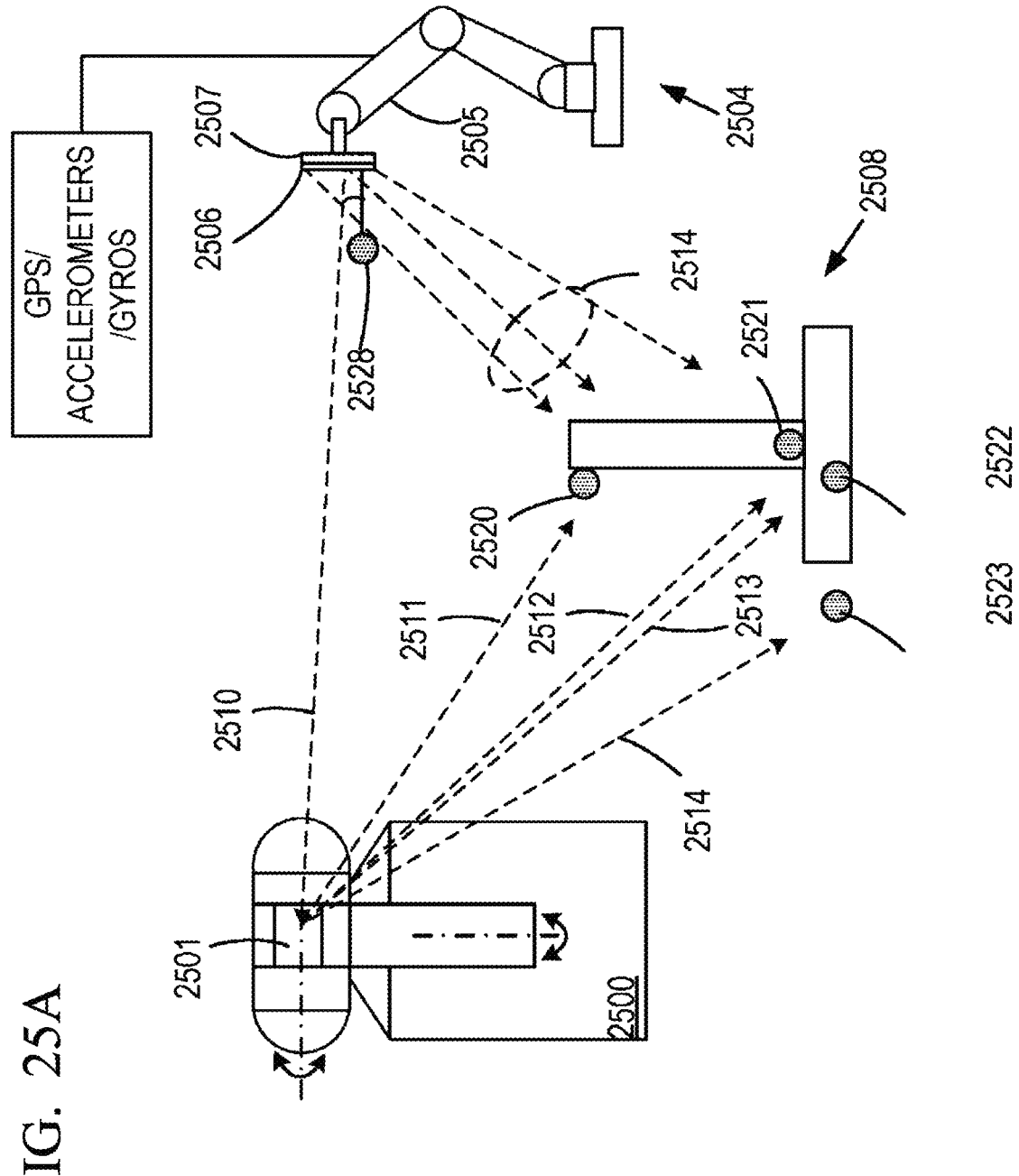
FIGS. 25A-25B illustrate use of a collaborative robot (COBOT) with a laser radar system.
Figure 25B:
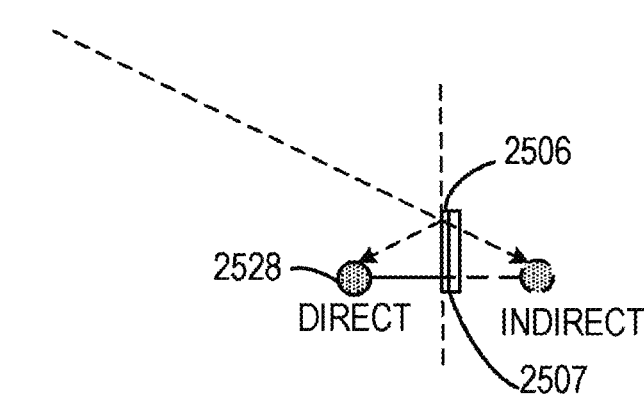

With reference to FIG. 25A, a mirror 2506 is mounted to tool flange 2507 of a collaborative robot (COBOT) 2504. Typically, a COBOT includes one or more translation stages and one or more rotational stages so that the mirror 2506 can be set to a selected position and angle. In some examples, a tooling ball 2528 is attached at an offset in front of the mirror 2506 on a stiff shaft. (Although tooling balls are used in this example, systems that include a metrology camera need not use tooling balls.) A laser radar 2500 is situated in a single fixed position or is secured to a programmable positioner so that the laser radar 2500 can be repeatably positioned. Positions of the mirror 2506 are programmed into the robot 2504, either manually or using simulation software such that hidden features of an object to be measured are visible from a selected laser radar position. As shown in FIG. 25B, initial positions of the tooling ball 2528 are measured with the laser radar 2500 both directly and indirectly (i.e., via a reflection of the tooling ball 2528 in the mirror 2506) to determine a nominal position of the tooling ball 2528 and a define a surface of the mirror 2506 through a perpendicular bisector plane of a line joining centers of the tooling ball 2528 and a tooling ball image in the mirror 2506. In addition to movement of the COBOT 2504, an arm 2505 to which the tool flange 2507 is secured can be moved to access additional locations on the object 2508.

Following this setup, the COBOT 2504 can be driven to each of a plurality of programmed positions and the laser radar 2500 can automatically measure the tooling balls based on the nominal values obtained earlier. This allows for automatic, accurate determination of mirror position for use in sample measurements. In some cases, typically those in which a lower accuracy is sufficient, robot repeatability may be sufficient.

In order to coordinate mirror measurements and COBOT positioning, digital or physical IO from the COBOT is provided with either a direct connection to the measurement PC or through a programmable logic controller (PLC) based on OPC, Profinet or other standard PLC interfaces. Interface software on the PC can coordinate with movement and in-position signals from the COBOT and measurement signals from the laser radar. This may comprise separate software platforms connecting to teach other or may be part of a single software suite to control both the communications to the PLC and the laser radar itself.

The use of the COBOT 2504 and the mirror 2506 in combination with the attached tooling ball 2528 allows faster measurements, permits measurements with reduced laser radar or part repositioning, and reduces a number of tooling ball measurements required. Multiple mirror positions can be made for a single laser radar position and mirror movements could be made during other measurements of the part, reducing dead measurement time, or simultaneously during repositioning moves. The COBOT 2504 does not necessarily require safety fencing or zoning and therefore can be placed close to the part and even move while operators are nearby. Automatic cleaning of the mirror 2506 can be based on force feedback of the COBOT 2504 through a pad, or from air combs or blowers to prevent deposition of material on the mirror surface.

FIG. 25A shows representative tooling balls 2520-2523 situated at the object 2508 under measurement, in addition to the tooling ball 2528 at the COBOT 2504. The tooling balls 2528 and 2520-2523 can be irradiated along respective axes 2510 and 2511-2514 in response to beam scanning from a scan surface 2501.

Example 25

Figure 26:
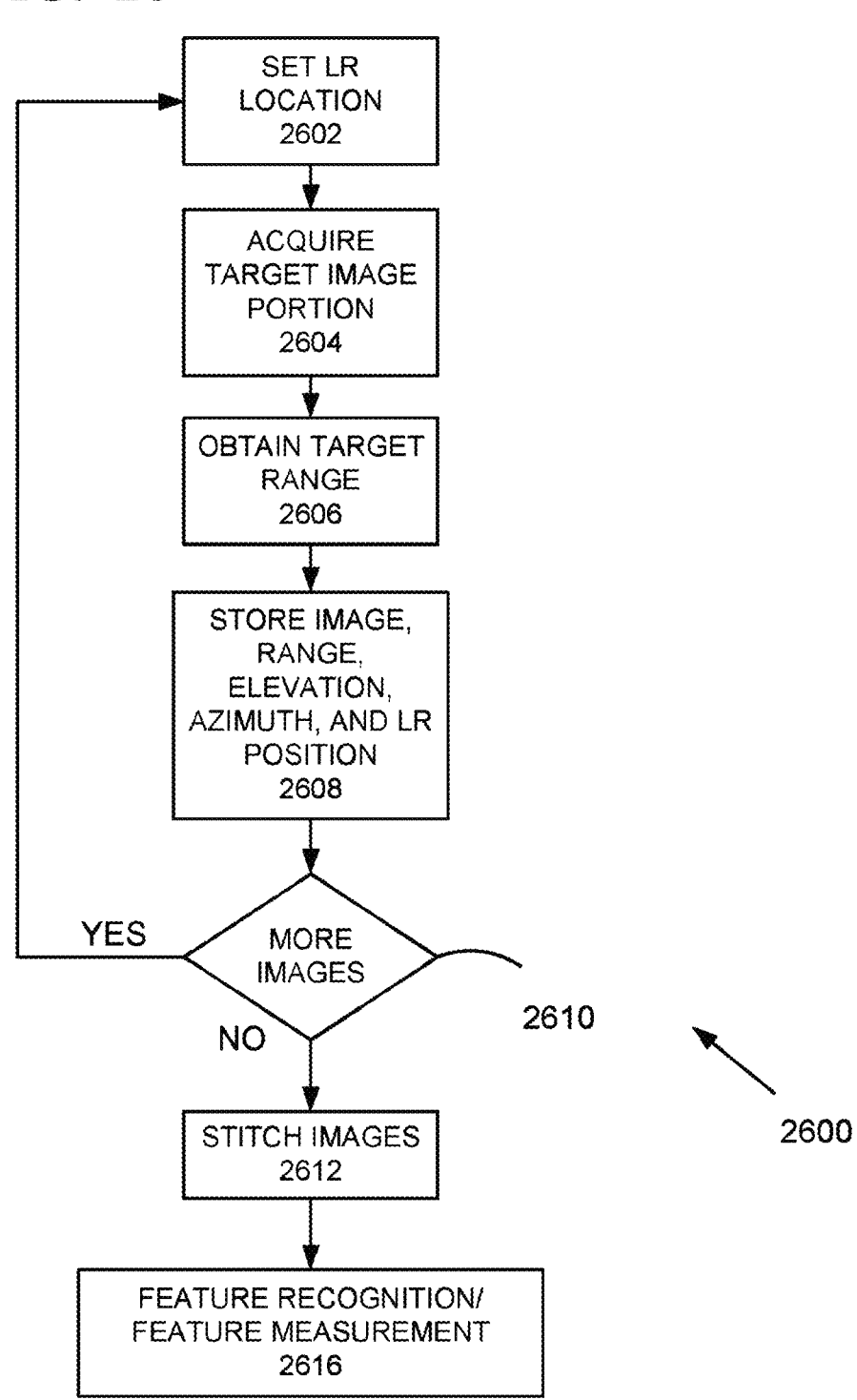
FIG. 26 illustrates a representative method of measuring features on a target of interest.

A boresight camera/laser radar system permits acquisition of a target image by stitching together multiple images associated with different portions of the target. Each camera image can be associated with a target distance obtained with the laser radar, and any camera tilt can be compensated using features of known shape as discussed above. In a representative method 2600 shown in FIG. 26, at 2602, a confocal laser radar is set at a fixed position and at 2604, an image of at least a portion of a target is obtained. At 2606, range to the target portion is measured using the laser radar probe beam. At 2608, the acquired image and associated range, azimuth, elevation, and laser radar position coordinates are stored. At 2610, it is determined if additional images are intended. If so, image acquisition repeats, with the laser radar position set at 2602. The laser radar position can remain fixed to a previous location, or a new location selected. If all intended images have been acquired, images are stitched at 2612 to make an image of a larger target area. This image can be used to location specific target features, provide feature measurement, identify target areas for additional laser radar measurement, or other purposes. In typical examples, the laser radar is repositioned one or more times to produce a full view of a target under evaluation.

In some cases, image stitching produces superior results after camera/probe beam calibration. For example, in some examples, a camera field of view center is determined based on one or more images that include image portions corresponding to a location on the target at which a probe beam/tracer beam is incident. In another example, images of a grid pattern can be evaluated to determine image distortion introduced by the projection lens used by the camera and the probe beam. Such distortions can be corrected or compensated for images to be stitched.

Example 26

Figure 27:
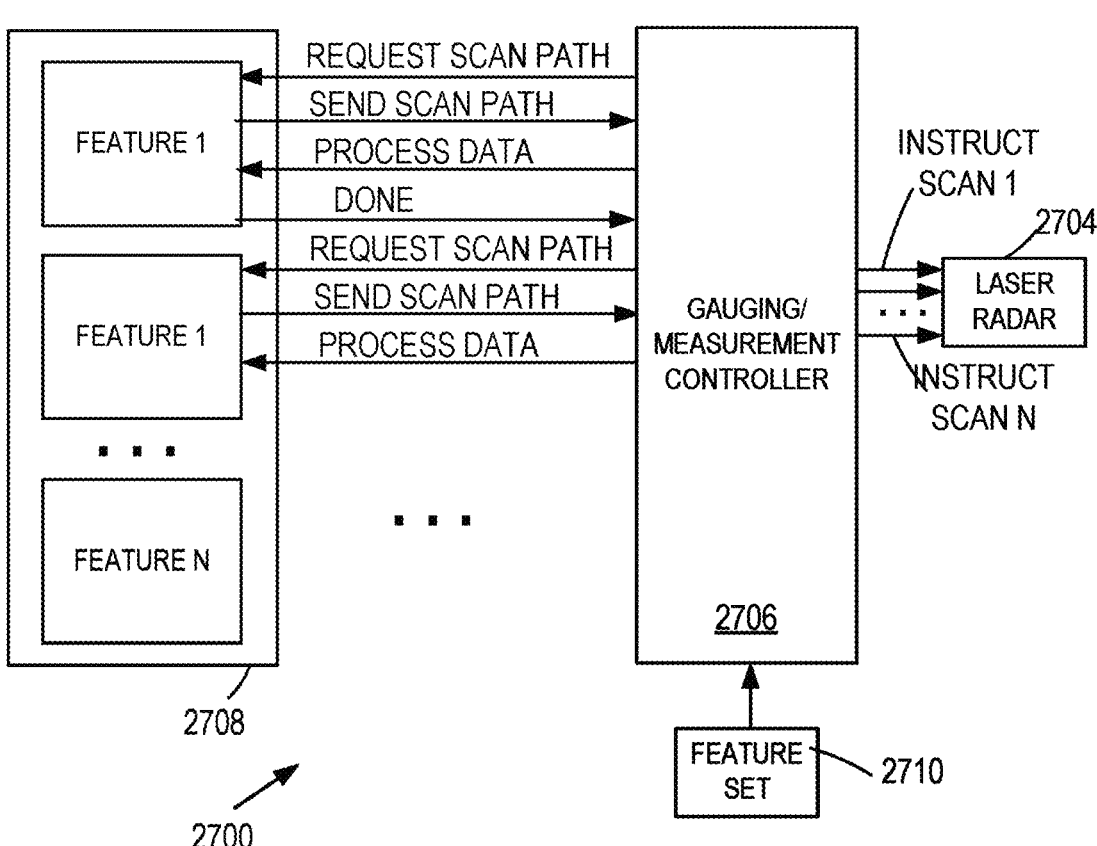
FIG. 27 illustrates a system for rapid, parallel measurement of multiple target features.

With reference to FIG. 27, a representative control and measurement apparatus 2700 for use with a laser radar such as a confocal laser radar 2704 includes a measurement controller 2706 and an embedded feature processor 2708. One or both of these can be implemented in one or more central processing units, FPGAs, ASICs, or as a System on a Chip (SOC). As shown, one or more features are included in a feature set 2710 that is communicated to the measurement controller 2706, which for each feature, communicates a request for a corresponding scan path to the feature processor 2708. A scan path is returned, and a suitable scan of the laser radar 2704 is executed, and laser radar measurement data is returned to the feature processor 2708. Upon receipt of satisfactory measurement data, the feature process 2708 communicates to the measurement controller 2706 that the measurement is complete. Similar messaging is performed for each feature of the feature set 2710, and processing of data for one or more scan paths can be performed while scanning of one or more other scan paths is in process. The feature set 2710 can include specifications of various target features such as part dimensions, hole sizes and locations, part shapes, orientations, and the like. Scan data returned from the laser radar 2704 can include laser range data and/or image data obtained with a confocal camera.

Example 27

In laser radars that include an appropriate imaging system (such as a high definition camera), the laser radar probe beam can be directed to a region of interest based on features selected from target images. In such measurements, tooling balls are not needed. In addition, a target design (such as a CAD image) can be overlaid or otherwise displayed with a camera image for part evaluation. Features to be evaluated can be identified from camera images, and scan paths produced for feature measurement. The laser radar can be driven with these scan paths for part assessment. As shown above, a mirror that is positioned at a collaborative robot can be used for measurements that would otherwise be impossible without repositioning of the laser radar. In some cases, the collaborative robot is controlled based on a selected scan path. A collaborative robot can be situated in spaces that require strict safety measures for human operators, thus simplifying the measurement process. In some cases, a location of a laser radar or other measurement apparatus can be determined using GPS, gyroscopes, and/or accelerometers; in some cases, such tracking can eliminate the need to use tooling balls for alignment.

By contrast, conventional laser radar requires four tooling balls be situated on a part for each robot position, and typically 10 or more robot positions are required. Laser radar that can be aligned without tooling balls as disclosed herein can permit rapid, simple part setup and measurement. Using a camera as discussed above, machine learning can be used to detect features and identify those that appear to be in the wrong position, and adjust feature parameters, without reliance on an assumption that the part conforms to a corresponding CAD design.

Example 28

Figure 28:
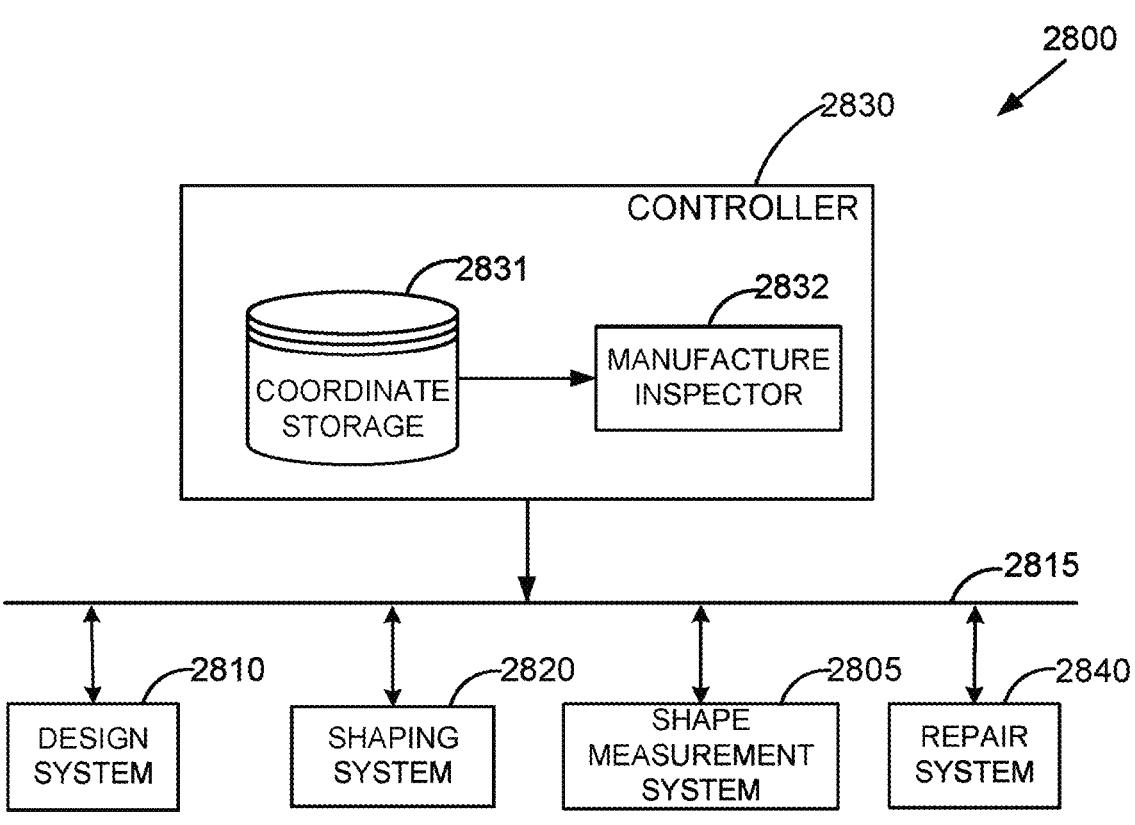
FIG. 28 is a block diagram of a representative manufacturing system that includes a laser radar or other profile measurement system to manufacture components, and assess whether manufactured parts are defective or acceptable.

FIG. 28 illustrates a representative manufacturing system 2800 suitable for producing one or more components of a ship, airplane, or part of other systems or apparatus, and for evaluating and reprocessing such manufactured components. The system 2800 typically includes a shape or profile measurement system 2805 such as the laser radar systems discussed above. The manufacturing system 2800 also includes a design system 2810, a shaping system 2820, a controller 2830, and a repair system 2840. The controller 2830 includes coordinate storage 2831 configured to store measured and design coordinates or other characteristics of one or more manufactured structures as designed and/or measured. The coordinate storage 2831 is generally a computer readable medium such as hard disk, random access memory, or other memory device. Typically, the design system 2810, the shaping system 2820, the shape measurement system 2805, and a repair system 2840 communicate via a communication bus 2815 using a network protocol.

The design system 2810 is configured to create design information corresponding to shape, coordinates, dimensions, or other features of a structure to be manufactured, and to communicate the created design information to the shaping system 2820. In addition, the design system 2810 can communicate design information to the coordinate storage 2831 of the controller 2830 for storage. Design information typically includes information indicating the coordinates of some or all features of a structure to be produced.

The shaping system 2820 is configured to produce a structure based on the design information provided by the design system 2810. The shaping processes provided by the shaping system 2820 can include casting, forging, cutting, or other process. The shape measurement system 2805 is configured to measure the coordinates of one or more features of the manufactured structure and communicate the information indicating measured coordinates or other information related to structure shape to the controller 2830.

A manufacture inspector 2832 of the controller 2830 is configured to obtain design information from the coordinate storage 2831, and compare information such as coordinates or other shape information received from the profile measuring apparatus 100 with design information read out from the coordinate storage 2831. The manufacture inspector 2832 is generally provided as a processor and a series of computer-executable instructions that are stored in a tangible computer readable medium such as random access memory, a flash drive, a hard disk, or other physical devices. Based on the comparison of design and actual structure data, the manufacture inspector 2832 can determine whether or not the manufacture structure is shaped in accordance with the design information, generally based on one or more design tolerances that can also be stored in the coordinate storage 2831. In other words, the manufacture inspector 2832 can determine whether or not the manufactured structure is defective or nondefective. When the structure is not shaped in accordance with the design information (and is defective), then the manufacture inspector 2832 determines whether or not the structure is repairable. If repairable, then the manufacture inspector 2832 can identify defective portions of the manufactured structure, and provide suitable coordinates or other repair data. The manufacture inspector 2832 is configured to produce one or more repair instructions or repair data and forward repair instructions and repair data to the repair system 2840. Such repair data can include locations requiring repair, the extent of re-shaping required, or other repair data. The repair system 2840 is configured to process defective portions of the manufactured structure based on the repair data.

Example 29

Figure 29:
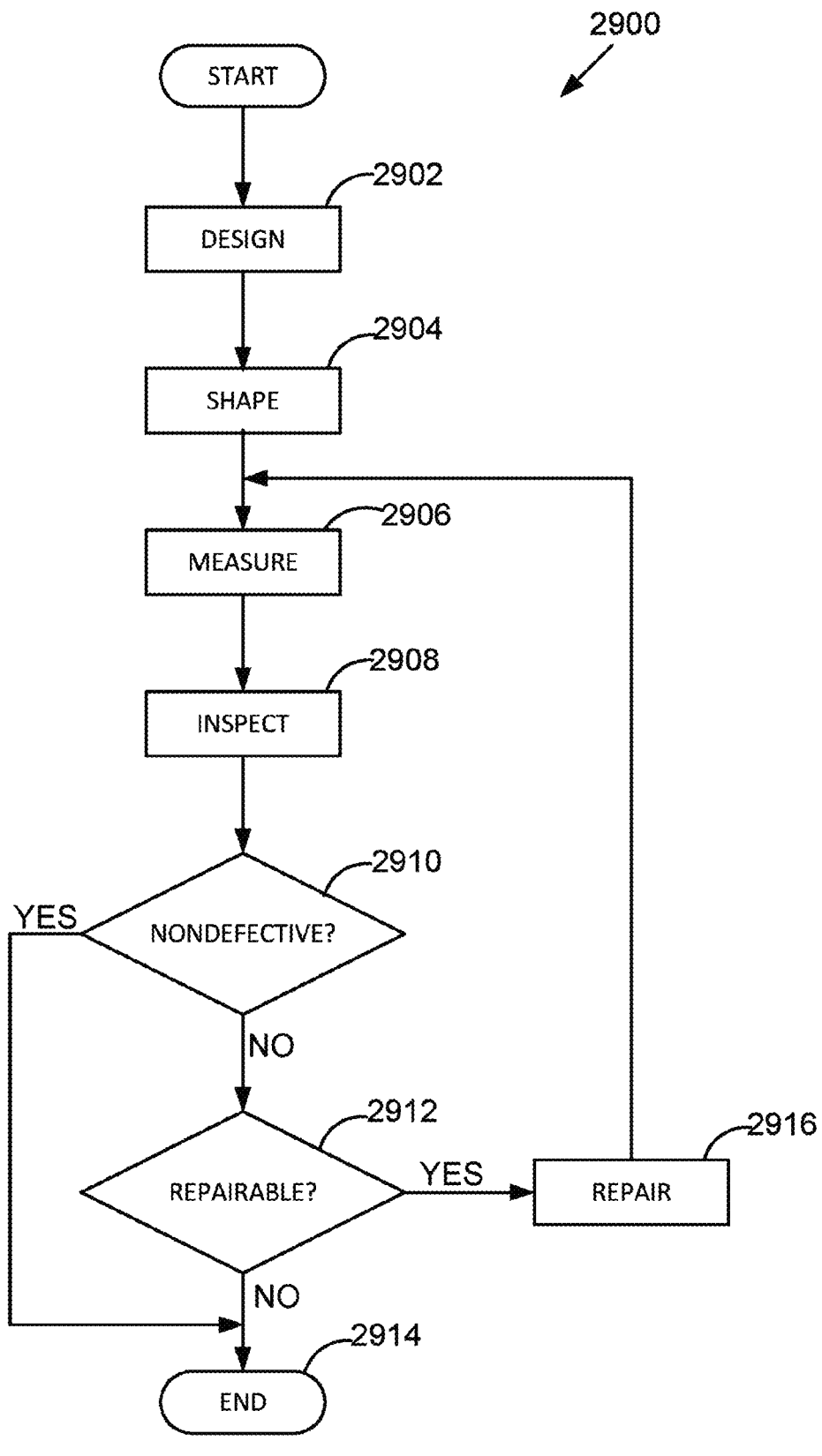
FIG. 29 is a block diagram illustrating a representative manufacturing method that includes profile measurement to determine whether manufactured structures or components are acceptable, and if one or more such manufactured structures can be repaired.

FIG. 29 is a flowchart showing a representative manufacture method 2900 that can incorporate manufacturing systems such as illustrated in FIG. 28. At 2902, design information is obtained or created corresponding to a shape of a structure to be manufactured. At 2904, the structure is manufactured or "shaped" based on the design information. At 2906, coordinates, dimensions, or other features of the manufactured structure are measured with a profile measurement system such as the laser radar systems described above to obtain shape information corresponding to the structure as manufactured. At 2908, the manufactured structure is inspected based on a comparison of actual and design dimensions, coordinates, manufacturing tolerance, or other structure parameters. At 2910, if the manufactured structure is determined to be nondefective, the manufactured part is accepted and processing ends at 2914. If the manufacture part is determined to be defective at 2910 by, for example, the manufacture inspector 1932 of the controller 1930 as shown in FIG. 19, then at 2912 it can be determined whether the manufacture part is repairable. If repairable, the manufactured part is reprocessed or repaired at 2916, and then measured, inspected, and reevaluated at 2906, 2908, 2910, respectively. If the manufactured part is determined to be unrepairable at 2912, the process ends at 2914.

According to the method of FIG. 29, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 28-29 are exemplary only, and other arrangements can be used.

In the above embodiment, the structure manufacturing system 2800 can include a profile measuring system such as the laser radars and associated optical systems disclosed herein, the design system 2810, the shaping system 2829, the controller 2830 that is configured to determine whether or not a part is acceptable (inspection apparatus), and the repair system 2840. However, other systems and methods can be used and examples of FIGS. 28-29 are provided for convenient illustration.

Example 30

Figure 30A:
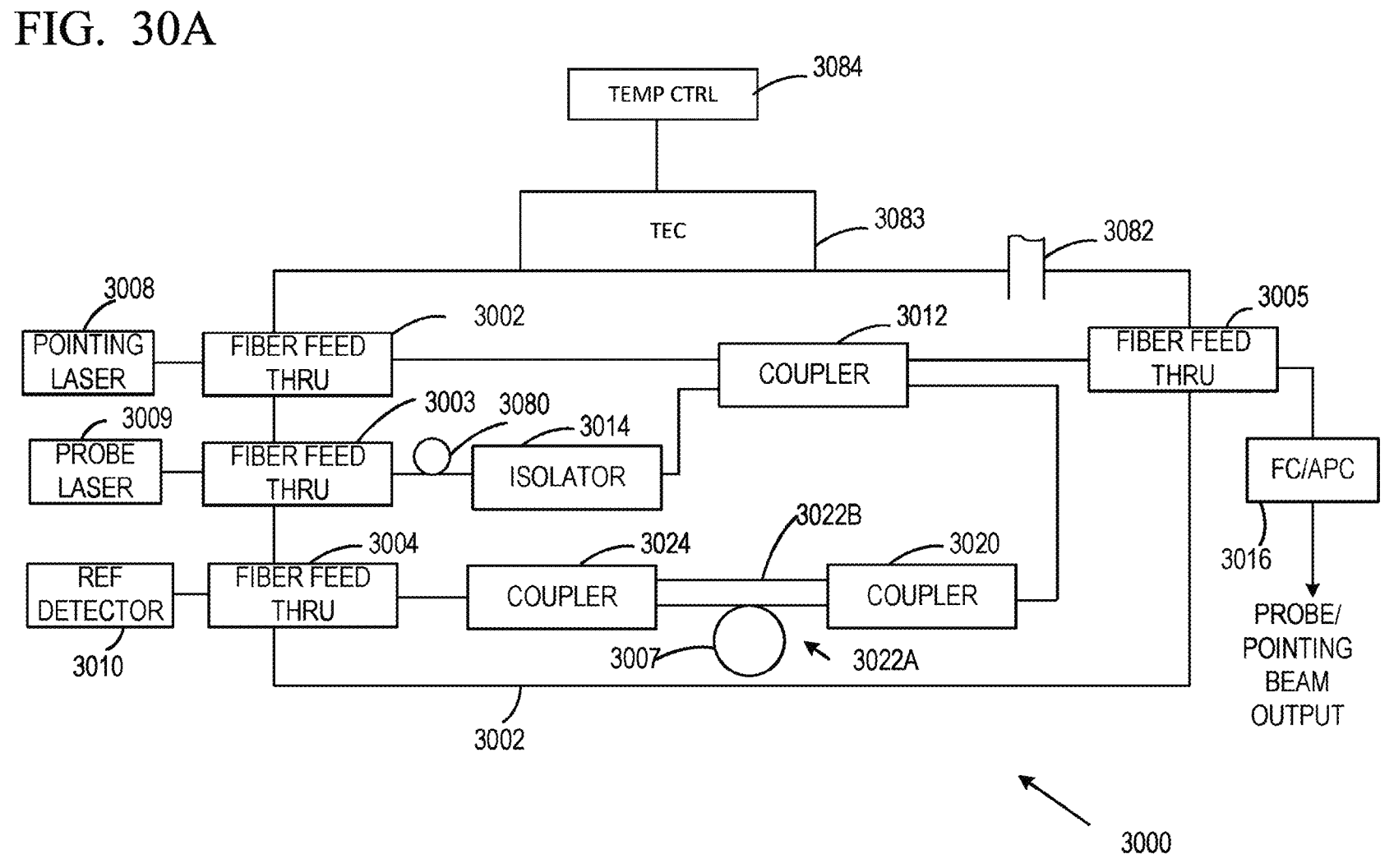
Figure 30B:
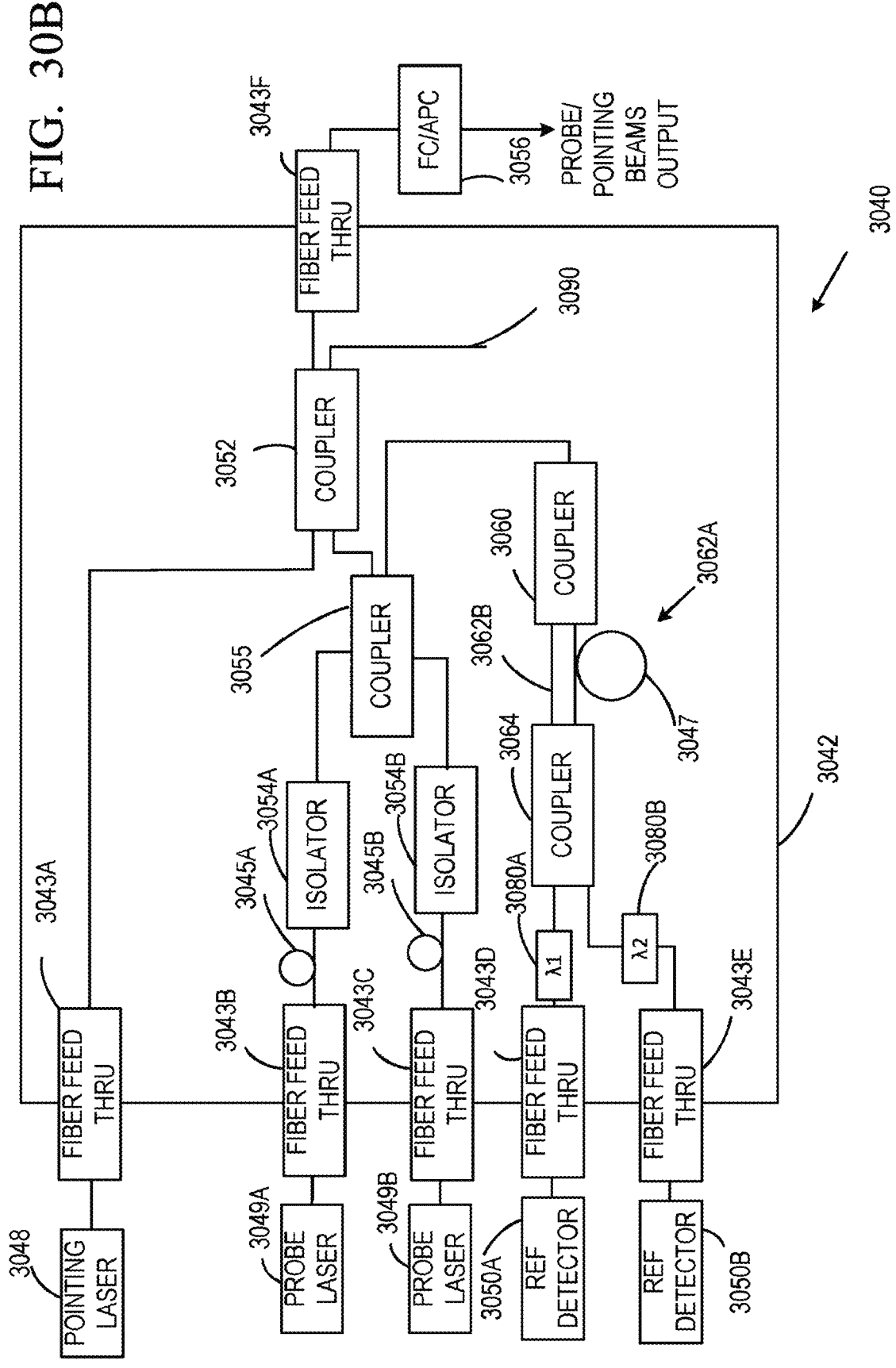

Additional embodiments of reference assemblies for laser-based measurement systems such as disclosed above are shown in FIGS. 30A-30B. Referring to FIG. 30A, a reference arm assembly 3000 includes vacuum-rated fiber feed-throughs 3002-3005 that are coupled to a hermetic enclosure 3002 that is typically evacuated or filled with an inert gas. The fiber feed-throughs 3002, 3003, 3004 are typically coupled to a pointing or tracing laser 3008, a probe laser 3009, and a reference detector 3010, respectively. The fiber feed-through 3002 delivers a tracer beam to a first coupler 3012; fiber feed-through 3003 delivers a probe beam to an isolator 3014 which then couples the probe beam to the first coupler 3012. Combined probe/tracer beams are directed from the first coupler 3012 to the fiber feed-through 3005 and then to a fiber-optic connector such as an FC/APC connector 3016 for delivery to suitable scanning, focusing, and detection systems such as discussed above. The first coupler 3012 directs a portion of the probe beam from the isolator 3014 to a second coupler 3020 which divides this beam portion into first and second portions that propagate along respective paths 3022A, 3022B. If desired, a fiber delay length 3080 can be situated between the fiber feed-through 3003 and the isolator 3014 so that reflections from internal components (such as in the probe laser) produce heterodyne frequencies that are out of the typical measurement range. The paths 3022A, 3022B typically have a stable, fixed path difference provided by including an additional fiber length in one of these paths. A third coupler 3024 receives the first and second beam portions from the paths 3022A, 3022B and combines these portions and directs the combined portions to the reference detector 3010 via the fiber feed-thru 3004. The fixed path difference permits association of a beat signal between the first and second beam portions with a specific length.

The enclosure 3002 is typically made of copper and temperature controlled with a thermoelectric (TEC) module 3083 and control electronics 3084. The outside of the enclosure 3002 is typically provided with insulation (not shown) that surrounds the enclosure 3002 to insulate the enclosure 3002 from the ambient environment. The enclosure 3002 has a lid that is sealed with bolts and an O-ring. A tube 3082 can be provided for evacuation or filling of the enclosure 3002 with a noble gas or other gas such as nitrogen. The tube 3082 can be situated on an enclosure lid and be made of copper. Such a tube is generally pinched off or otherwise sealed after evacuation or filling of the enclosure 3002. Copper is a convenient material, but other materials can be used. In some cases, the enclosure is filled with a dry gas.

Referring to FIG. 30B, a reference arm assembly 3040 for use with dual probe beam includes fiber feed-throughs 3043A-3043F that are coupled to a hermetic enclosure 3042 that is typically evacuated or filled with an inert gas. The fiber feed-throughs 3043A, 3043B, 3043C, 3043D, 3043F are typically coupled to a pointing or tracing laser 3048, a first probe laser 3049A, a second probe laser 3049B, a first reference detector 3050A, and a second reference detector 3050B, respectively. The fiber feed-through 3043A delivers a tracer beam to a first coupler 3052; fiber feed-throughs 3043B-3043B deliver probe beams to isolators 3054A-3054B which then couples the probe beams to a second coupler 3055. The combined probe beams are directed from the second coupler 3055 to the first coupler 3052 and combined probe/tracer beams are directed to the fiber feed-through 3043F and then to a fiber-optic connector such as an FC/APC connector 3056 for delivery to suitable scanning, focusing, and detection systems. The fiber coupler 3052 includes an output 3090 that is not used, and is terminated to reduce or eliminate back reflections at 3070.

The second coupler 3055 directs portions of the combined probe beams from the isolators 3054A, 3054B and then to a third coupler 3060 which divides the combined beam portions into first and second portions that propagate along respective paths 3062A, 3062B. If desired, fiber delay lengths 3045A, 3045B can be situated between the fiber feed-throughs 3043B, 3043C and the isolators 3054A, 3054B. The paths 3062A, 3062B typically have a stable, fixed path difference provided by including an additional fiber length 3047 in one of these paths. A third coupler 3064 receives the first and second beam portions from the paths 3062A, 3062B and combines these portions and directs the combined portions to respective reference detectors 3050A, 3050B via the fiber feed-throughs 3043D, 3043E. The fixed path difference permits association of a beat signal between the first and second beam portions with a specific length. In most practical examples, optical filters 3080A, 3080B are situated so that reference detector 3050A receives only beam portions at a first wavelength provided by the first probe laser 3049A and the reference detector 3050B receives only beam portions at a second wavelength provided by the second probe laser 3049B. For example, the first and second wavelengths can be about 1550 nm and 1560 nm. Fiber delay lengths 3045A, 3045B can be situated between the fiber feed-throughs 3043B, 3043C and the isolators 3054A, 3054B so that reflections from internal components are produce heterodyne frequencies that can be out of typical measurement range. Wavelength demultiplexing couplers can be used instead of the third coupler 3064 and optical filters 3080A, 3080B to separate the wavelengths.

In the examples of FIGS. 30A-30B, optical fibers used for probe beams are typically polarization retaining single mode (PRSM) fiber; for the tracer beam, PRSM fiber is usually not used. Length differences used to establish heterodyne frequencies use fibers of lengths that generally are between 1 m and 200 m, typically 5, 10, 15, 20, 25, or 50 m.

Example 31

Figure 31:
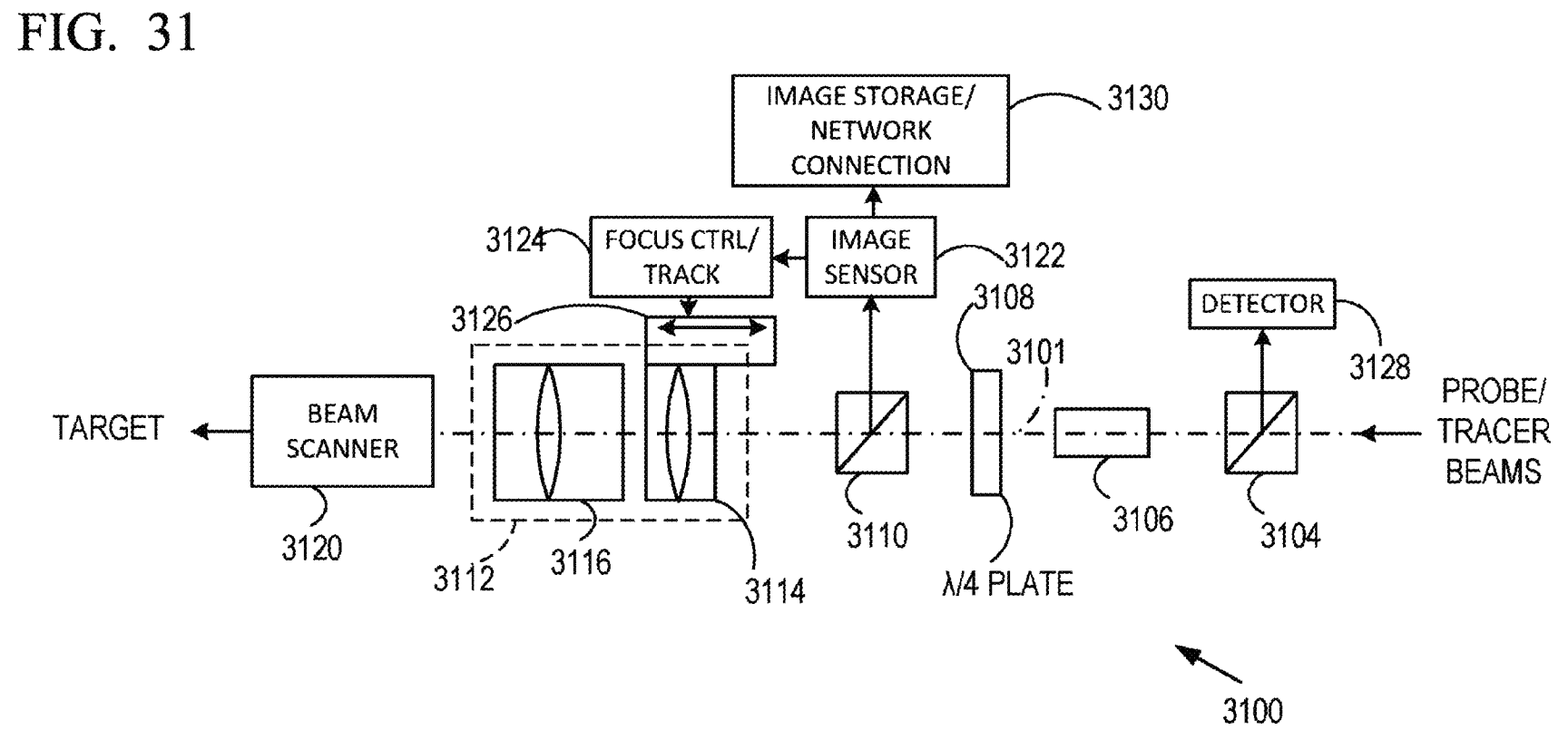

Referring to FIG. 31, a representative laser radar system 3100 with confocal imaging includes a beam splitter 3104 that directs probe and tracer beams along an axis 3101 to a first lens 3106 and then to a waveplate 3108 which can be used to produce a local oscillator (LO) beam by reflection as discussed above. LO beams can be produced in other ways as well, and reflection from the waveplate 3108 is only a convenient example. The probe/tracer beams are then directed through a beam splitter such as a cube beam splitter 3110 (or a plate beam splitter or double reflective beam splitter as describe above) to an objective lens 3112 that includes a fixed lens portion 3116 and a movable (focusing) lens portion 3114. A beam scanner 3120 receives the focused probe/tracer beams and directs the beams to a target. An image sensor 3122 is situated on the axis 3101 so that the laser radar provides confocal imaging. A focus controller 3124 is coupled to the image sensor 3122 and provides autofocus of imagery from the target by adjusting the movable lens 3114 with a translation stage or other translation mechanism 3126. Returned portion of the probe beam are directed to the beam splitter 3104 and then to a detector 3128. A heterodyne or other signal produced at the detector 3128 permits characterization of a target surface.

Autofocus provided with the focus controller and the translation mechanism 3126 permits the probe beam focus to be maintained as the probe beam scans various target areas. In conventional systems, establishing probe beam focus on the target can be time consuming Using a confocal image sensor permits rapid focus adjustments using target images produced at the image sensor 3122. Thus, focus can be established and adjusted, and a probe beam can be directed to any selection portion of a field of view using the image sensor 3122 and the focus controller 3124. A non-transitory computer-readable memory or network connection 3130 receives images from the image sensor 312 for processing to identify features, to stitch images together to provide a panoramic image of the target.

Example 32

Figure 32:
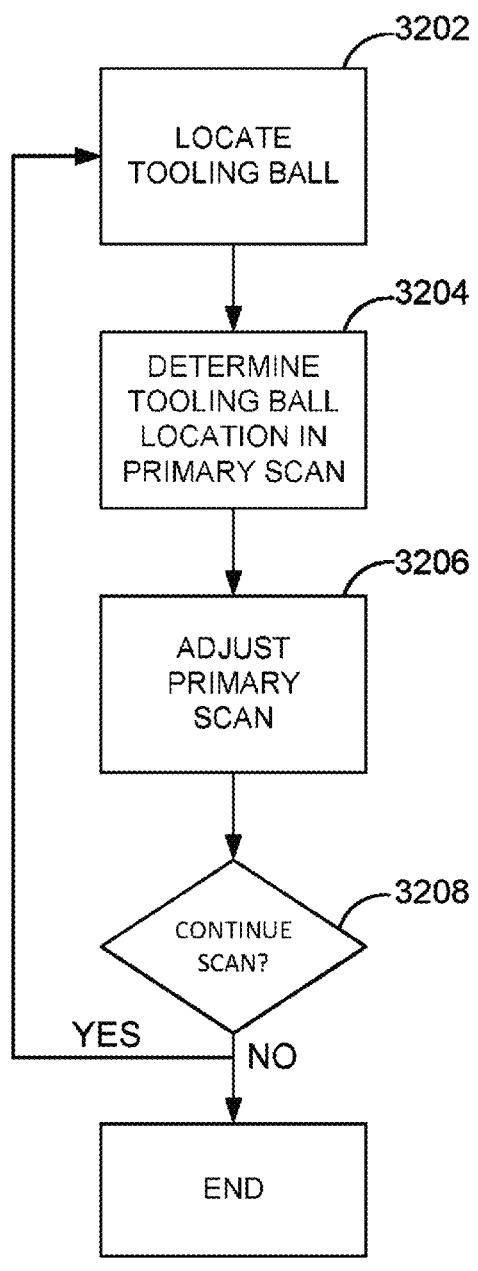
FIG. 32 is a block diagram of a representative method of tracking a tooling ball that is secured to a substrate or target (or a target feature) using any of the methods and apparatus disclosed herein.

FIG. 32 illustrates a representative method of tracking a tooling ball that is secured to a substrate or target (or track a target feature). One or more tooling balls can be secured to a target to provide reference points for coordinate determinations. Tooling balls generally include a reflective ball-shaped surface in order to provide ample reflection of an interrogation beam in a laser-based measurement apparatus such as a laser radar.

As shown in FIG. 32, at 3202 a tooling ball location is identified and recorded based on returned portions of a scanned interrogation optical beam. The optical beam can be scanned in a variety of patterns such as circles, spirals, w's, or zig-zags so as to track a tooling ball. At 3204, the identified location is evaluated to determine a position with respect to a primary scan. The primary scan is adjusted at 3206 so that the tooling ball location is at a preferred location with respect to the primary scan. Typically, the primary scan is adjusted so that the tooling location is approximately centered within a primary scan range. At 3208, a determination is made regarding additional scanning.

Example 33

Figure 33:
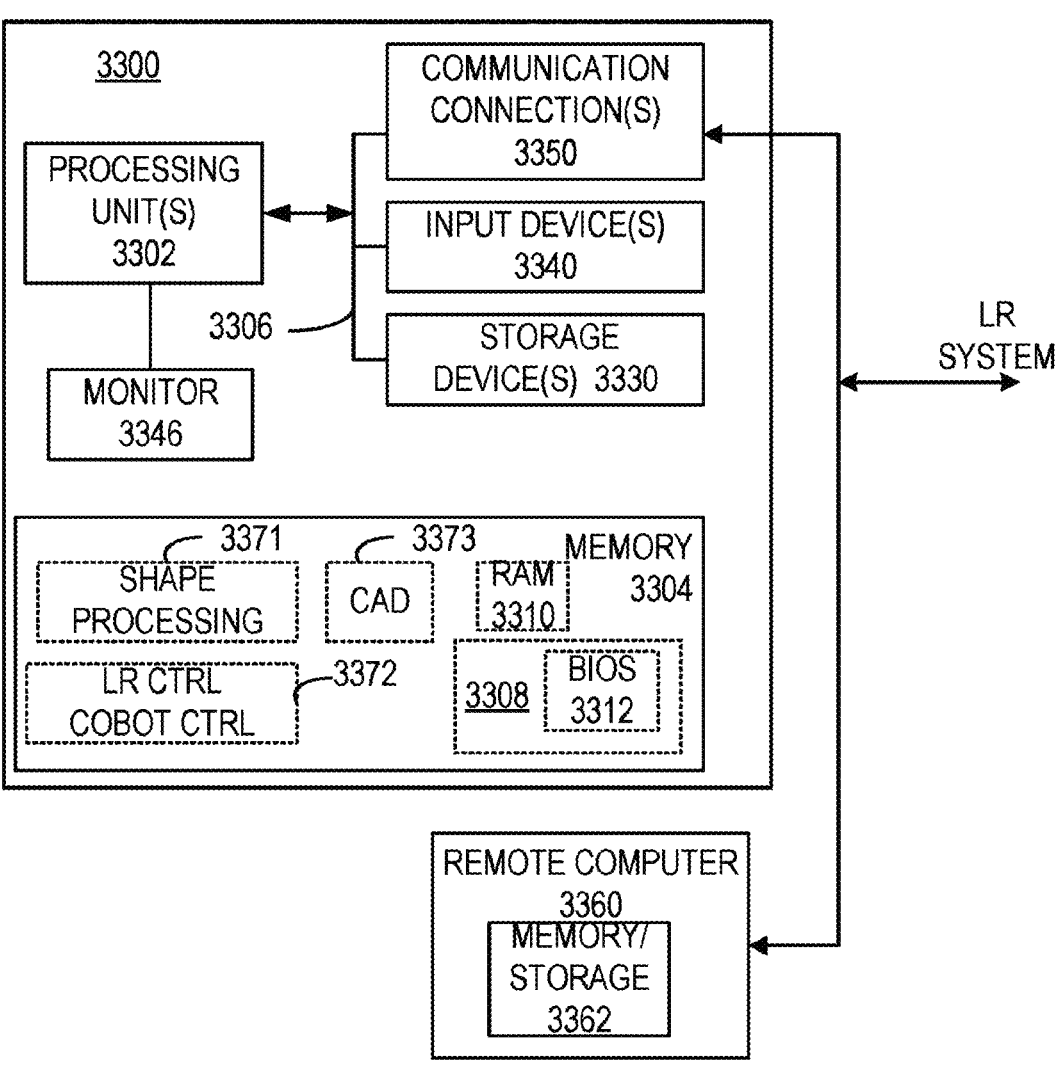
FIG. 33 illustrates a representative computing environment.

FIG. 33 and the following discussion are intended to provide a brief, general description of an exemplary computing environment in which the disclosed technology may be implemented, including any of the above methods. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 33, an exemplary system for implementing the disclosed technology includes a general purpose computing device in the form of an exemplary conventional PC 3300, including one or more processing units 3302, a system memory 3304, and a system bus 3306 that couples various system components including the system memory 3304 to the one or more processing units 3302. The system bus 3306 may be any of several types of bus structures including a memory bus or memory controller, a peripheral bus, and a local bus using any of a variety of bus architectures. The exemplary system memory 3304 includes read only memory (ROM) 3308 and random access memory (RAM) 3310. A basic input/output system (BIOS) 3312, containing the basic routines that help with the transfer of information between elements within the PC 3300, is stored in ROM 3308. The memory 3304 also contains portions 3371-3373 that include computer-executable instructions and data for shape identification and processing, laser radar and COBOT control and communications, and acquisition of design data, respectively.

The exemplary PC 3300 further includes one or more storage devices 3330 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 3306 by a hard disk drive interface, a magnetic disk drive interface, and an optical drive interface, respectively. The drives and their associated computer-readable media provide nonvolatile storage of computer-readable instructions, data structures, program modules, and other data for the PC 3300. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 3330 including an operating system, one or more application programs, other program modules, and program data. A user may enter commands and information into the PC 3300 through one or more input devices 3340 such as a keyboard and a pointing device such as a mouse. Other input devices may include a digital camera, microphone, joystick, game pad, satellite dish, scanner, or the like. These and other input devices are often connected to the one or more processing units 3302 through a serial port interface that is coupled to the system bus 3306, but may be connected by other interfaces such as a parallel port, game port, or universal serial bus (USB). A monitor 3346 or other type of display device is also connected to the system bus 3306 via an interface, such as a video adapter. Other peripheral output devices, such as speakers and printers (not shown), may be included.

The PC 3300 may operate in a networked environment using logical connections to one or more remote computers, such as a remote computer 3360. In some examples, one or more network or communication connections 3350 are included. The remote computer 3360 may be another PC, a server, a router, a network PC, or a peer device or other common network node, and typically includes many or all of the elements described above relative to the PC 3300, although only a memory storage device 3362 has been illustrated in FIG. 33. The personal computer 3300 and/or the remote computer 3360 can be connected to a logical a local area network (LAN) and a wide area network (WAN). Such networking environments are commonplace in offices, enterprise-wide computer networks, intranets, and the Internet.

When used in a LAN networking environment, the PC 3300 is connected to the LAN through a network interface. When used in a WAN networking environment, the PC 3300 typically includes a modem or other means for establishing communications over the WAN, such as the Internet. In a networked environment, program modules depicted relative to the personal computer 3300, or portions thereof, may be stored in the remote memory storage device or other locations on the LAN or WAN. The network connections shown are exemplary, and other means of establishing a communications link between the computers may be used.

In view of the many possible embodiments to which the principles of the disclosed technology may be applied, it should be recognized that the illustrated embodiments are only preferred examples and should not be taken as limiting the scope of the disclosure.

Innovative Features

Innovative features described herein include, but are not limited to, the following.

| | Feature |
|---|---|
| A1 | An apparatus, comprising:<br>a beam splitter situated to receive a probe beam propagating along an axis;<br>an objective lens situated on the axis to receive a probe beam from the beam splitter and direct the probe beam to a target along the axis, the objective lens including at least one optical element; and<br>an image sensor optically coupled to the beam splitter and situated on the axis to receive an imaging beam from the target via the beam splitter, wherein the at least one optical element is movable to form a target image at the image sensor and focus the probe beam at the target. |
| A2 | The apparatus of A1, further comprising:<br>an optical fiber situated to direct the probe beam and a tracer beam to the beam splitter along the axis, wherein the beam splitter is a dichroic beam splitter, and the objective lens comprises a fixed lens and the at least one movable optical element. |
| A3 | The apparatus of A1, further comprising an autofocus mechanism coupled to the at least one movable optical element to focus the target image at the image sensor and the probe beam at the target. |
| A4 | The apparatus of A1, wherein the probe beam is focused by the at least one movable optical element proximate a center of a field of view of the image sensor. |
| A5 | The apparatus of A1, further comprising a focus controller coupled to the movable optical element and configured to adjust the focus of the probe beam and the imaging beam. |

-continued

| | Feature |
|---|---|
| A6 | The apparatus of A5, further comprising a beam scanner situated to direct the probe beam to the target and the imaging beam to the image sensor. |
| A7 | The apparatus of A6, further comprising an image processor coupled to the image sensor and the beam scanner so that a selected portion of the target is imaged at the image sensor in a predetermined location of a sensor surface of the image sensor. |
| A8 | The apparatus of A7, wherein the predetermined location is a central location the sensor surface of the image sensor. |
| A9 | The apparatus of A6, further comprising an image processor coupled to the image sensor and the beam scanner so that the probe beam is directed to a selected portion of the target based on a target image produced by the image sensor. |
| A10 | The apparatus of A1, further comprising a probe beam lens situated to direct the probe beam to the objective lens, the probe beam lens situated so that the probe beam and the imaging beam are focused at the target and the image sensor, respectively. |
| A11 | The apparatus of A1, further comprising an optical fiber having a fiber end situated to direct the probe beam to the beam splitter, wherein the image sensor and the optical fiber end are optically conjugate at one or more wavelengths associated with the imaging beam. |
| B1 | A method, comprising: directing a laser radar probe beam along an axis to an objective lens situated to focus the laser radar probe beam at a target; and directing an imaging beam from the target along the axis to the objective lens and to an image sensor, wherein the image sensor is situated so that the objective lens produces an image of at least a portion of the target at the image sensor. |
| B2 | The method of B1, further comprising focusing the laser radar probe beam at the target based on a contrast of an image of the target formed at the image sensor. |
| B3 | The method of B1, further comprising, adjusting the focus of the probe beam at the target based on the image of the target formed at the image sensor. |
| B4 | The method of B1, further comprising estimating a range to the target based on the returned portion of the probe beam. |
| B5 | The method of B1, further comprising estimating a dimension of a target feature based on the estimated range to the target and the image of the target. |
| B6 | The method of B1, further compromising, with an image processor, finding and centering a designated portion of the target in the image, thereby directing the probe beam to the designated portion of the target. |
| B7 | The method of B1, measuring, with a processor coupled to the image sensor, at least one target dimension using an angle determined based on a target distance. |
| B8 | The method of B1, further comprising estimating at least one target dimension based on a target feature size in the target image and a distance to the target. |
| B9 | The method of B1, further comprising tracking a moving target based on the image of the at least a portion of the target. |
| B10 | The method of B1, further compromising forming a segmented image of the target by obtaining a plurality of images of the target obtained with the image sensor and associated distances to the targets determined based on returned portions of the probe beam. |
| B11 | The method of B10, further compromising producing a 3D model of the target based on the segmented image. |
| B12 | The method of B11, further comprising locating at least one selected target area in the target based on the panoramic image. |
| B13 | The method of B1 in combination with one or more or all of the features of any of B2-B12. |
| C1 | An apparatus, comprising: a dichroic beam splitter; an optical fiber situated to direct a probe beam and a tracer beam to the dichroic beam splitter along an axis; an objective lens situated on the axis and comprising a fixed lens and a movable lens, the movable lens situated to receive the probe beam from the dichroic beam splitter and direct the probe beam to a target along the axis; and an image sensor optically coupled to the dichroic beam splitter and situated on the axis to receive an imaging beam from the target via the dichroic beam splitter, wherein the movable lens is translatable to form a target image at the image sensor and focus the probe beam at the target. |
| C2 | The apparatus of C1 wherein the dichroic beam splitter is situated so that the probe beam is transmitted through the dichroic beam splitter to the movable lens and the imaging beam is reflected by the dichroic beam splitter to the image sensor. |
| C3 | The apparatus of any of C1-C2, wherein the objective lens is situated to receive a tracer beam from the dichroic beam splitter and direct the probe beam and the tracer beam to the target, wherein the probe beam has a wavelength between 1200 nm and 1800 nm and the tracer beam has a wavelength between 400 nm and 700 nm. |
| C4 | The apparatus of any of C1-C3, wherein the dichroic beam splitter is situated so that the probe beam is reflected by the dichroic beam splitter to the movable lens and the imaging beam is transmitted by the dichroic beam splitter to the image sensor. |
| C5 | The apparatus of any of C1-C4, wherein the dichroic beam splitter is a cube dichroic beam splitter, a plate dichroic beam splitter, or a double-reflecting dichroic beam splitter. |

| | Feature |
|---|---|
| C6 | The apparatus of any of C1-C5, wherein the dichroic beam splitter is a double-reflecting dichroic beam splitter that includes a first surface facing the movable lens and a dichroic reflecting surface situated to direct the imaging beam to the image sensor and the portion of the probe beam returned from the target to the optical fiber. |
| C7 | The apparatus of any of C1-C6, wherein the dichroic beam splitter is a double-reflecting dichroic beam splitter that includes a first surface facing the movable lens and a dichroic reflecting surface situated to direct the imaging beam to the first surface so that the imaging beam is reflected to the image sensor by the first surface, and the portion of the probe beam returned from the target to the optical fiber is transmitted by the reflecting surface to the optical fiber. |
| C8 | The apparatus of any of C1-C7, wherein the dichroic beam splitter is a double-reflecting dichroic beam splitter that includes a first surface facing the movable lens and a dichroic reflecting surface situated to direct the portion of the probe beam returned from the target to the first surface, and the imaging beam is transmitted by the dichroic reflecting surface to the image sensor. |
| C9 | The apparatus of any of C1-C8, wherein the first surface is situated at an angle greater than a critical angle with respect to the imaging beam received from the dichroic reflecting surface. |
| C10 | The apparatus of any of C1-C9 wherein the double-reflecting dichroic beam splitter includes an output surface situated such the portion of the probe beam returned from the target and reflected by the dichroic reflecting surface to the first surface is reflected to be normally incident to the output surface. |
| C11 | The apparatus of any of C1-C10, wherein the double-reflecting dichroic beam splitter includes an output surface situated such the imaging beam returned from the target reflected by the dichroic reflecting surface to the first surface is reflected to be normally incident to the output surface. |
| C12 | The apparatus of any of C1-C11, wherein the double-reflecting dichroic beam splitter includes a first prism having a vertex angle between the first surface and the dichroic reflecting surface, wherein the vertex angle is greater than $\sin - 1(1/n)$, wherein n is a refractive index of the prism. |
| C13 | The apparatus of any of C1-C12, wherein the dichroic reflecting surface of the double-reflecting dichroic beam splitter is defined on a surface of the first prism. |
| C14 | The apparatus of any of C1-C13, wherein the double-reflecting prism includes a first prism and a second prism secured to each other at respective mating surfaces, and the dichroic reflective surface is situated at the mating surfaces. |
| C15 | The apparatus of any of C1-C14, wherein the dichroic reflecting surface is defined on at least one of the mating surfaces. |
| C16 | The apparatus of any of C1-C15, wherein the dichroic beam splitter includes a dichroic plate and a plane reflector, wherein the dichroic plate is situated to direct the portion of the probe beam returned from the target to the plane reflector and transmit the imaging beam to the image sensor. |
| C17 | The apparatus of any of C1-C16, wherein the dichroic beam splitter includes a dichroic plate and a plane reflector, wherein the dichroic plate is situated to reflect the imaging beam to the plane reflector and transmit the portion of the probe beam returned from the target. |
| C18 | The apparatus of any of C1-C17, wherein the optical fiber is a polarization retaining single mode (PRSM) optical fiber and further comprising a polarizing beam splitter (PBS) situated so that the probe beam from the PRSM optical fiber is received be the PBS in a state of polarization that is substantially transmitted by the PBS to the dichroic beam splitter. |
| C19 | The apparatus of any of C1-C18, wherein the state of polarization is a linear state of polarization. |
| C20 | The apparatus of any of C1-C19, further comprising a waveplate situated between the PBS and the dichroic beam splitter to produce a circular state of polarization in the probe beam and to reflect a portion of the probe beam towards the optical fiber to produce a local oscillator beam. |
| C21 | The apparatus of any of C1-C20, wherein the waveplate has an input surface situated to receive the probe beam from the PBS and an output surface situated to receive the probe beam from the input surface of the waveplate, wherein one of the input surface or the output surface is antireflection coated and the other of the input surface and the output surface reflects a portion of the probe beam as the local oscillator beam. |
| C22 | The apparatus of any of C1-C21, further comprising a mixing lens situated to receive the measurement beam from the optical fiber and a dichroic filter situated along the axis on an axial portion of the mixing lens, wherein the dichroic filter is transmissive to the measurement beam and non-transmissive to the tracer beam. |
| C23 | The apparatus of any of C1-C22, further comprising a dichroic reflector situated along the axis on an axial portion of the mixing lens, wherein the dichroic filter is a dichroic reflector that is transmissive to the measurement beam and reflective to the tracer beam. |
| C24 | The apparatus of any of C1-C23, wherein the dichroic filter is a wave-length-dependent polarizer that is substantially non-transmissive to the tracer beam. |
| C25 | The apparatus of any of C1-C24, further comprising a dichroic reflector situated along the axis on an axial portion of the mixing lens, the dichroic reflector transmissive to the measurement beam and reflective to the tracer beam, wherein a dimension of the dichroic reflector is based on a corresponding dimension of the image sensor. |

-continued

| | Feature |
|---|---|
| C26 | The apparatus of any of C1-C25, further comprising a mixing lens situated to receive the measurement beam and focus the measurement beam; and a dichroic reflector situated along the axis on an axial portion of the mixing lens, the dichroic reflector transmissive to the measurement beam and reflective to the tracer beam, wherein a dimension of the dichroic reflector is based on a corresponding dimension of the image sensor. |
| C27 | The apparatus of any of C1-C26, wherein a dimension of the dichroic reflector is at least 0.5, 0.75, 1.0, or 1.5 times a product of a corresponding dimension of the image sensor and a ratio of an optical distance along the axis from the mixing lens focus to the dichroic reflector to an optical distance from the mixing lens focus to the image sensor. |
| C28 | The apparatus of any of C1-C27, wherein the dichroic filter is situated on a lens surface of the movable lens. |
| C29 | The apparatus of C1 in combination with one or more or all of the features of any of C2-C28. |
| D1 | An apparatus, comprising: an optical fiber; an imaging lens situated to receive a measurement beam from the optical fiber and produce a measurement beam focus; an optical element having a surface situated proximate the measurement beam focus to reflect a portion of the measurement beam back into the optical fiber as a local oscillator beam; and an objective lens situated to receive the measurement beam from the optical element, direct a portion of the measurement beam as a probe beam to a target and direct a portion of the probe beam returned from the target into the optical fiber through the optical element and the imaging lens to form a signal beam. |
| D2 | The apparatus of D1, wherein the optical element is a waveplate. |
| D3 | The apparatus of any of D1-D2, wherein the waveplate has an entrance surface that receives the measurement beam from the imaging lens and an exit surface opposite the entrance lens, wherein the exit surface is situated proximate the measurement beam focus to reflect the portion of the measurement beam. |
| D4 | The apparatus of any of D1-D3, wherein the waveplate has an entrance surface that receives the measurement beam from the imaging lens and an exit surface opposite the entrance surface, wherein the entrance surface is situated proximate the measurement beam focus to reflect the portion of the measurement beam. |
| D5 | The apparatus of any of D1-D4 wherein one of the entrance surface and the exit surface of the waveplate includes an antireflection coating situated to receive the measurement beam from the imaging lens and the other of the entrance surface and the exit surface has an uncoated portion situated to receive the focused measurement beam from the imaging lens. |
| D6 | The apparatus of any of D1-D5, further comprising a polarizing beam splitter situated to couple the measurement beam to the waveplate. |
| D7 | The apparatus of any of D1-D6, further comprising a polarizing beam splitter situated to receive the measurement beam from the imaging lens and couple the measurement beam to the waveplate. |
| D8 | The apparatus of any of D1-D7, wherein the optical element having the surface situated proximate the measurement beam focus is a polarizing beam splitter (PBS). |
| D9 | The apparatus of any of D1-D8, wherein the PBS has an exit surface facing the objective and the exit surface of the PBS is situated at the measurement beam focus to reflect the portion of the measurement beam back into the optical fiber as the local oscillator beam. |
| D10 | The apparatus of any of D1-D9, wherein the optical element includes a polarizing beam splitter and a waveplate secured to the polarizing beam splitter (PBS). |
| D11 | The apparatus of any of D1-D10, wherein the PBS has an entrance surface coupled to receive the measurement beam from the optical fiber and the waveplate includes an exit surface situated to couple the measurement beam from the PBS to the objective and to reflect the portion of the measurement beam back into the optical fiber as the local oscillator beam. |
| D12 | The apparatus of any of D1-D11, wherein the PBS is situated to reflect a probe beam portion of the measurement beam to the waveplate. |
| D13 | The apparatus of any of D1-D12, further comprising: an optical detector coupled to the optical fiber and situated to receive the probe beam and the local oscillator beam and produce a heterodyne electrical signal; and a detection system that provides a target distance estimate base on the heterodyne electrical signal. |
| D14 | The apparatus of any of D1-D13, further comprising: first and second measurement beam sources that produce first and second measurement beams at first and second wavelengths, respectively; and a beam combiner that receives the first and second measurement beam sources and couples the first and second measurement beams to form a combined measurement beam, wherein the optical fiber directs the combined measurement beam to the imaging lens and the optical element reflects a portion of the combined measurement beam back towards the optical fiber as first and second local oscillator beams. |
| D15 | The apparatus of any of D1-D14, further comprising: first and second optical detectors coupled to the optical fiber or a polarizing beam splitter to receive a portion of the probe beam returned from a target and the first and second local oscillator beams so as to produce first and second heterodyne electrical |

-continued

| | Feature |
|---|---|
| | signals; and |
| | a detection system that provides a target distance estimate based on the first and |
| | second heterodyne electrical signals. |
| D16 | The apparatus of any of D1-D15, wherein the mixing lens receives a |
| | measurement beam and a tracer beam from the optical fiber, and further comprising a |
| | dichroic filter situated on an axis of the objective lens, wherein the dichroic filter is |
| | non-transmissive to the tracer beam. |
| D17 | B13 The apparatus of D1 in combination with one or more or all of the features of |
| | any of D2-D17. |
| E1 | A method, comprising: |
| | directing a tracer beam to a beam splitter, the tracer beam having an associated |
| | beam numerical aperture; |
| | blocking a portion of the tracer beam numerical aperture so that the beam |
| | splitter receives the measurement beam and a partially obscured tracer beam; |
| | directing the partially obscured tracer beam from the beam splitter to a target |
| | with an objective lens; and |
| | receiving an imaging beam with the beam splitter and directing the imaging |
| | beam to an imaging detector with the beam splitter, wherein an obscured portion of the |
| | tracer beam corresponds to the imaging detector. |
| F1 | A method, comprising: |
| | focusing a measurement beam from an optical fiber to a measurement beam focus; and |
| | reflecting a portion of the measurement beam towards the optical fiber to produce a |
| | local oscillator beam. |
| F2 | The method of F1, wherein the measurement beam is focused through a beam |
| | splitter to an optical element having a surface that reflects the portion of the |
| | measurement beam to the optical fiber. |
| F3 | The method of F1-F2, wherein the optical element is a waveplate and the |
| | reflective surface is a surface of the waveplate. |
| F4 | The method of any of F1-F3, wherein the optical element is a polarizing beam |
| | splitter (PBS) and the reflective surface is a surface of the PBS. |
| F5 | The method of F1 in combination with one or more or all of the features of any |
| | of F2-F12. |
| G1 | An apparatus, comprising: |
| | a laser radar situated to direct a probe beam to a target along an axis and |
| | produce an estimate of a least one target dimension, the laser radar comprising a probe |
| | beam scanner coupled to scan the probe beam axis; |
| | an imager optically situated along the axis to produce an image of the target, wherein |
| | the probe beam scanner is coupled to the imager so as to direct the probe beam to a |
| | target location based on at least one feature identified in a target image. |
| G2 | The apparatus of G1, wherein the imager is an image sensor, and further |
| | comprising an image processor that identifies the at least one feature in the target |
| | image. |
| G3 | The apparatus of G1-G2, wherein the at least one feature is a design feature, and |
| | the target location is associated with the design feature. |
| G4 | The apparatus of G1-G3, wherein the at least one feature is a tooling ball or an |
| | eyeball sphere, and the target location is determined based on the location of the tooling |
| | ball or eyeball sphere. |
| G5 | The apparatus of G1-G4, where the target location is determined based on the |
| | location of the eyeball sphere. |
| G6 | The apparatus of G1 in combination with one or more or all of the features of |
| | any of G2-G6. |
| H1 | An apparatus, comprising: |
| | a laser radar situated to direct a probe beam to a target along an axis, the laser |
| | radar comprising a probe beam scanner coupled to scan the probe beam axis; |
| | an imaging system comprising an image sensor optically situated along the axis |
| | to produce an image of the target and a focus mechanism coupled to an objective lens to |
| | adjust a focus of the target image at the image sensor; and |
| | an image processor coupled to the imaging system to produce an estimate of at |
| | least one target dimension based on the image of the target and an estimate of a distance |
| | to the target. |
| H2 | The apparatus of H1, wherein the laser radar is configured to produce the |
| | estimate of the distance to the target. |
| H3 | The apparatus of any of H1-H2, wherein the estimate of the distance to the |
| | target is based on an adjustment of the focus mechanism. |
| H4 | The apparatus of any of H1-H3, wherein the focus mechanism is an autofocus |
| | mechanism. |
| H5 | The apparatus of any of H1-H4, wherein the imager is an image sensor, and |
| | further comprising an image processor that identifies the at least one feature in the |
| | target image. |
| H6 | The apparatus of any of H1-H5, wherein the at least one feature is a design |
| | feature, and the target location is associated with the design feature. |
| H7 | The apparatus of any of H1-H6, wherein the at least one feature is a tooling ball |
| | or an eyeball sphere, and the target location is determined based on the location of the |
| | tooling ball or eyeball sphere. |
| H8 | The apparatus of any of H1-H7, where the target location is determined based |
| | on the location of the eyeball sphere. |

-continued

| Feature | |
|---|---|
| H9 | The apparatus of any of H1-H8, wherein the imaging system is configured to produce a plurality image portions, and the image processor is configured to stitch the plurality of image portions into a common image. |
| H10 | The apparatus of any of H1-H9, wherein the image processor is configured to at least partially compensate distortion in at least one image portion. |
| H11 | The apparatus of any of H1-H10, wherein the image processor is configured to at least partially compensate distortion in at least one image portion based on test grid images. |
| H12 | The apparatus of H1 in combination with one or more or all of the features of any of H2-H11. |
| I1 | A measurement apparatus, comprising: a laser radar that provides a scannable laser probe beam; a remote mirror system that includes a translatable mirror, wherein the laser radar is configured to direct the scannable laser probe beam to the translatable mirror of the remote mirror system to be reflected to a target to measure at least one feature of the target. |
| I2 | The measurement apparatus of I1, wherein the laser radar is situated to direct the scannable laser probe beam to the remote mirror system and determine a location of the remote mirror system, wherein the target the at least one feature of the target is measured based on the remote mirror system location and a portion of the probe beam returned from the target to the laser radar. |
| I3 | The measurement apparatus of I1-I2, wherein the remote mirror system includes at least one tooling ball or eyeball sphere, and the laser radar is situated to direct the scannable laser probe beam to the at least one tooling ball or eyeball sphere to determine the location of the remote mirror system. |
| I4 | The measurement apparatus of I2-I3, wherein the laser radar is coupled to the remote mirror system to initiate adjustment of the translatable mirror so that the scannable laser probe beam is directed to the at least one feature of the target. |
| I5 | The apparatus of I1 in combination with one or more or all of the features of any of I2-I4. |

We claim:

1. An apparatus, comprising:
a beam splitter;
an optical fiber situated to direct a probe beam the beam splitter along an axis;
an objective lens situated on the axis situated to receive the probe beam from the beam splitter and direct the probe beam to a target along the axis, the objective lens including at least one movable optical element; and
an image sensor optically coupled to the beam splitter and situated on the axis to receive an imaging beam from the target via the objective lens and the beam splitter, wherein the at least one movable optical element is translatable to focus the imaging beam at the image sensor and focus the probe beam at the target.

2. The apparatus according to claim 1, wherein the beam splitter is situated so that the probe beam is transmitted through the beam splitter to the at least one movable optical element and the imaging beam is reflected by the beam splitter to the image sensor.

3. The apparatus according to claim 1, wherein the objective lens is situated to receive a tracer beam from the beam splitter and direct the probe beam and the tracer beam to the target, wherein the probe beam has a wavelength between 1200 nm and 1800 nm and the tracer beam has a wavelength between 400 nm and 700 nm.

4. The apparatus according to claim 1, wherein the beam splitter is situated so that the probe beam is reflected by the beam splitter to the at least one movable optical element and the imaging beam is transmitted by the beam splitter to the image sensor.

5. The apparatus according to claim 1, wherein the beam splitter is a cube dichroic beam splitter, a plate dichroic beam splitter, or a double-reflecting dichroic beam splitter.

6. The apparatus according to claim 1, wherein the beam splitter is a double-reflecting dichroic beam splitter that includes a first surface facing the at least one movable optical element and a dichroic reflecting surface situated to direct the imaging beam to the image sensor and a portion of the probe beam returned from the target to the optical fiber.

7. The apparatus according to claim 1, wherein the beam splitter is a double-reflecting dichroic beam splitter that includes a first surface facing the at least one movable optical element and a dichroic reflecting surface situated to direct the imaging beam to the first surface so that the imaging beam is reflected to the image sensor by the first surface, and a portion of the probe beam returned from the target to the optical fiber is transmitted by the dichroic reflecting surface to the optical fiber.

8. The apparatus according to claim 1, wherein the beam splitter is a double-reflecting dichroic beam splitter that includes a first surface facing the at least one movable optical element and a dichroic reflecting surface situated to direct a portion of the probe beam returned from the target to the first surface, and the imaging beam is transmitted by the dichroic reflecting surface to the image sensor.

9. The apparatus according to claim 6, wherein the first surface is situated at an angle greater than a critical angle with respect to the imaging beam received from the dichroic reflecting surface.

10. The apparatus according to claim 7, wherein the first surface is situated at an angle greater than a critical angle with respect to the imaging beam received from the dichroic reflecting surface.

11. The apparatus according to claim 8, wherein the first surface is situated at an angle greater than a critical angle with respect to the portion of the probe beam returned from the target from the dichroic reflecting surface.

12. The apparatus according to claim 6, wherein the double-reflecting dichroic beam splitter includes an output surface situated such the portion of the probe beam returned from the target and reflected by the dichroic reflecting surface to the first surface is reflected to be normally incident to the output surface.

13. The apparatus according to claim 7, wherein the double-reflecting dichroic beam splitter includes an output surface situated such the imaging beam reflected by the dichroic reflecting surface to the first surface is reflected to be normally incident to the output surface.

14. The apparatus according to claim 8, wherein the double-reflecting dichroic beam splitter includes an output surface situated such the portion of the probe beam returned from the target and reflected by the dichroic reflecting surface to the first surface is reflected to be normally incident to the output surface.

15. The apparatus according to claim 6, wherein the double-reflecting dichroic beam splitter includes an output surface situated such the imaging beam returned from the target reflected by the dichroic reflecting surface to the first surface is reflected to be normally incident to the output surface.

16. The apparatus according to claim 7, wherein the double-reflecting dichroic beam splitter includes an output surface situated such the imaging beam returned from the target reflected by the dichroic reflecting surface to the first surface is reflected to be normally incident to the output surface.

17. The apparatus according to claim 8, wherein the double-reflecting dichroic beam splitter includes an output surface situated such the portion of the probe beam reflected by the dichroic reflecting surface to the first surface is reflected to be normally incident to the output surface.

18. The apparatus according to claim 6, wherein the double-reflecting dichroic beam splitter includes a first prism having a vertex angle between the first surface and the dichroic reflecting surface, wherein the vertex angle is greater than $\sin^{-1}(1/n)$, wherein n is a refractive index of the first prism.

19. The apparatus according to claim 7, wherein the double-reflecting dichroic beam splitter includes a first prism having a vertex angle between the first surface and the dichroic reflecting surface, wherein the vertex angle is greater than $\sin^{-1}(1/n)$, wherein n is a refractive index of the first prism.

20. The apparatus according to claim 8, wherein the double-reflecting dichroic beam splitter includes a first prism having a vertex angle between the first surface and the dichroic reflecting surface, wherein the vertex angle is greater than $\sin^{-1}(1/n)$, wherein n is a refractive index of the first prism.

21. The apparatus according to claim 18, wherein the dichroic reflecting surface of the double-reflecting dichroic beam splitter is defined on a surface of the first prism.

22. The apparatus according to claim 19, wherein the dichroic reflecting surface of the double-reflecting dichroic beam splitter is defined on a surface of the first prism.

23. The apparatus according to claim 20, wherein the dichroic reflecting surface of the double-reflecting dichroic beam splitter is defined on a surface of the first prism.

24. The apparatus according to claim 18, wherein the double-reflecting dichroic beam splitter includes a first prism and a second prism secured to each other at respective mating surfaces, and the dichroic reflective surface is situated at the mating surfaces.

25. The apparatus according to claim 19, wherein the double-reflecting dichroic beam splitter includes a first prism and a second prism secured to each other at respective mating surfaces, and the dichroic reflective surface is situated at the mating surfaces.

26. The apparatus according to claim 20, wherein the double-reflecting dichroic beam splitter includes a first prism and a second prism secured to each other at respective mating surfaces, and the dichroic reflective surface is situated at the mating surfaces.

27. The apparatus according to claim 24, wherein the dichroic reflecting surface is defined directly on at least one of the mating surfaces.

28. The apparatus according to claim 25, wherein the dichroic reflecting surface is defined directly on at least one of the mating surfaces.

29. The apparatus according to claim 26, wherein the dichroic reflecting surface is defined directly on at least one of the mating surfaces.

30. The apparatus according to claim 1, wherein the beam splitter includes a dichroic plate and a plane reflector, wherein the dichroic plate is situated to direct a portion of the probe beam returned from the target to the plane reflector and transmit the imaging beam to the image sensor.

31. The apparatus according to claim 1, wherein the beam splitter includes a dichroic plate and a plane reflector, wherein the dichroic plate is situated to reflect the imaging beam to the plane reflector and transmit a portion of the probe beam returned from the target.

32. The apparatus according to claim 1, wherein the optical fiber is a polarization retaining single mode (PRSM) optical fiber and further comprising a polarizing beam splitter (PBS) situated so that the probe beam from the PRSM optical fiber is received be the PBS in a state of polarization that is substantially transmitted by the PBS to the beam splitter.

33. The apparatus according to claim 32, wherein the state of polarization is a linear state of polarization.

34. The apparatus according to claim 32, further comprising a waveplate situated between the PBS and the beam splitter to produce a circular state of polarization in the probe beam and to reflect a portion of the probe beam towards the optical fiber to produce a local oscillator beam.

35. The apparatus according to claim 34, wherein the waveplate has an input surface situated to receive the probe beam from the PBS and an output surface situated to receive the probe beam from the input surface of the waveplate, wherein one of the input surface or the output surface is antireflection coated and the other of the input surface and the output surface reflects a portion of the probe beam as the local oscillator beam.

36. The apparatus according to claim 3, further comprising a mixing lens situated to receive the probe beam from the optical fiber and a dichroic filter situated along the axis on an axial portion of the mixing lens, wherein the dichroic filter is transmissive to the probe beam and non-transmissive to the tracer beam.

37. The apparatus according to claim 36, further comprising a dichroic reflector situated along the axis on an axial portion of the mixing lens, wherein the dichroic filter is a dichroic reflector that is transmissive to the probe beam and reflective to the tracer beam.

38. The apparatus according to claim 36, wherein the dichroic filter is a wavelength-dependent polarizer that is substantially non-transmissive to the tracer beam.

39. The apparatus according to claim 37, wherein the dichroic filter is a wave-length-dependent polarizer that is substantially non-transmissive to the tracer beam.

40. The apparatus according to claim 1, further comprising:
a mixing lens situated to receive the probe beam from the optical fiber; and
a dichroic reflector situated along the axis on an axial portion of the mixing lens, the dichroic reflector transmissive to the probe beam and reflective to a tracer beam, wherein a dimension of the dichroic reflector is based on a corresponding dimension of the image sensor.

41. The apparatus according to claim 1, further comprising a mixing lens situated to receive the probe beam and focus the probe beam; and a dichroic reflector situated along the axis on an axial portion of the mixing lens, the dichroic reflector transmissive to the probe beam and reflective to a tracer beam, wherein a dimension of the dichroic reflector is based on a corresponding dimension of the image sensor.

42. The apparatus according to claim 37, wherein a dimension of the dichroic reflector is at least 0.5, 0.75, 1.0, or 1.5 times a product of a corresponding dimension of the image sensor and a ratio of an optical distance along the axis from the mixing lens focus to the dichroic reflector to an optical distance from the mixing lens focus to the image sensor.

43. The apparatus according to claim 40, wherein a dimension of the dichroic reflector is at least 0.5, 0.75, 1.0, or 1.5 times a product of a corresponding dimension of the image sensor and a ratio of an optical distance along the axis from the mixing lens focus to the dichroic reflector to an optical distance from the mixing lens focus to the image sensor.

44. The apparatus according to claim 41, wherein a dimension of the dichroic reflector is at least 0.5, 0.75, 1.0, or 1.5 times a product of a corresponding dimension of the image sensor and a ratio of an optical distance along the axis from the mixing lens focus to the dichroic reflector to an optical distance from the mixing lens focus to the image sensor.

45. The apparatus according to claim 37, wherein the dichroic filter is situated on a lens surface of the at least one movable optical element.

46. The apparatus according to claim 40, wherein the dichroic reflector is situated on a lens surface of the at least one movable optical element.

47. The apparatus according to claim 41, wherein the dichroic reflector is situated on a lens surface of the at least one movable optical element.

48. The apparatus according to claim 1, wherein the beam splitter is a dichroic beam splitter.

49. The apparatus according to claim 1, wherein the objective lens including a fixed lens.

50. The apparatus according to claim 1, wherein the at least one movable optical element situated between the beam splitter and the target.

51. The apparatus according to claim 1, wherein the at least one movable optical element is translatable to focus the imaging beam at the image sensor.

52. A method of manufacturing a structure, comprising:
   producing the structure based on design information;
   obtaining shape information of the structure by using the apparatus of claim 1; and
   comparing the obtained shape information with the design information.

53. The method of claim 52, further comprising reprocessing the structure based on the comparison.

54. The method of claim 52, wherein reprocessing the structure includes producing the structure over again.

\* \* \* \* \*